April 19, 1927.
W. J. ROEPKE
1,625,502
AUTOMATIC PAN MAKING MACHINE
Filed April 22, 1926     28 Sheets-Sheet 7
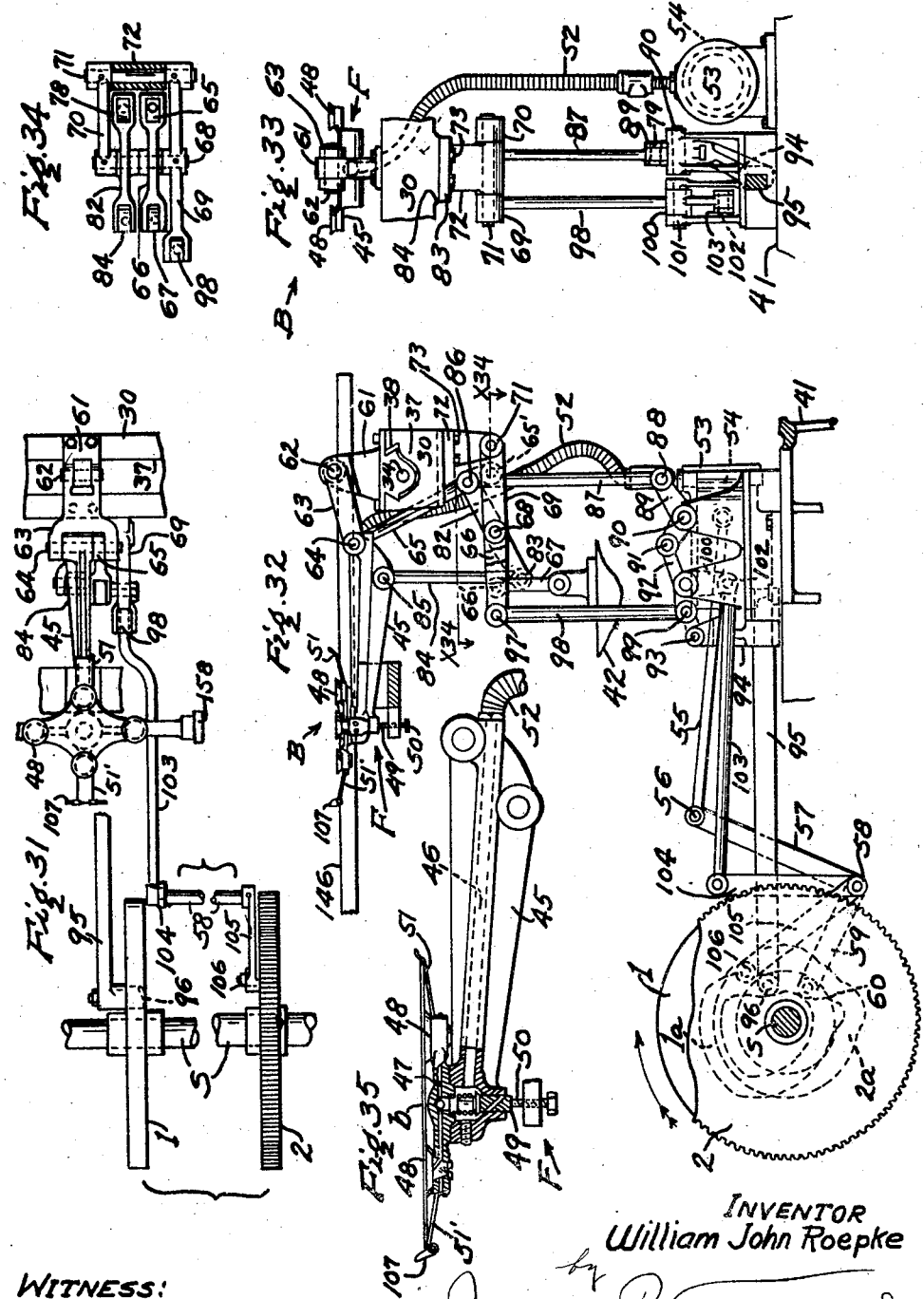
INVENTOR
William John Roepke
WITNESS:

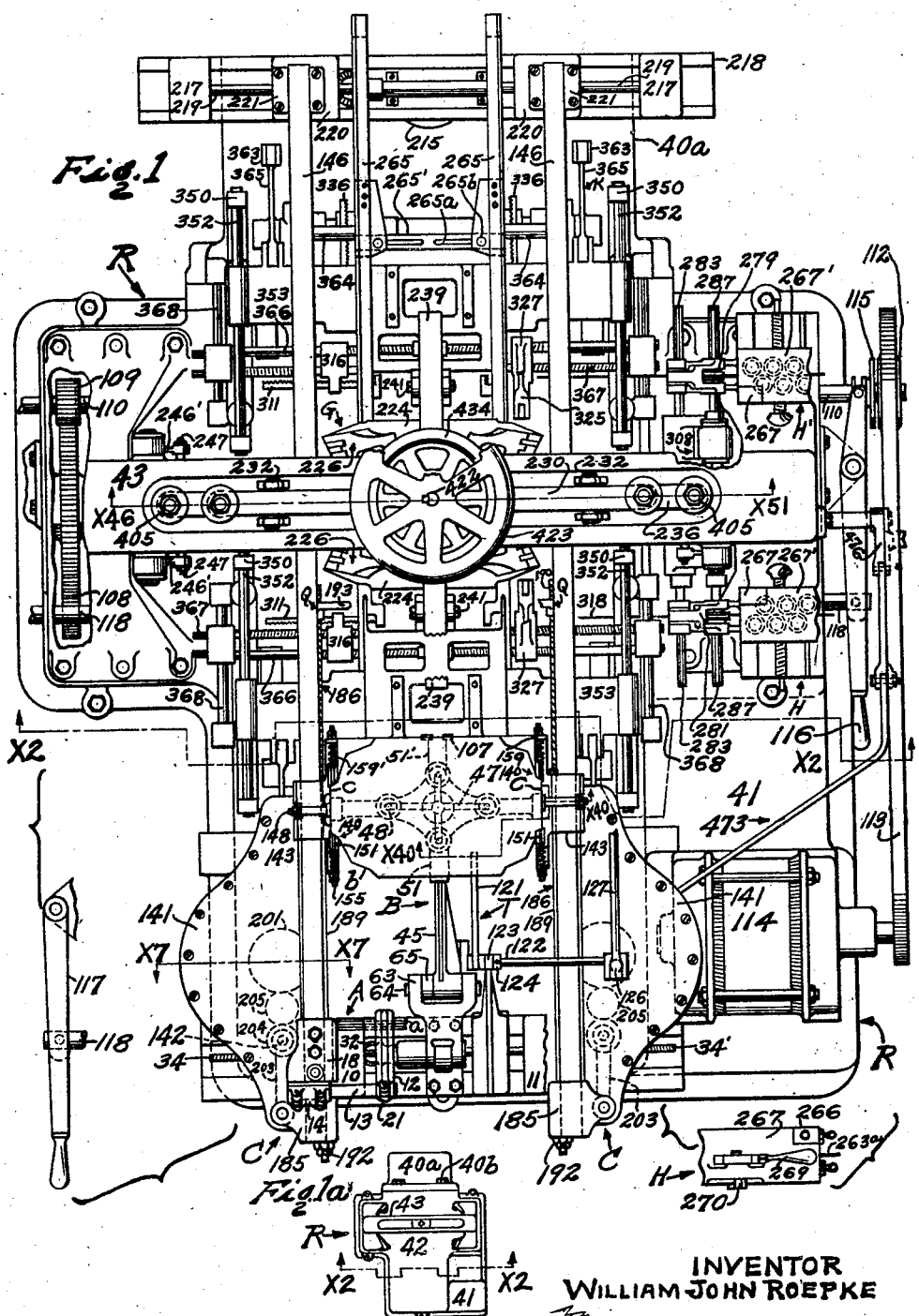

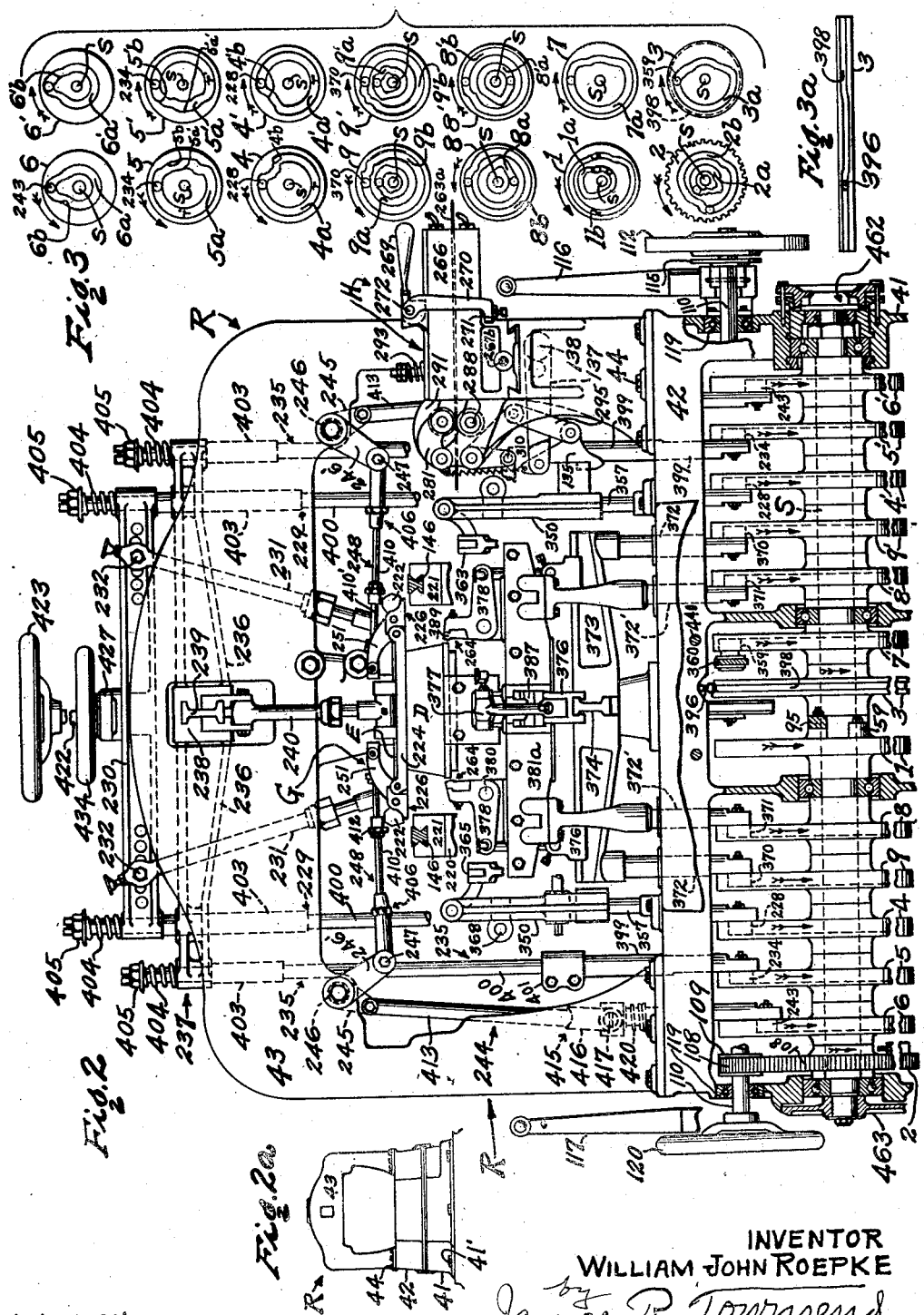

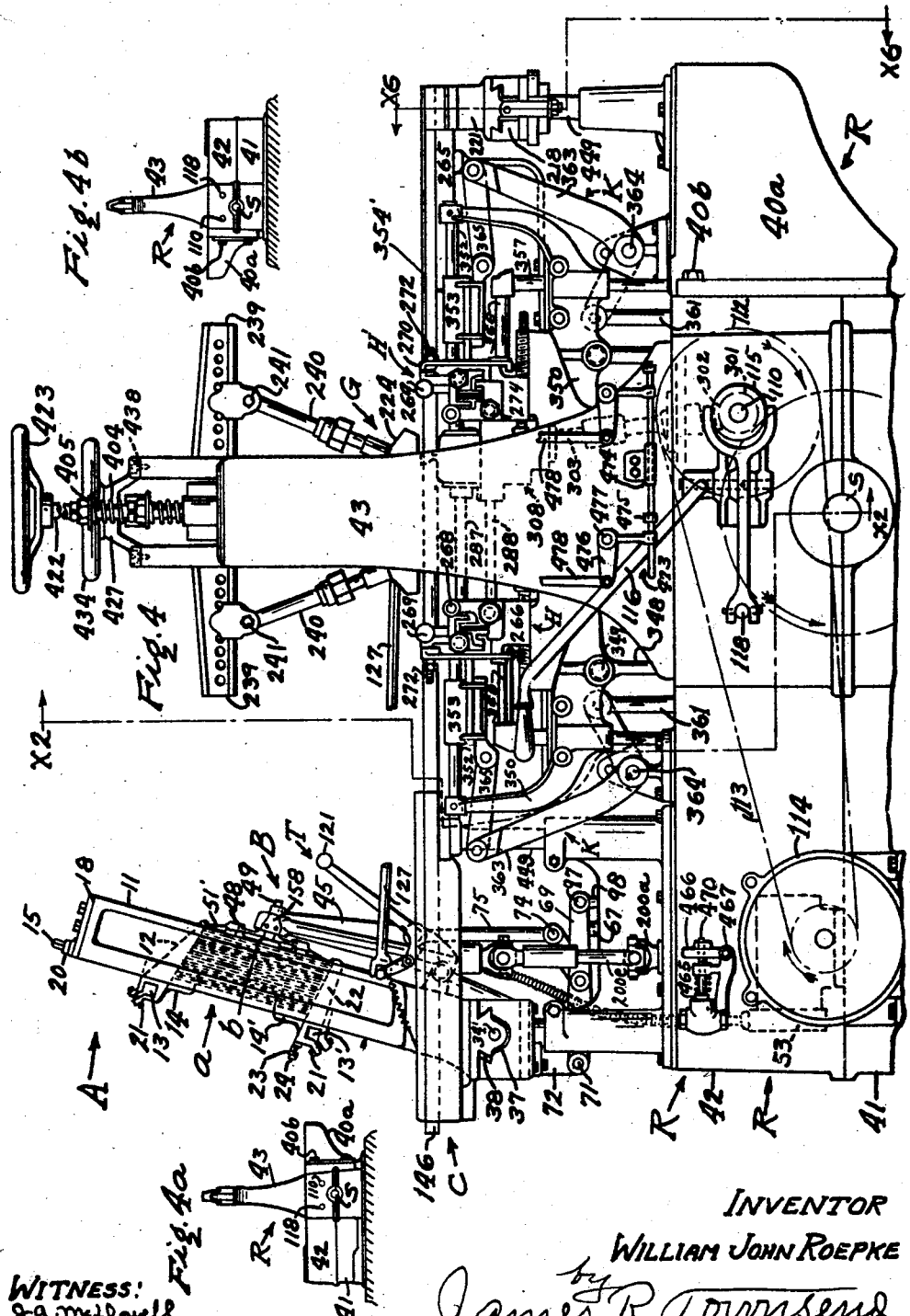

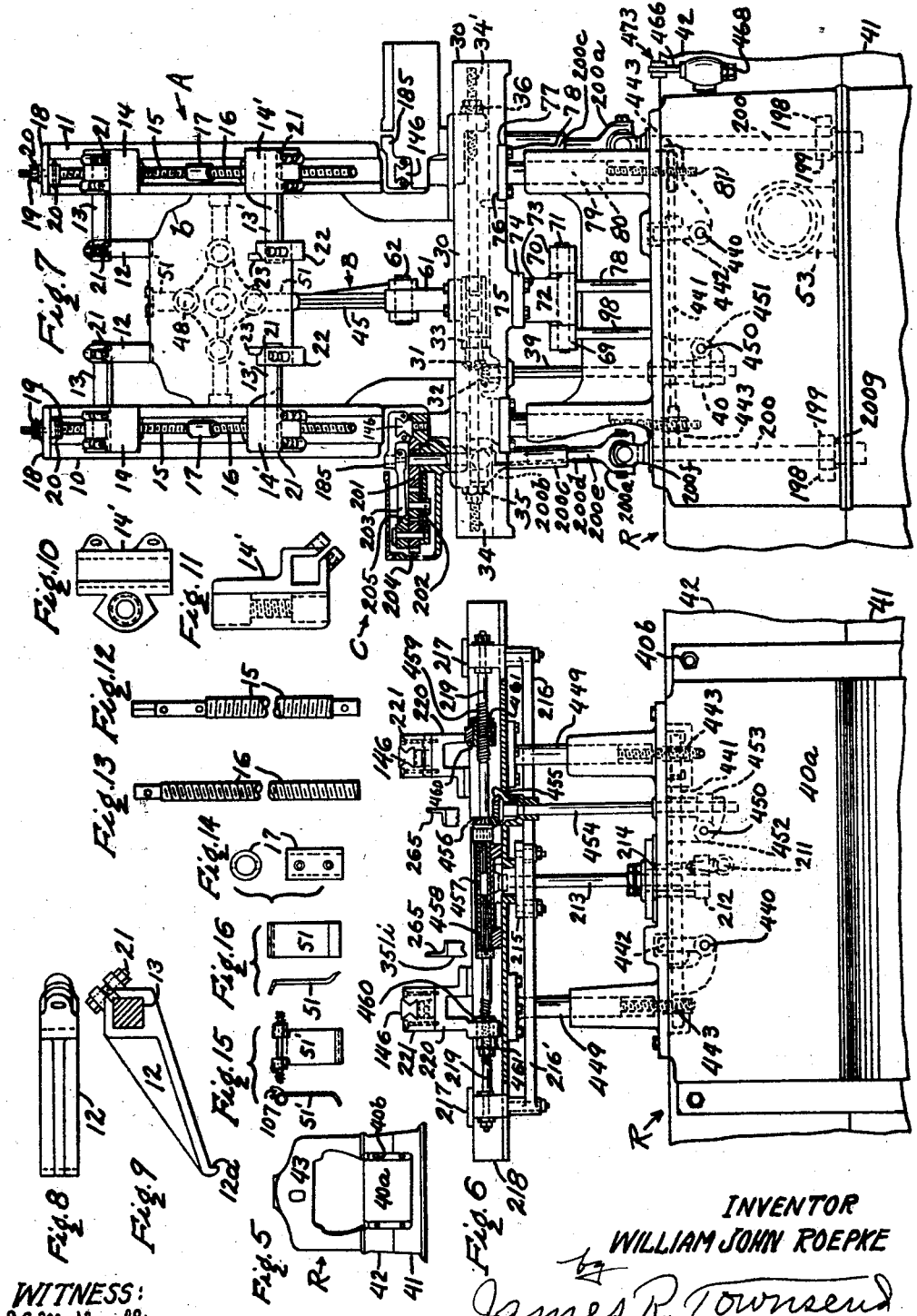

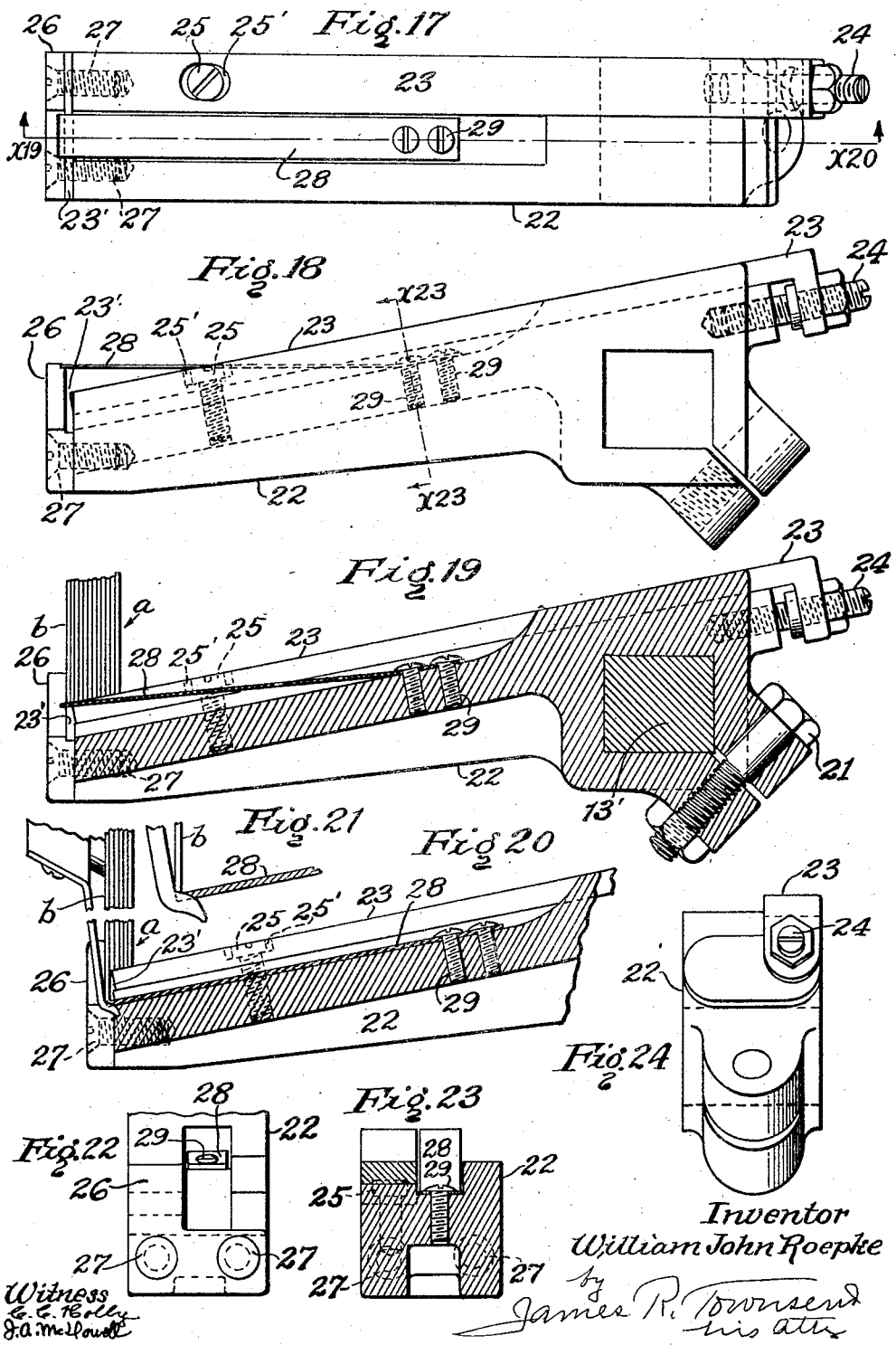

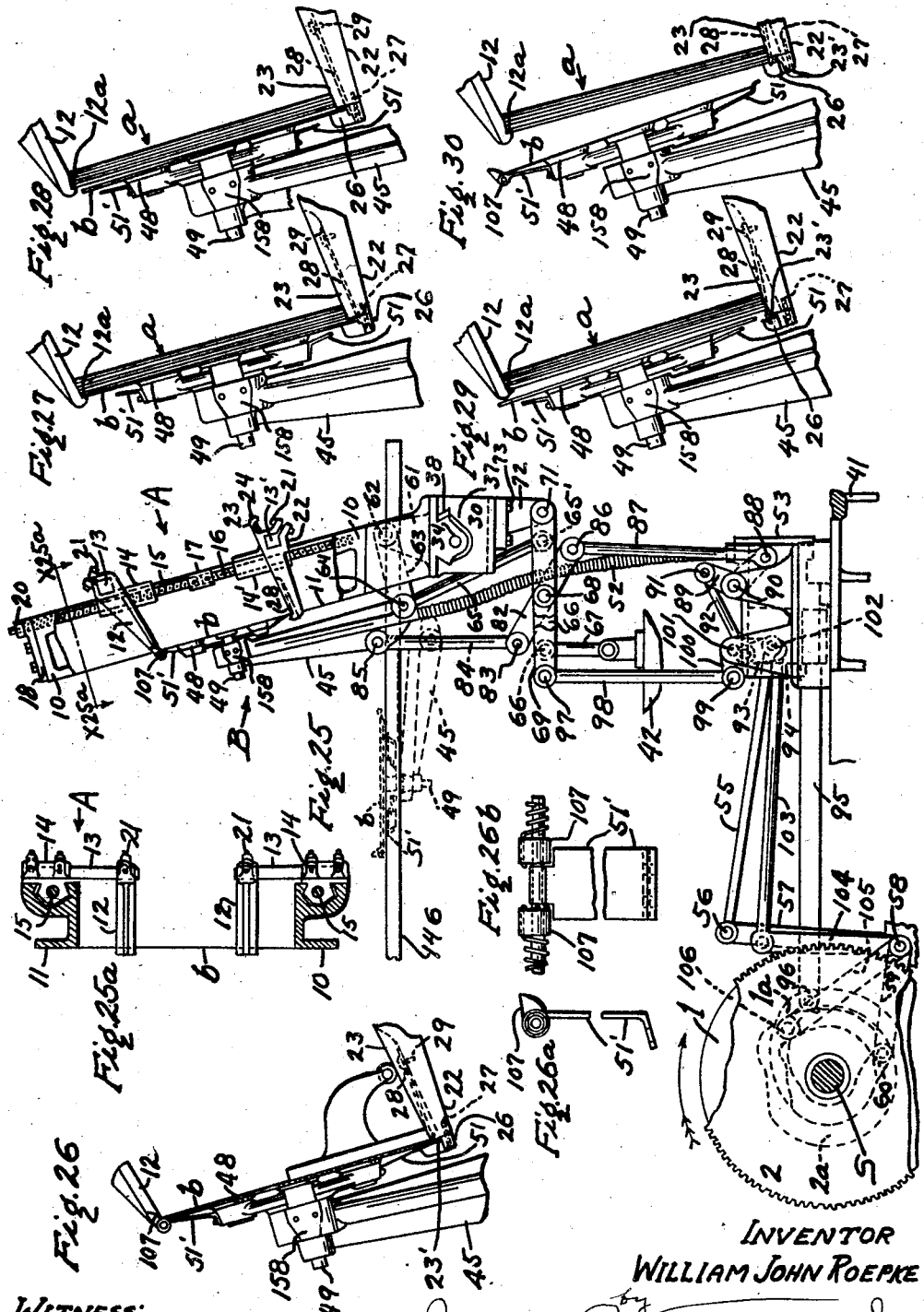

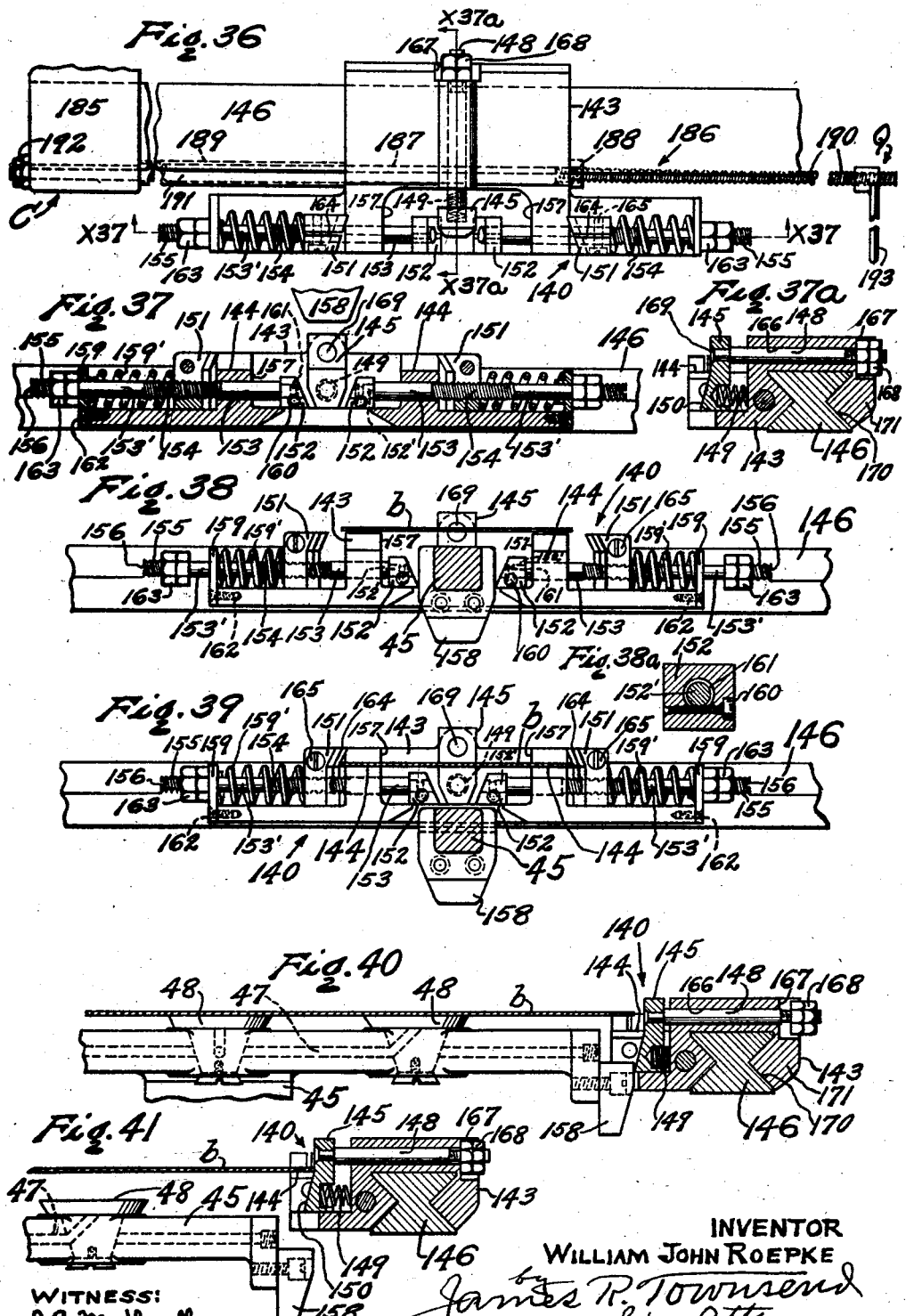

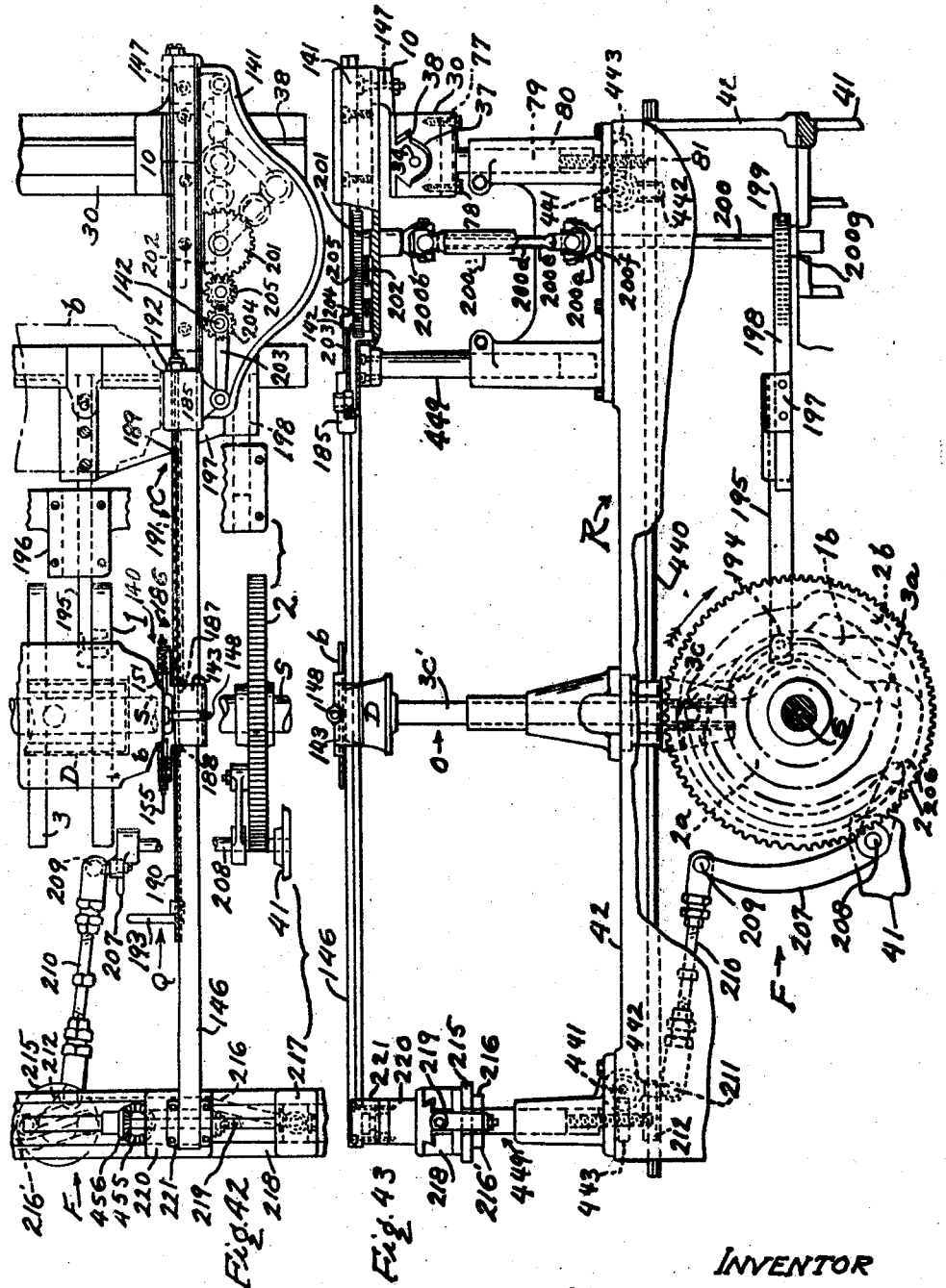

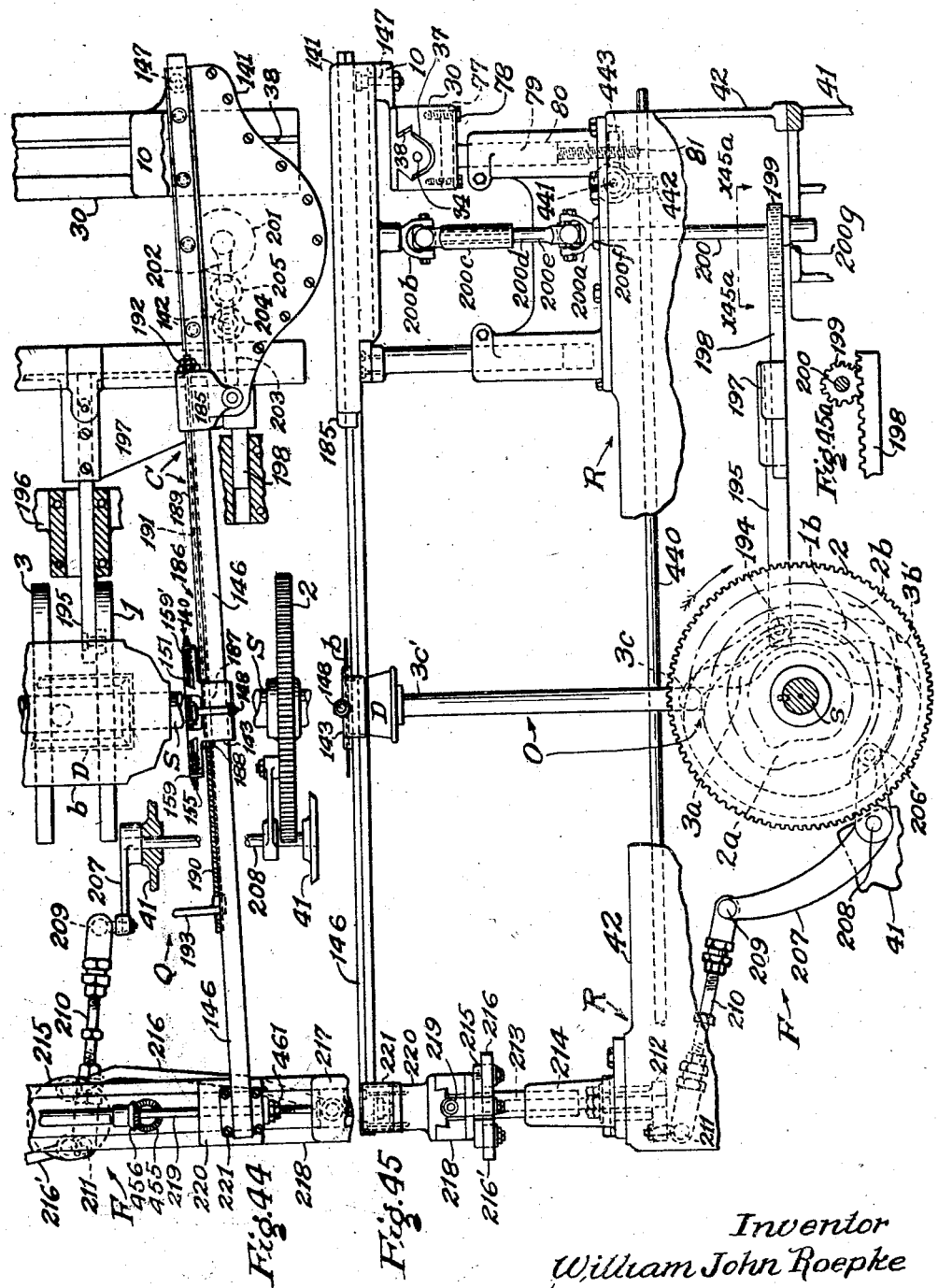

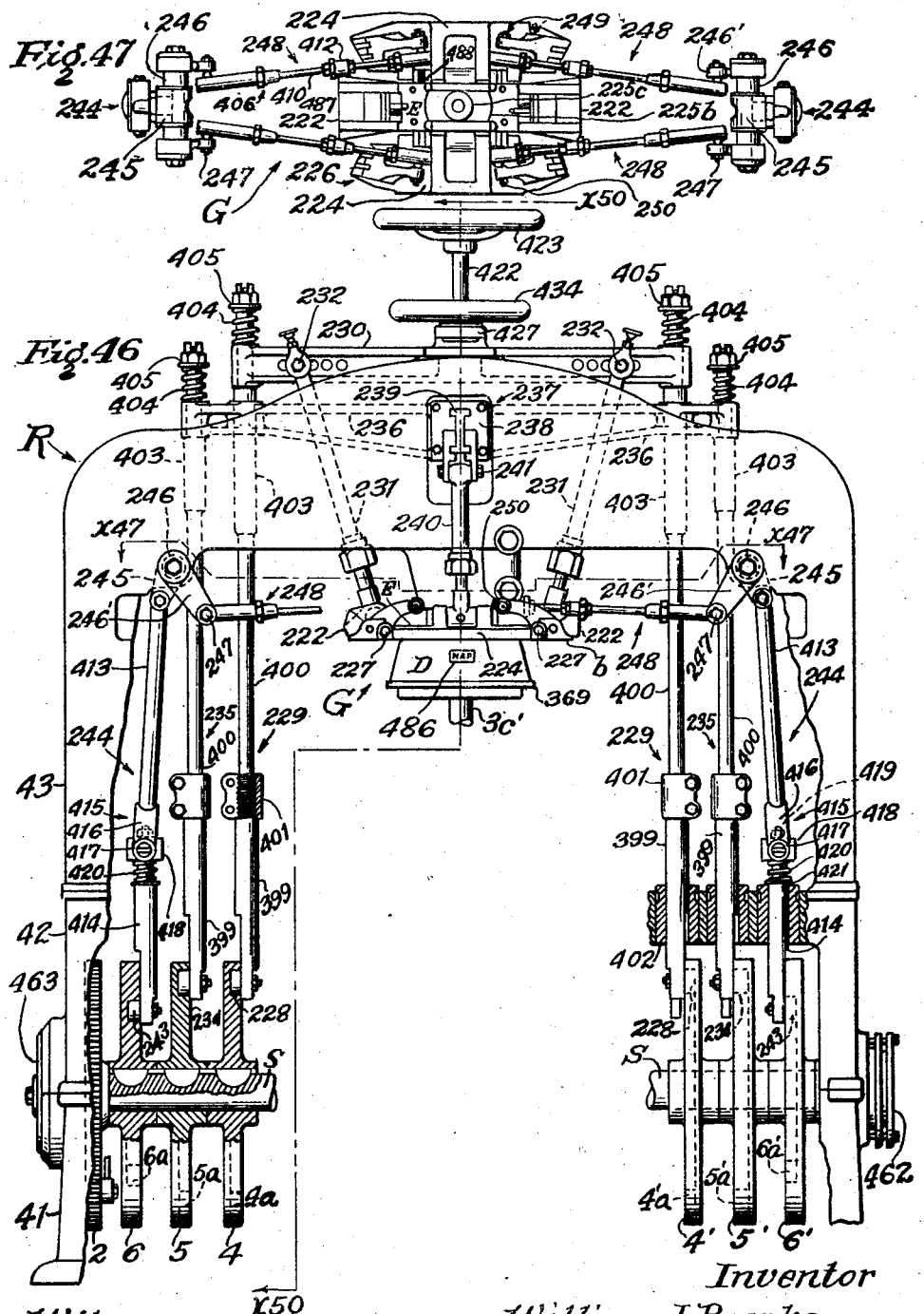

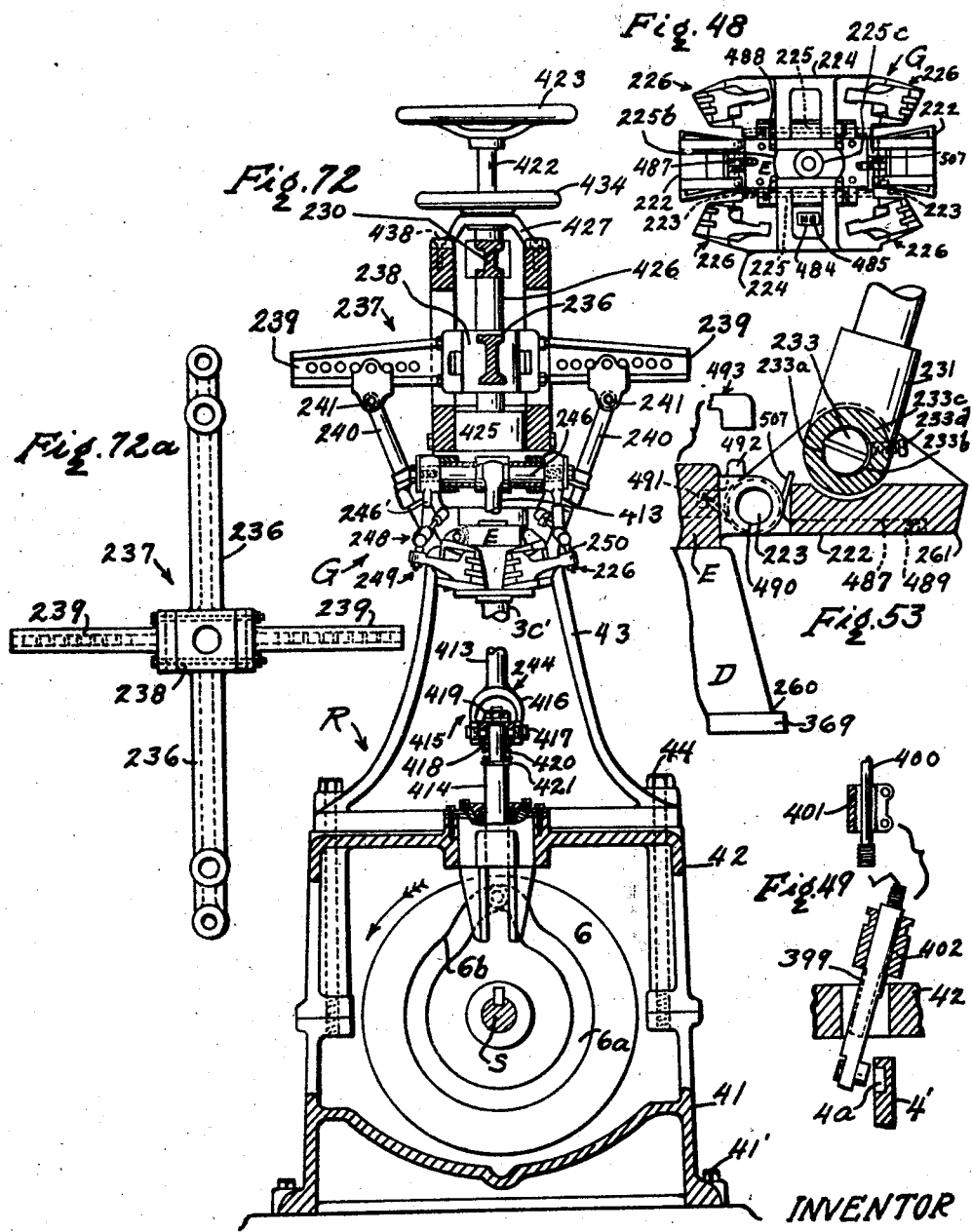

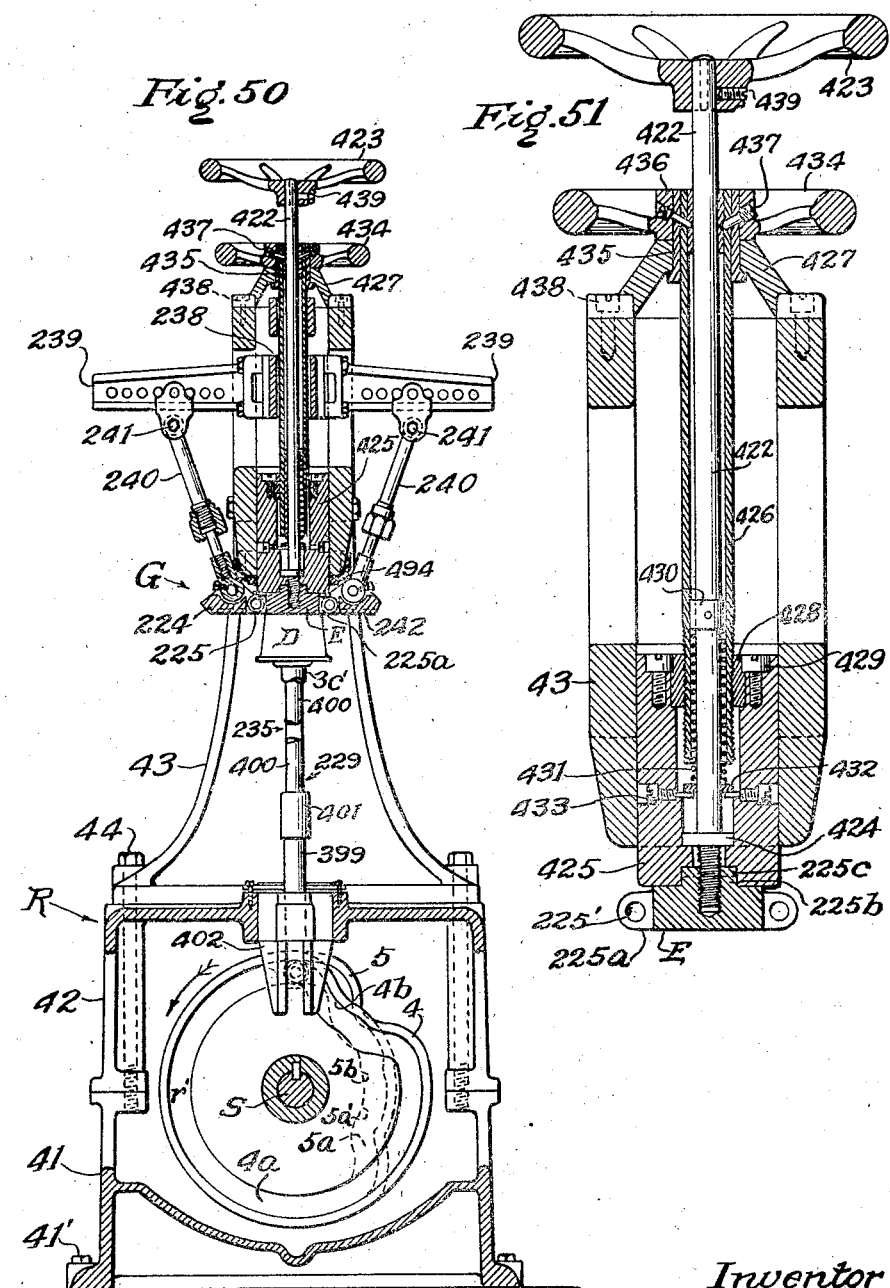

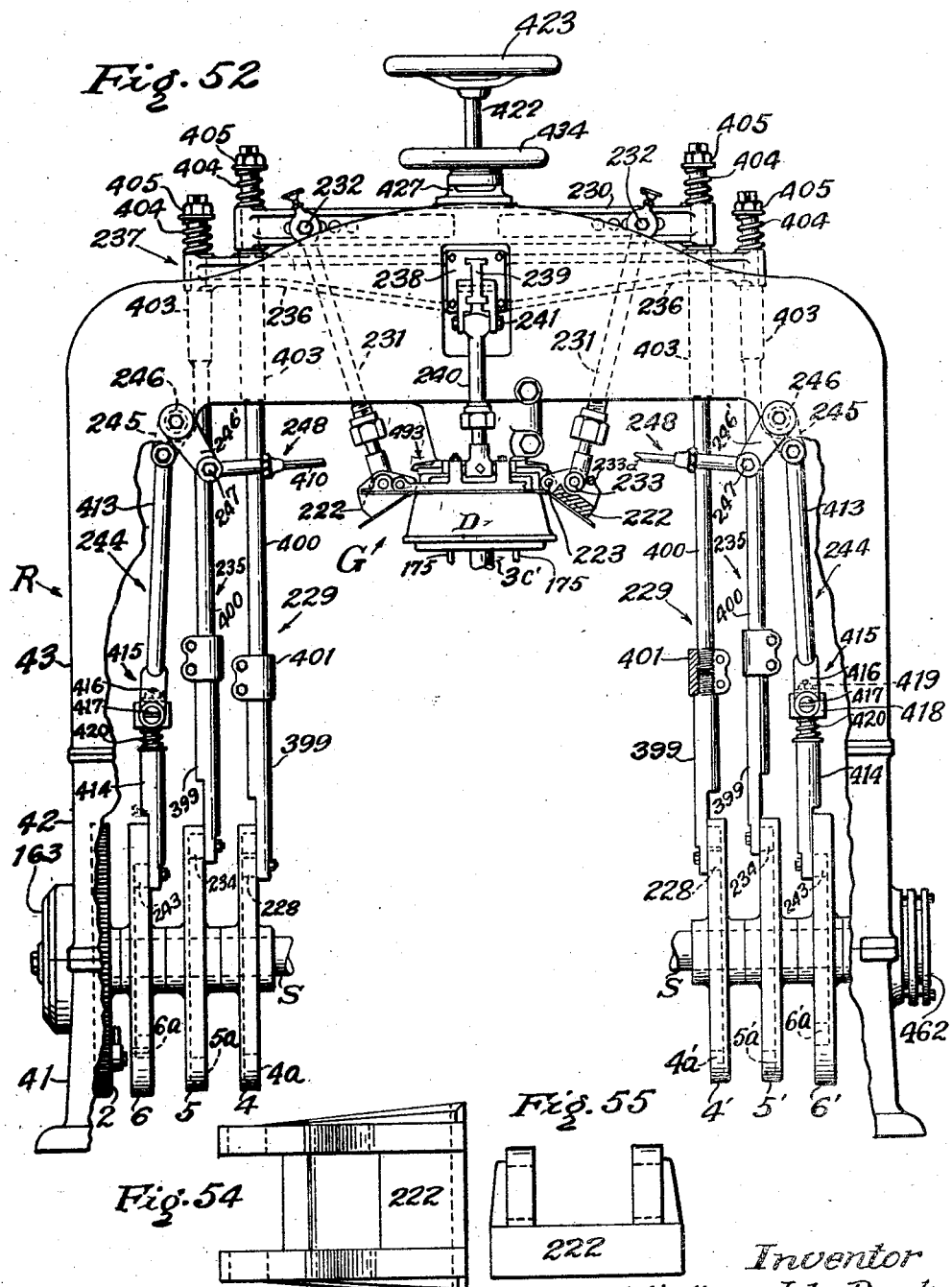

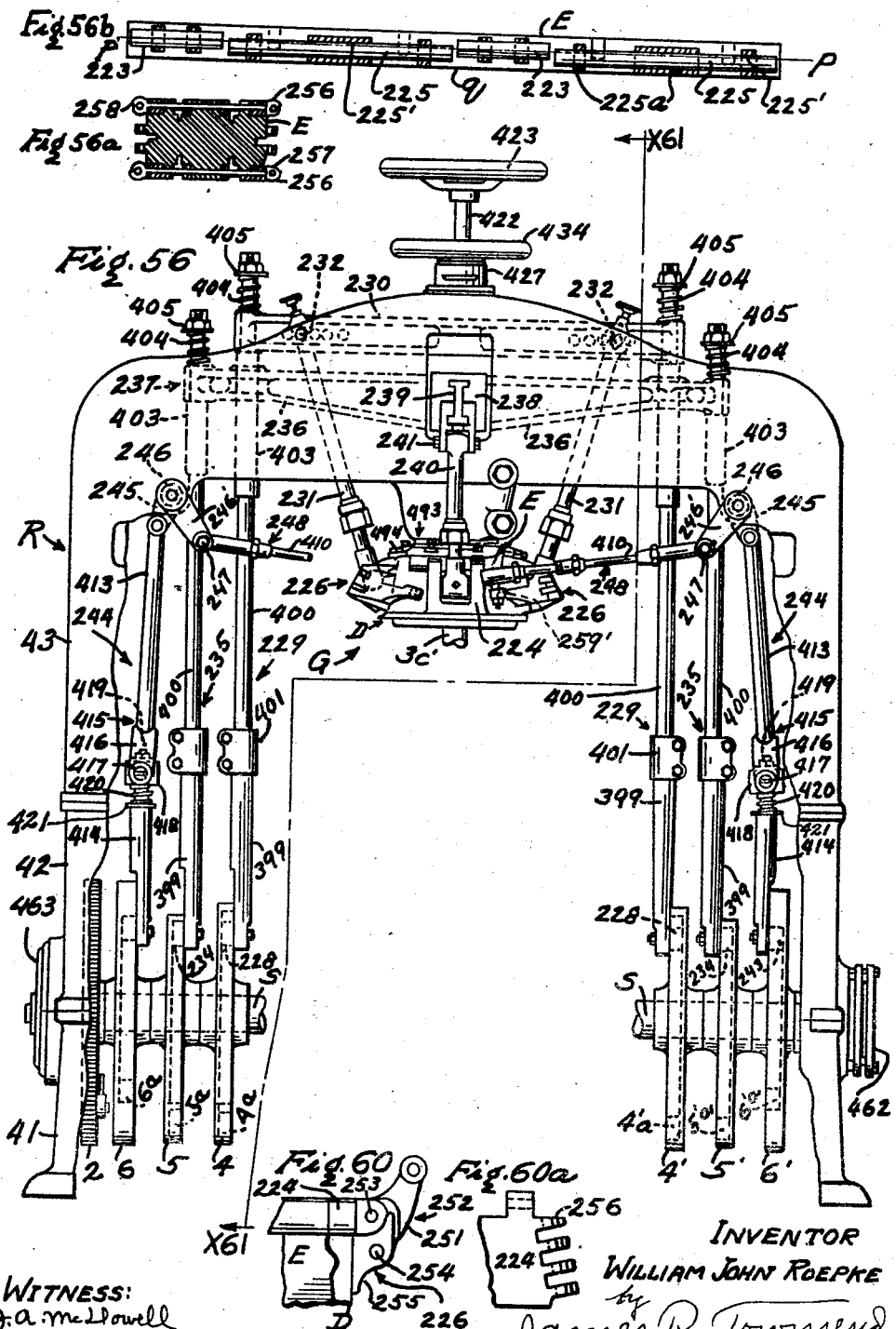

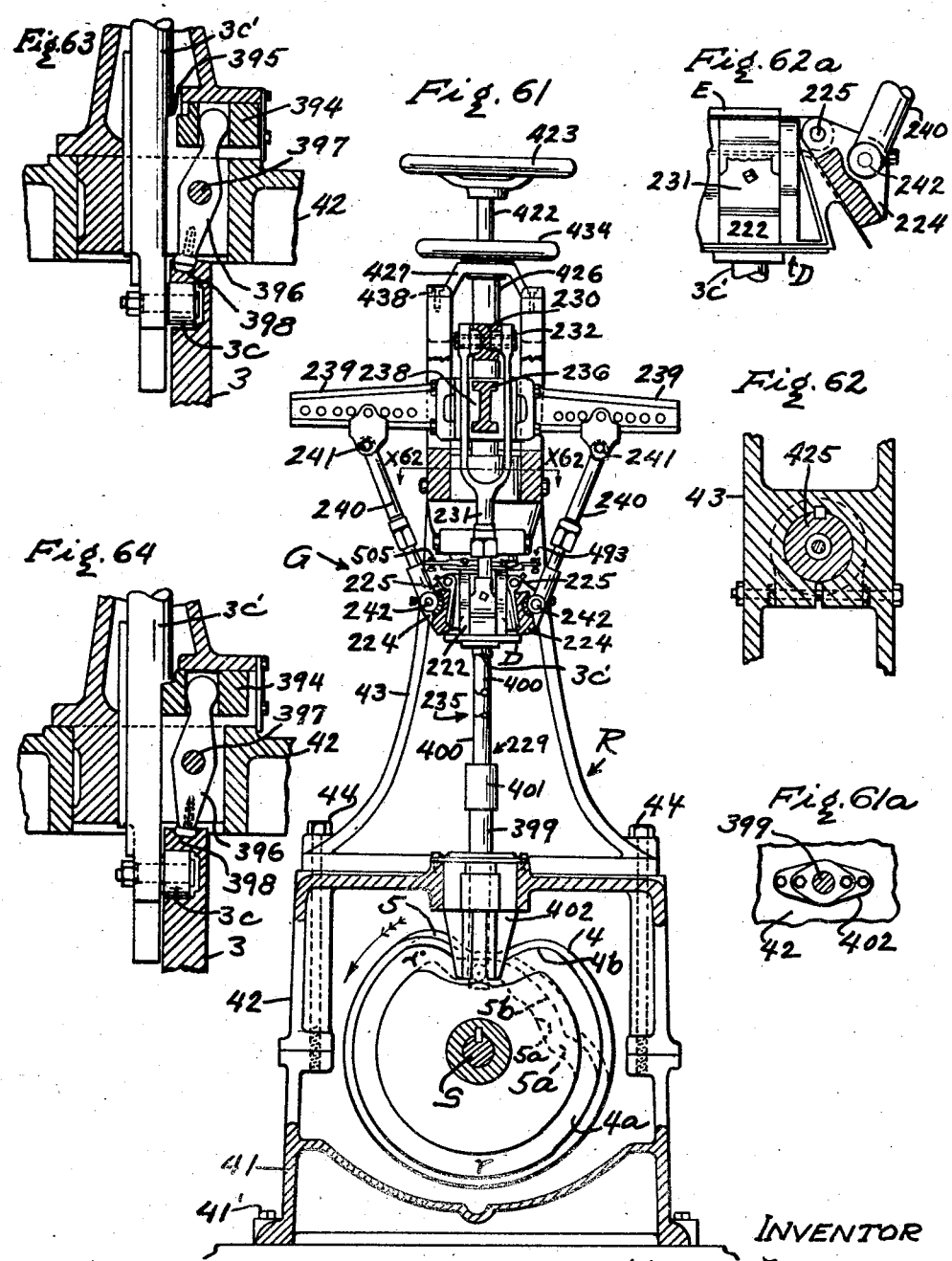

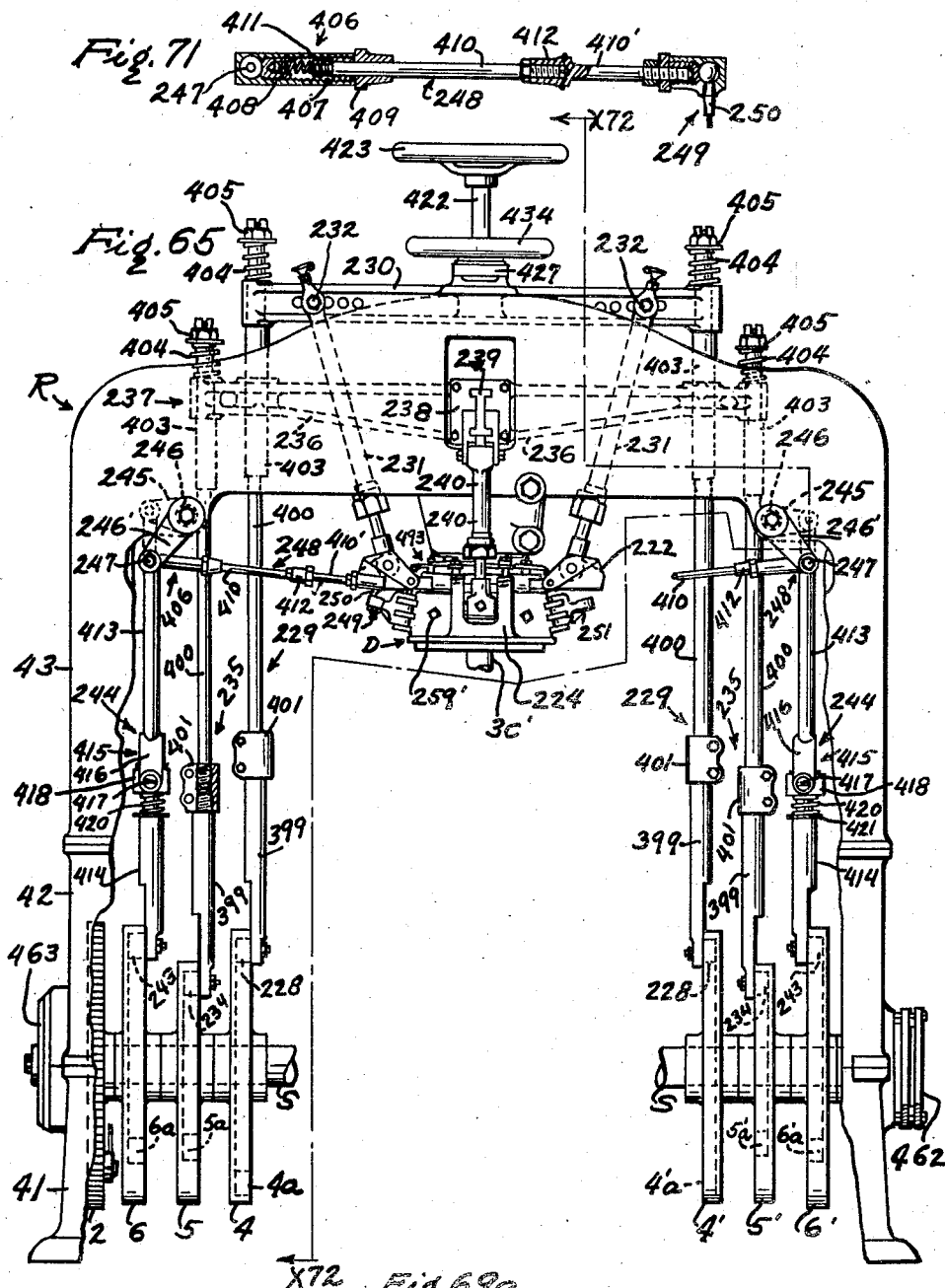

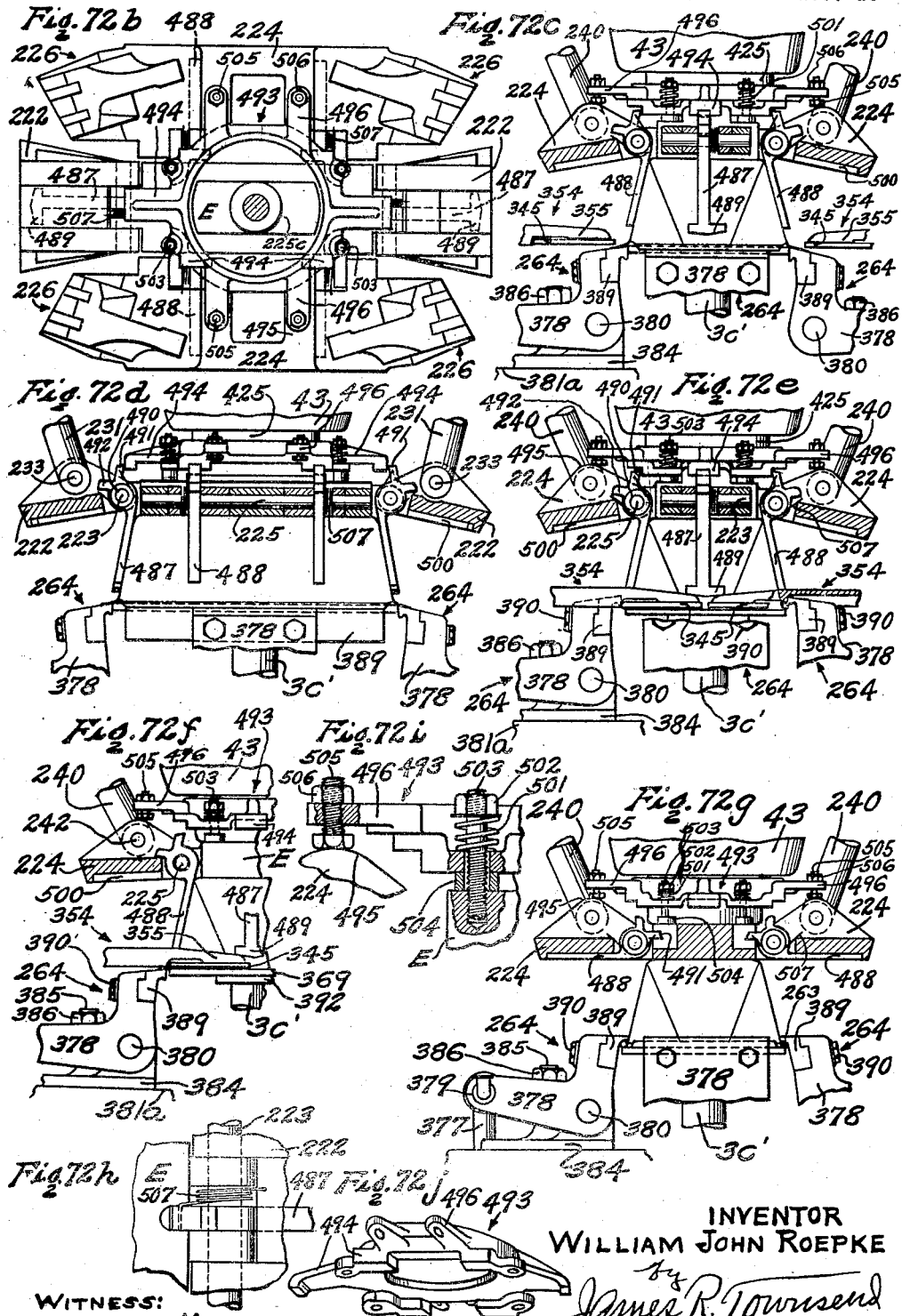

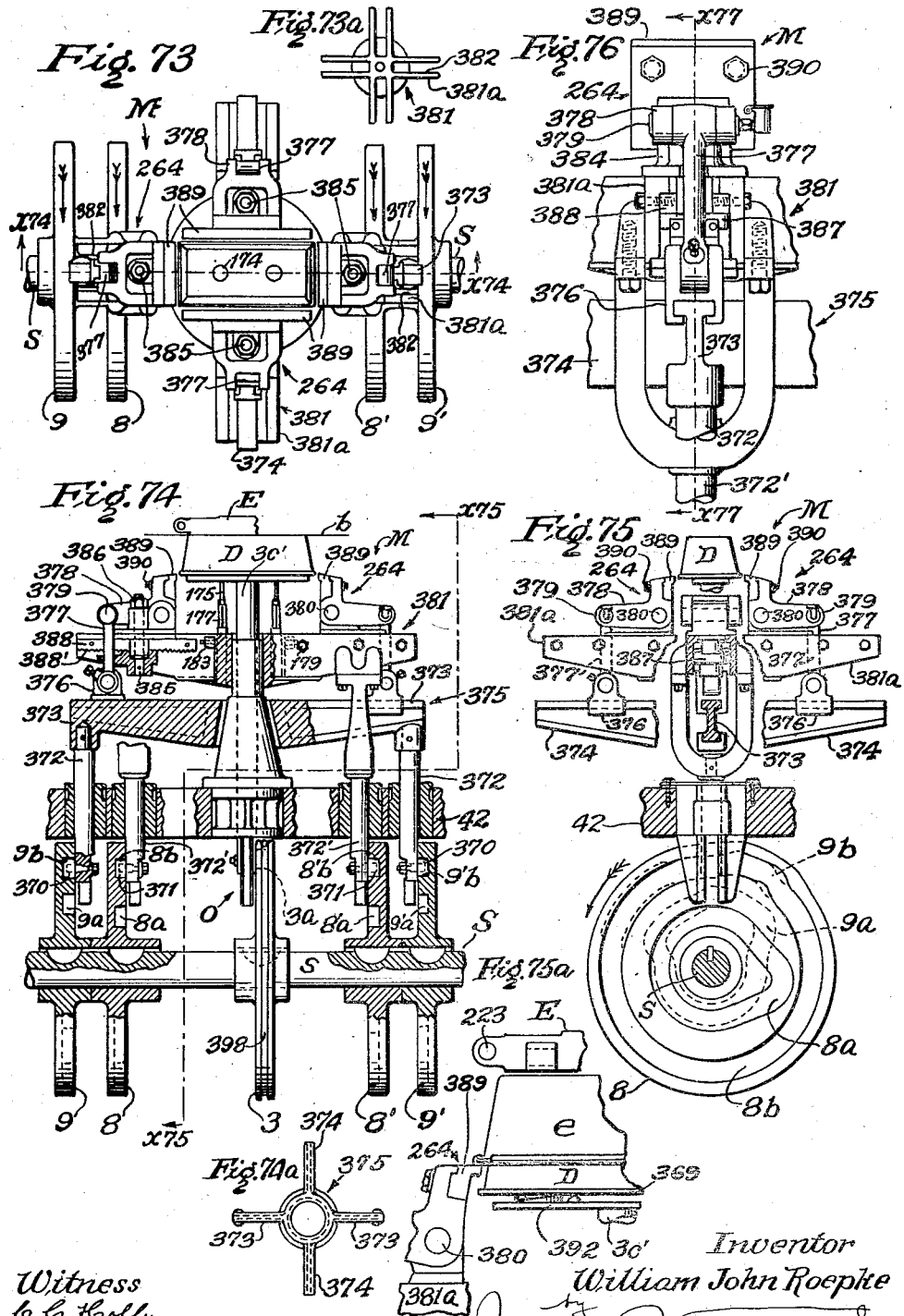

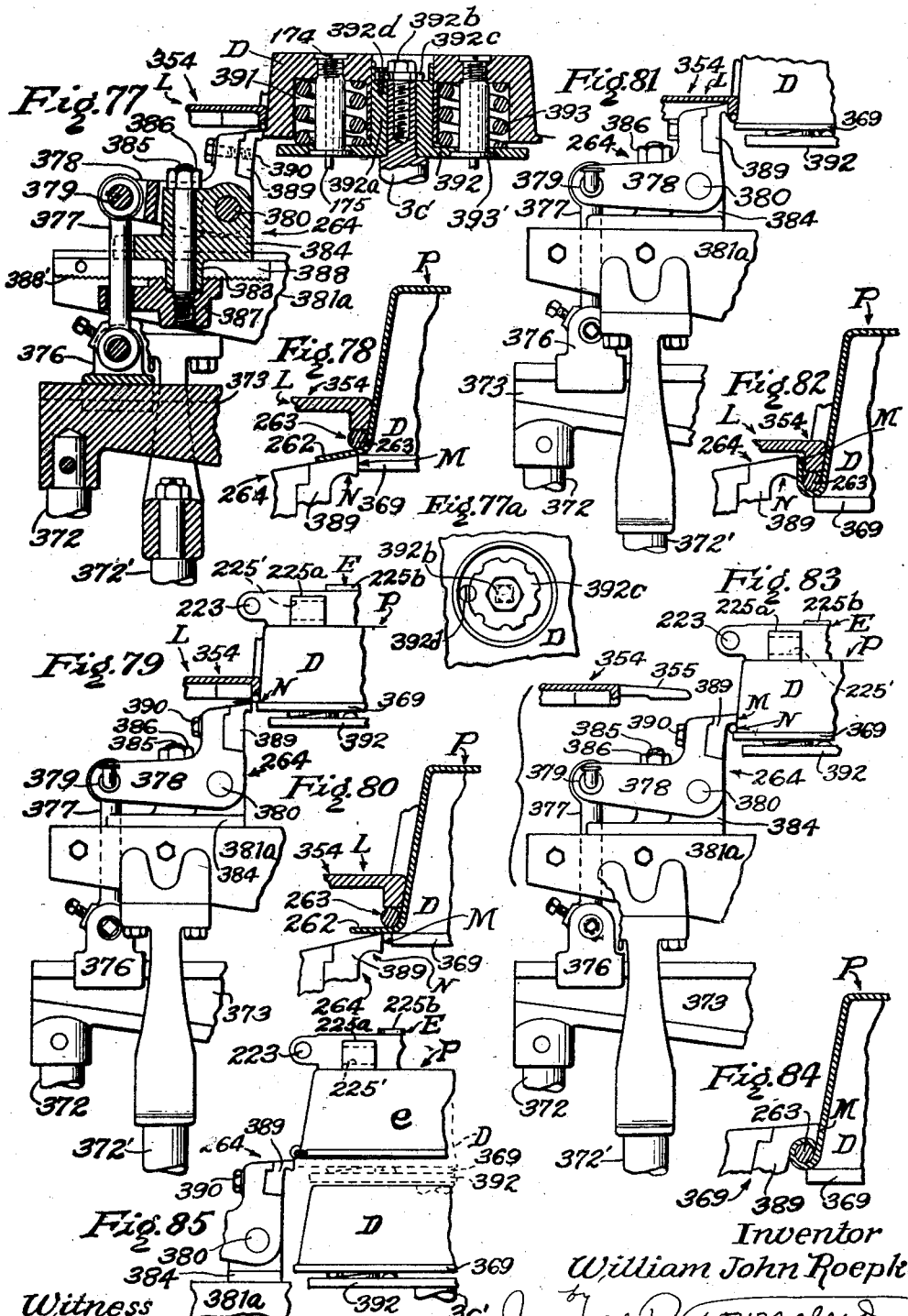

April 19, 1927.
W. J. ROEPKE
1,625,502
AUTOMATIC PAN MAKING MACHINE
Filed April 22, 1926    28 Sheets-Sheet 21
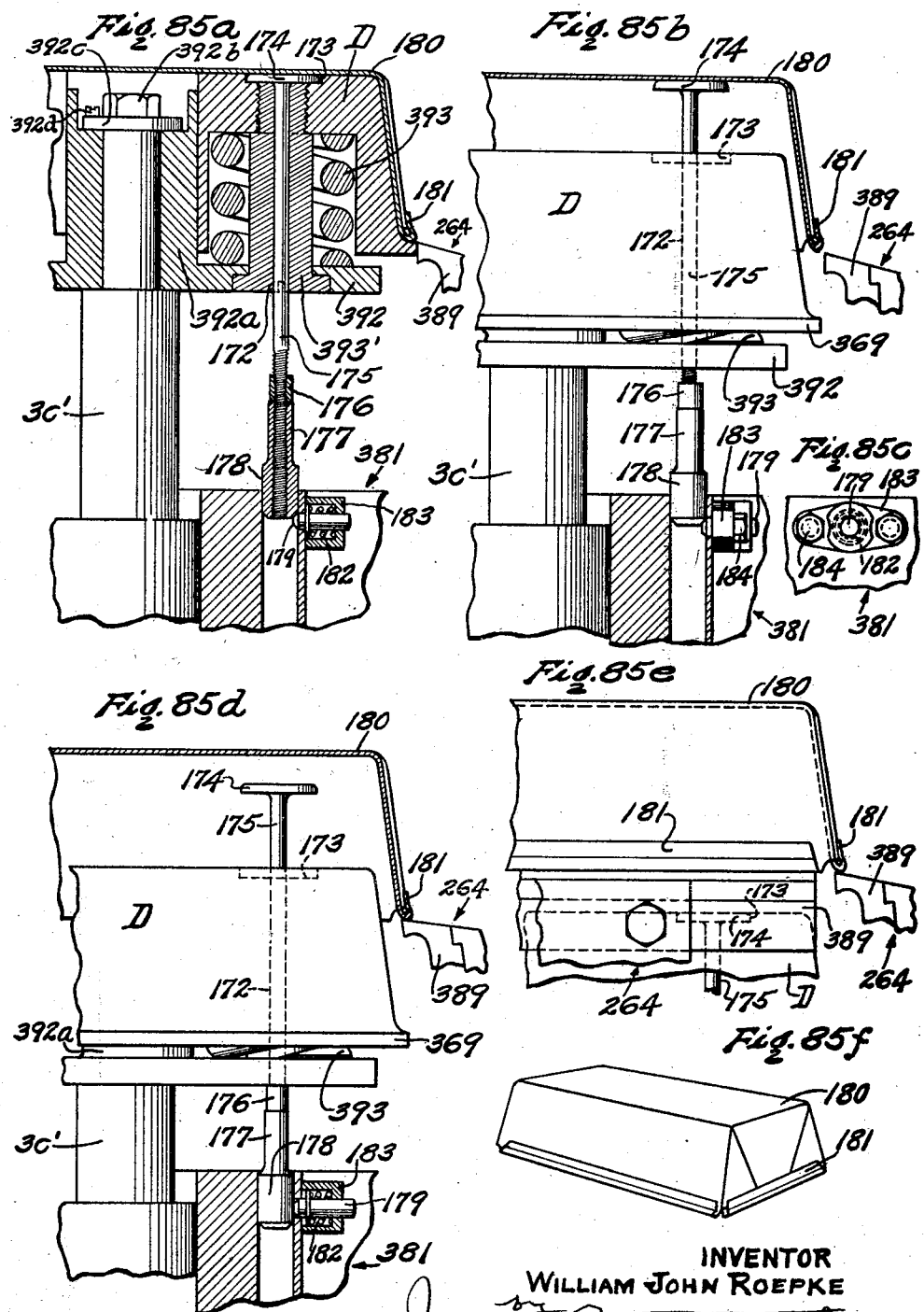
INVENTOR
WILLIAM JOHN ROEPKE
by James R. Townsend
his Atty
WITNESS:
J. A. McDowell

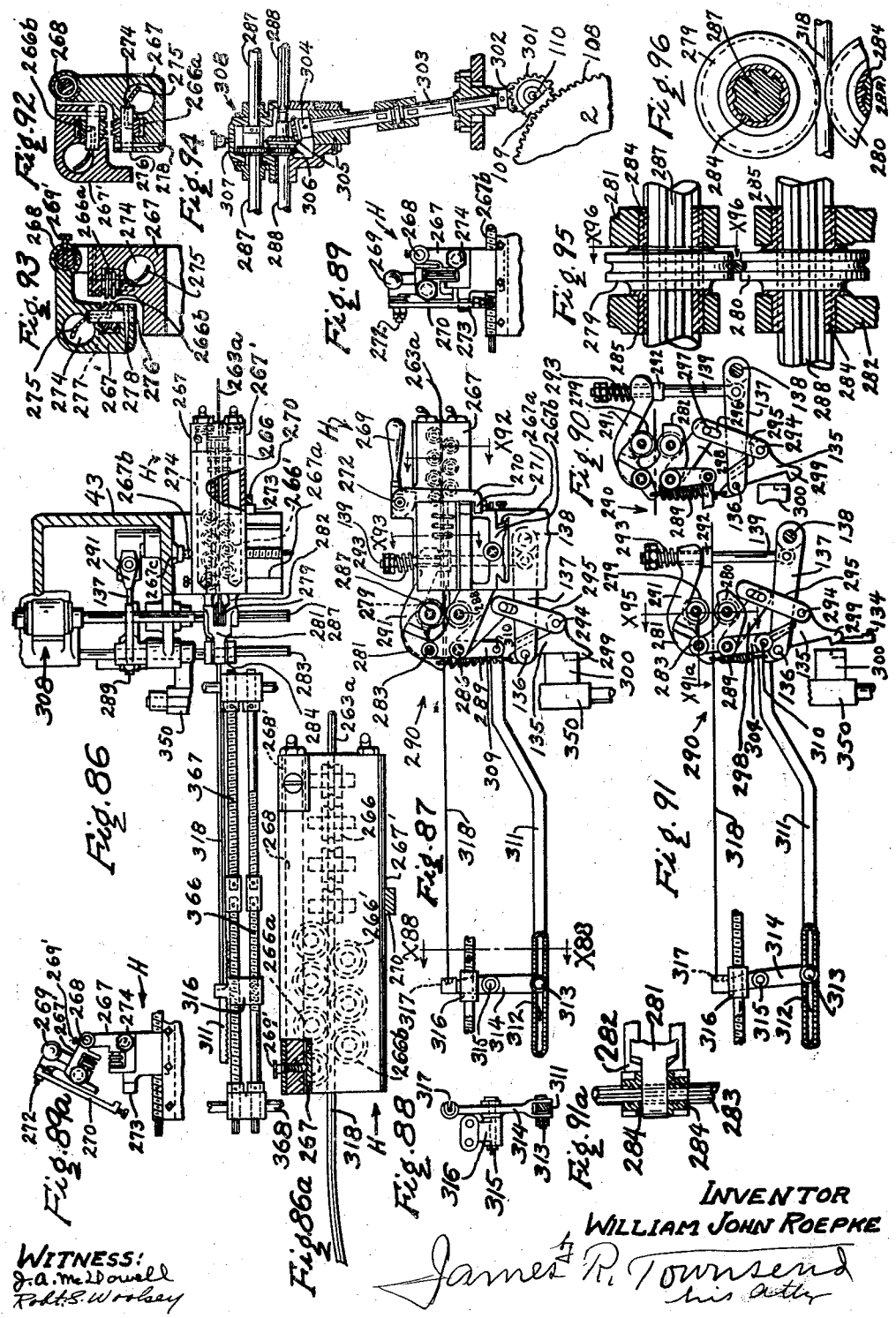

April 19, 1927.    W. J. ROEPKE    1,625,502
AUTOMATIC PAN MAKING MACHINE
Filed April 22, 1926    28 Sheets-Sheet 23
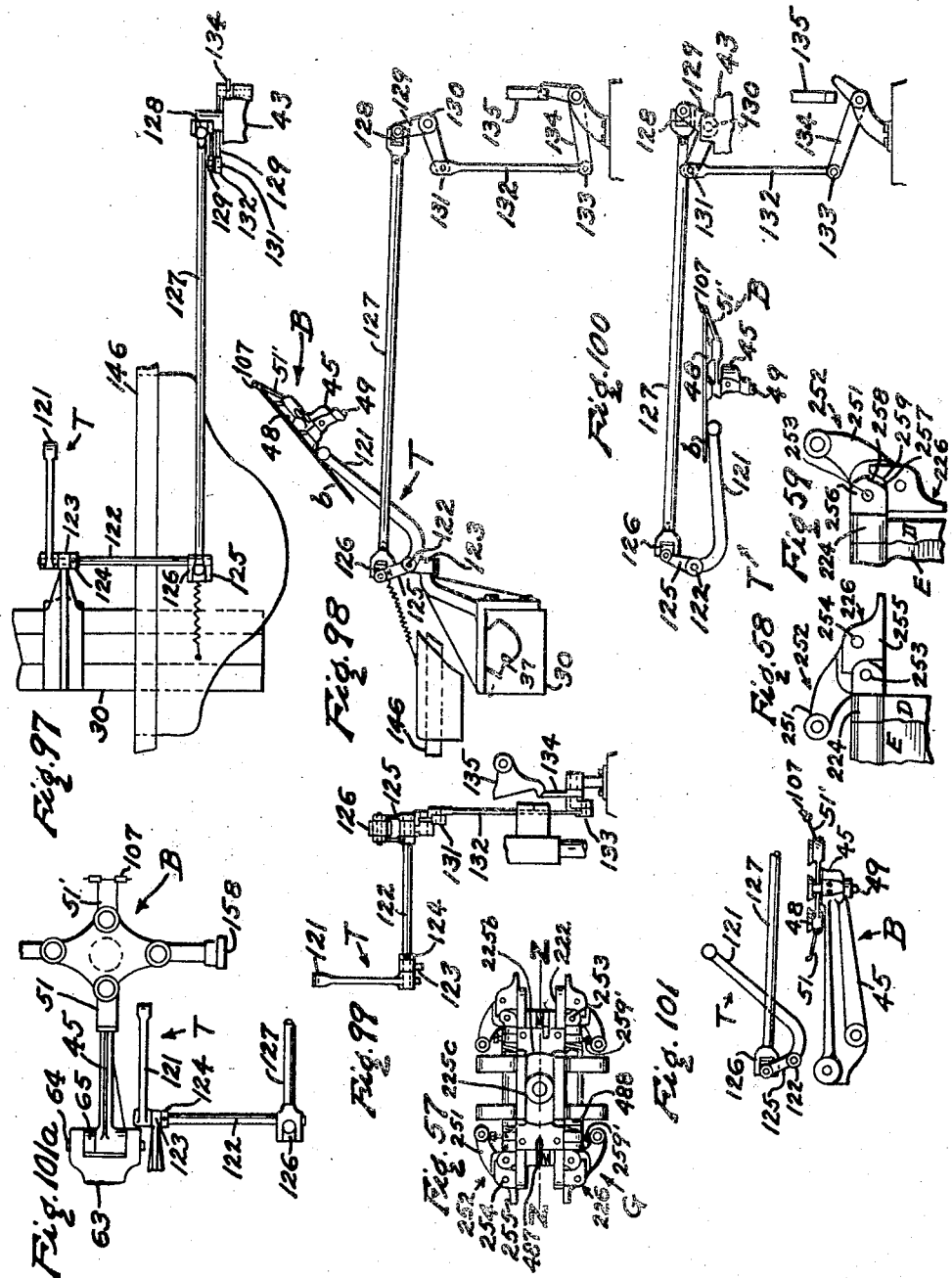
WITNESS:
INVENTOR
WILLIAM JOHN ROEPKE

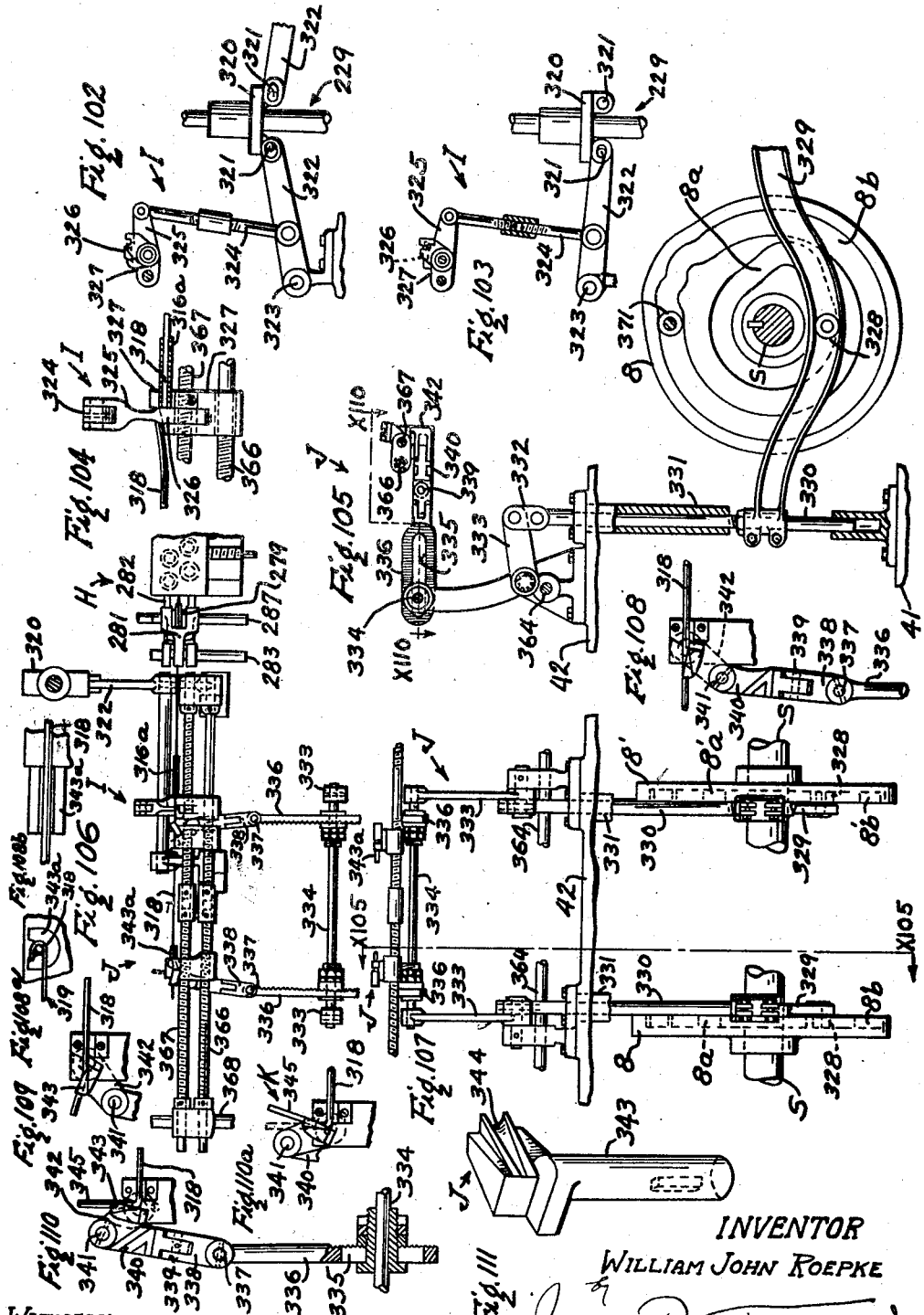

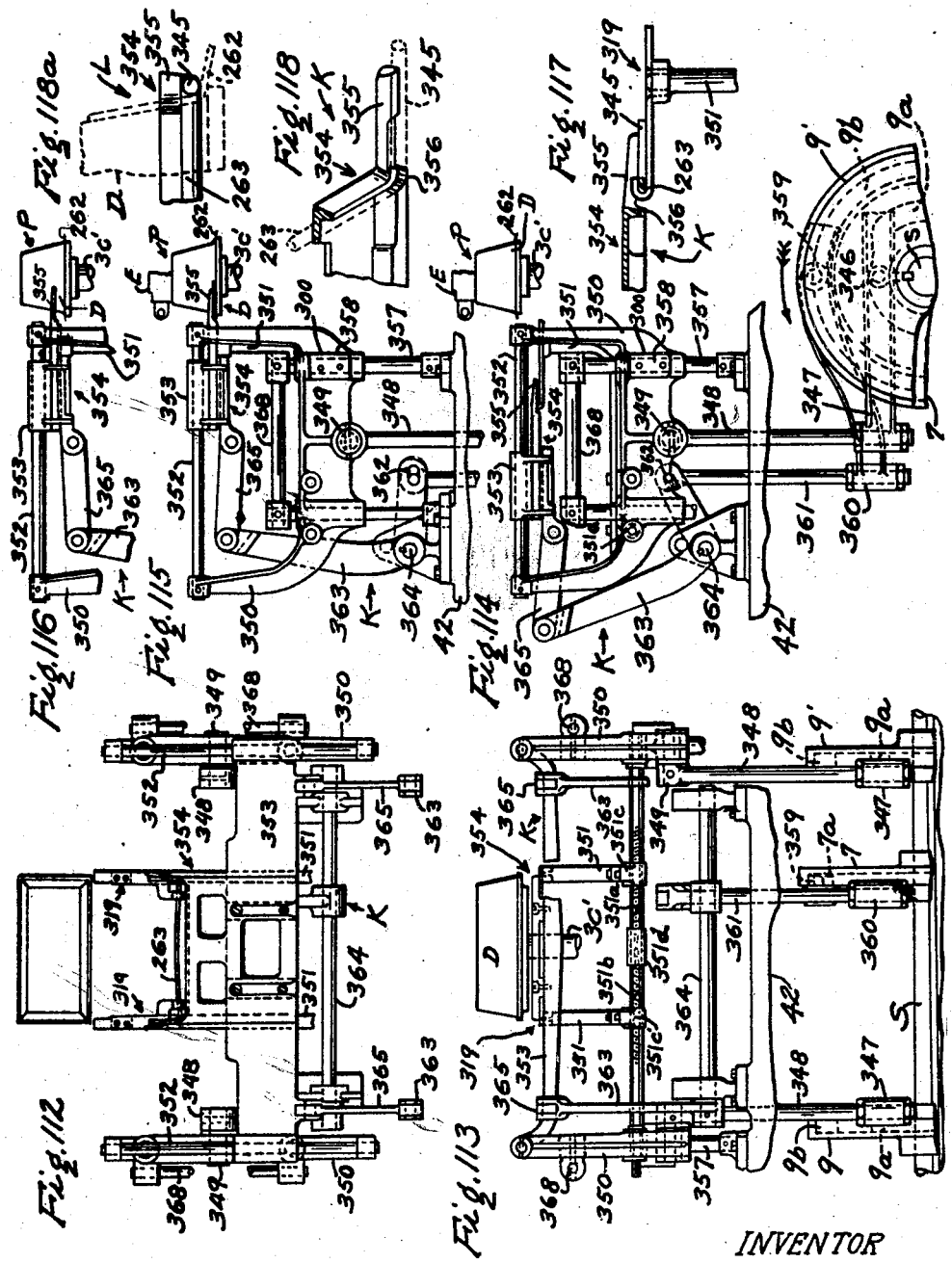

April 19, 1927.
W. J. ROEPKE
1,625,502
AUTOMATIC PAN MAKING MACHINE
Filed April 22, 1926   28 Sheets-Sheet 26
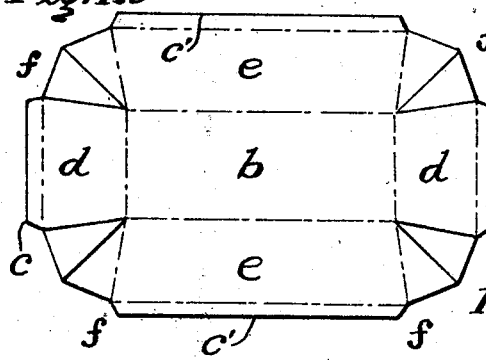
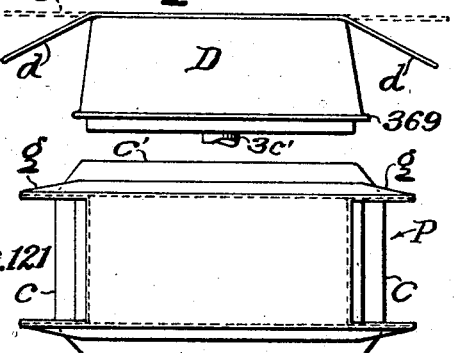
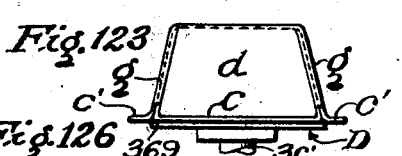
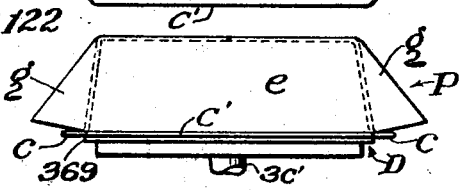
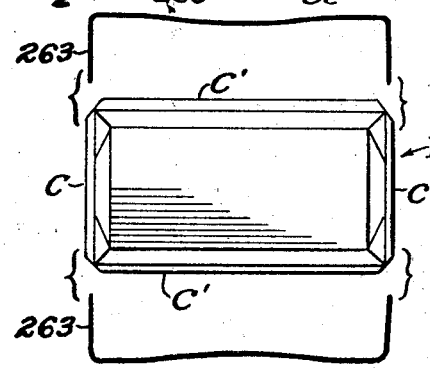
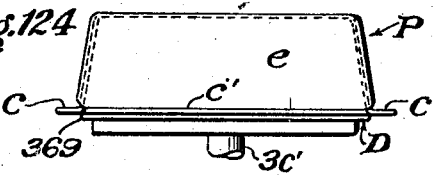
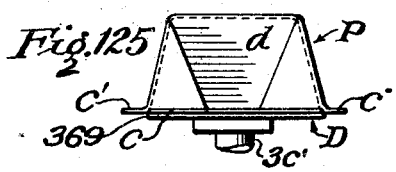
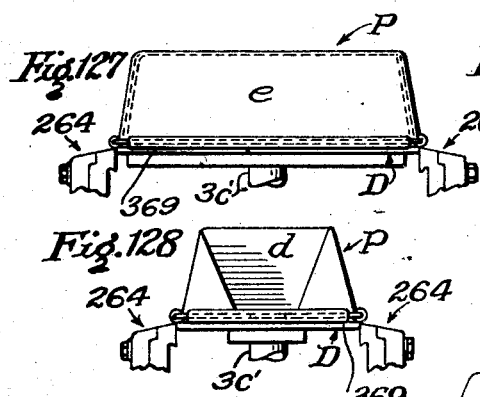
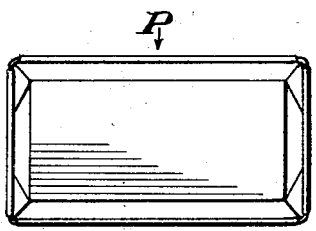
Inventor
William John Roepke
by James R. Townsend
his atty
Witness

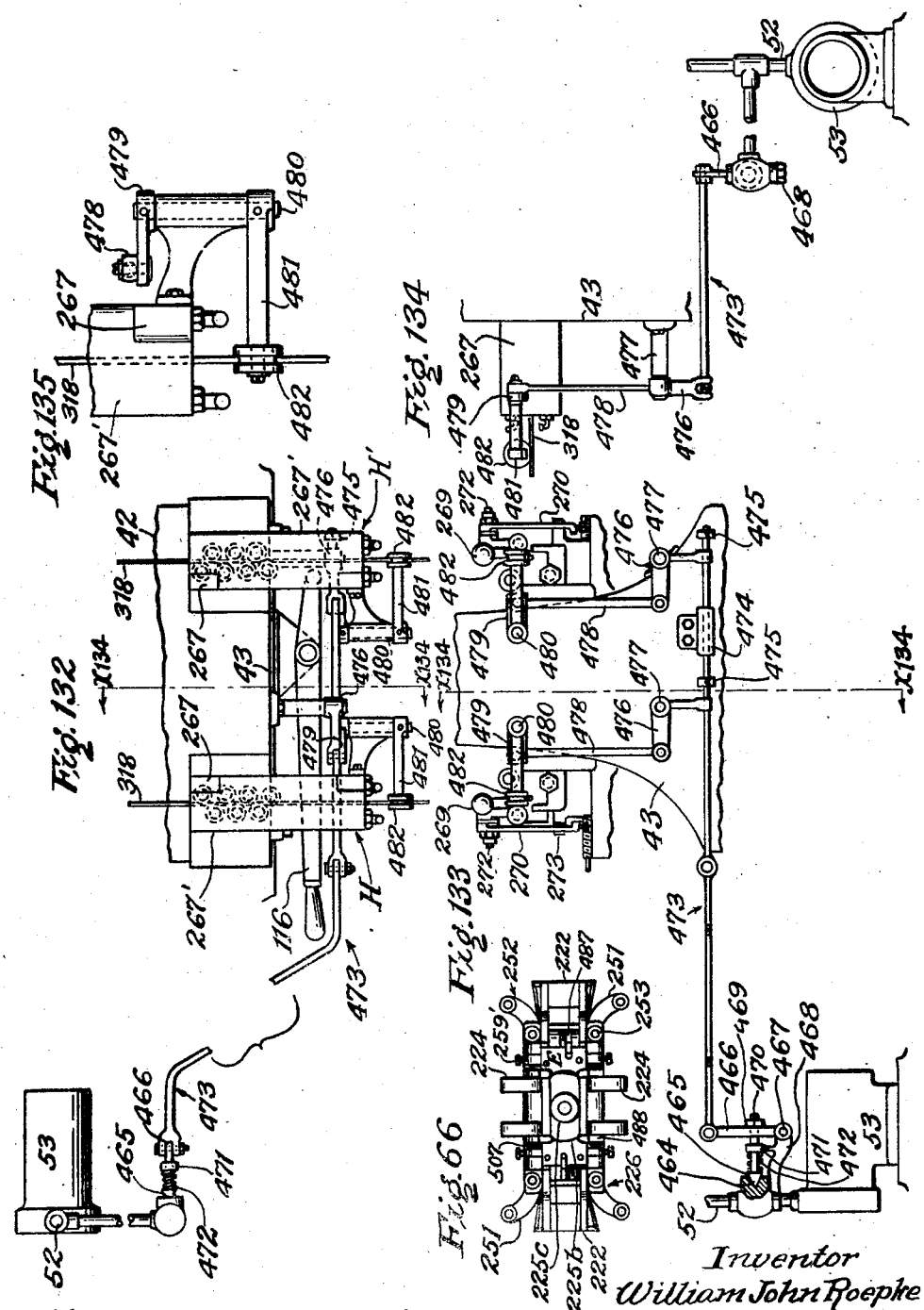

Patented Apr. 19, 1927.

1,625,502

UNITED STATES PATENT OFFICE.

WILLIAM JOHN ROEPKE, OF LOS ANGELES, CALIFORNIA, ASSIGNOR, BY MESNE ASSIGNMENTS, TO ROEPKE PAN MACHINE CORPORATION, OF WILMINGTON, DELAWARE, A CORPORATION OF DELAWARE.

AUTOMATIC PAN-MAKING MACHINE.

Application filed April 22, 1926. Serial No. 103,930.

This invention relates to a machine in which automatic means are provided for making pans from flat blanks of sheet material by successively bending and folding such blanks into pan form and also includes means for reinforcing the pan rim with wire onto which such rim is bent, and provision is also made for ejecting the completed pan from the machine.

Means are provided whereby the pans are made in rapid succession without interruption and without manual operations from blanks taken singly in succession from a bunch of blanks placed in the machine, and provision is also made for forming the reinforcements of the rims of the pan from rolls of wire.

The invention includes the machine and the parts and combinations of parts hereinafter described and particularly pointed out in the claims.

In this invention the wire rimmed pans are made in rapid succession without interruption, and without manual operations, from blanks taken singly in succession from a bunch of blanks placed in the machine; thus forming from bunches of flat sheet material blanks, and rolls of wire supplied by an attendant, bread pans, dripping pans, roasting pans, ash pans, boxes and other receptacles for various uses.

In this description the terms end and side are used to indicate angular boundaries without reference to relative length or breadth.

An object of the invention is to insure constant operation of the machine for long periods of time without likelihood of stoppage or mechanical trouble.

An object is great rapidity in the production of pans of folded sheet material.

An object is to provide practical automatic means for making a wire-reinforced pan from flat sheet metal and continuous wire, which sheet metal is bent and folded, and its edges crimped over sections of the wire in the machine by a succession of operations.

An object is to increase the speed of producing deep sheet metal pans and to avoid the stretching and thinning of the metal which occurs in the manufacture of pans by drawing and pressing processes.

An object is to provide a machine by which the pans are made by progressive operations, all of which are automatic and in which there are no interruptions of the machine or of operations upon the material, from the time the blank or sheet is started on its way through the machine until the finished pan is discharged, and so on continuously.

I have discovered that it is possible to automatically fold a blank of sheet material into the form of a pan with corner folds folded onto the pan walls, by providing in combination, a blank supporting form, and an abutment to which the blank may be clamped by the form, a pair of end folding flaps, a pair of compound side wall and corner loop folding flaps co-operating therewith; each compound flap comprising a side wall folding flap having a pair of corner loop folding flaps hinged thereto; mechanism by which the form is made to clamp the blank against the abutment with edge portions of the blank projecting from the abutment; and mechanism whereby like pairs of flaps are operated simultaneously with respect to each other, and unlike pairs of flaps are operated successively with respect to each other, to fold the projecting portions of the blank onto the form to form the ends and sides of the pan; the pairs of end and side folding flaps being operated successively in the order named, and the corner folding flap, finally, in the folding operation; the corner flap members of said compound flaps being arranged to fold over upon the pan walls, the folds of material formed at the corners of the pan by the folding operation of said pairs of end and side folding flaps.

The invention includes the means provided for operating the flaps and other parts.

The invention is broadly new, basic and pioneer in that I have produced a combination whereby at the first revolution of the machine properly supplied with bunches of blanks and wire, the whole work of bending and folding a blank to pan form, cutting, bending and applying the wire to the pan rim, and finishing the pan, is effected; and at the second, and every succeeding revolution, so long as the supply of wire and blanks is maintained, a pan is finished and ejected.

I have made it possible to produce sheet metal pans at a high speed by providing a blank stopping abutment in one plane, a rim-wire guide and pan support in a plane parallel to the plane of the abutment, and at a depth therefrom slightly greater than the depth of a pan, means to move a blank edgewise and to locate it in an intermediate plane, a form onto which the blank is to be folded to form the pan, means to move the form through the plane of the rim-wire guide and pan support; and through said intermediate plane, and to thereby move the blank to, and clamp it against the abutment; means to fold the blank onto four sides of the form to make a pan having its bottom against the abutment, and having its open end in engagement with the pan support, and means whereby the rim of the supported pan is bent outwardly onto such support ready to receive the rim-wire to stiffen the rim of the pan.

The invention is broadly new, basic and pioneer in many particulars among which the following are prominent, viz, it provides a stationary abutment and a reciprocating form for clamping that portion of the blank which is to form the bottom of the pan, and hinged flaps for bending down and folding the other portions of the blank onto the ends and sides of the form to form the ends and sides of the pan, and to give the set necessary to make the pan hold its form; and makes provision whereby wire is drawn from rolls or bundles and as the wire passes to the pans, is straightened, cut to proper length and formed into sections adapted to wire the pan rim; and means are provided whereby a blank is placed with the portion thereof which is to form the bottom of the pan, at rest adjacent the stationary abutment, and the form forces the blank toward and against the abutment and there clamps the portion of the sheet that is to form the pan bottom, and mechanical means are provided to fold the projecting edges of the sheet to form the ends, sides and corners of the pan around the form while the form and abutment are stationary; and the pan is then supported and the form withdrawn so that the time required for producing the pan is minimized; the reinforcing wire is straightened, cut and bent inside the machine and brought into position in opposite sections to embrace the pan at the place where the rim of the pan is to be folded over.

Means are provided whereby the wire for reinforcing the edges of the pan is taken from two rolls, cut off into lengths, each substantially equal to half the perimeter of the pan, and each length is bent into U or L-shape and after the blank has been bent into pan form, the wire is applied on opposite sides of the pan to the walls of the formed pan; and then the edges of the pan are bent over the wire.

Means are provided whereby the wire introducing mechanism is started into operation by the passing blank, and is operable only while a blank is passing through the machine.

The compound side and corner folding hinged flaps fold the corner loops after the blank is folded upon four sides and while the bottom portion and the side walls of the pan are clamped tightly, thus insuring a true bottom and true walls.

Means are provided whereby the folding is accomplished downwardly by flaps that fold down toward the sides of the form in order to form the pan, thus bringing the rim of the pan onto the top of a support so that by releasing the pan and withdrawing the form the pan is free to be expelled from the machine.

An object is to provide a type of machine which may be adapted to make either a straight walled pan or box or a flaring pan or box out of a single type of blank, by simply making a change with respect to the form and the set of folding means pertaining thereto.

An object is to provide a type of machine which is applicable to the manufacture of either straight walled or flaring wire rimmed pans or boxes, and in which the change from one form of pan to another may be effected by removing the form and the set of bending, folding and wiring mechanisms appropriate thereto and substituting therefor another form and its appropriate set of mechanisms, and adjusting other parts.

An object of the invention is to so construct the machine that it will automatically adjust itself as required for operation upon blanks of somewhat different thicknesses.

An object is to make provision whereby a run of pans from one thickness of blank stock can be immediately succeeded by a run of pans from stock of somewhat greater or less thickness, without requiring any alterations of the machine by hand, or any attention of the operator; and to provide for quick adjustment of parts to change from one run of blanks to another considerably differing therefrom in thickness.

An object is to automatically produce sheet metal pans with true flat bottoms and sides so that baking pans will sit flat on the bottom of the oven.

An object is to insure proper placing of the blanks and wires and to avoid supplying any wire unless a blank to be bent into pan form with flanges ready to receive the wiring has first been introduced.

The numerous novel parts, combinations, and sub-combinations of the machine are all co-operative to effect the automatic production from sheet-like blanks and wire rolls, a series of pans, each of which is discharged from the machine at a certain movement of mechanism that is adapted to place a blank in position to be acted upon by the blank folding mechanism.

The invention includes a blank carrier comprising separated grips to take hold of opposite edges of a blank, rails on which the grips run, and means whereby the rails are intermittently spread apart, thus shifting the grips so that they will not strike the blank bending flaps or folders when the blank carrier is on the return stroke, thereby permitting high speed of operation and slow carrier return to blank receiving position, and allowing a succeeding blank to be supplied to the carrier while the preceding blank is being wired.

I have provided an adjustable pan rim support comprising parts of a rim roll mechanism so as to allow room for adjusting the machine to a greater variety of sizes; and have provided an adjustable magazine for containing a pile of blanks cut to size, and adjustable means adapted to avoid feeding more than one blank at a time.

I employ cam wheels with cam grooves; and rollers or followers that operate push rods; and means are provided for convenience in removing and replacing the push rods and in removing and replacing any of the followers without disturbing the cam shaft, or displacing other cam followers.

I have also provided means for locking the form in raised position, to divert the folding force from the form operating cam follower to the frame of the machine.

I have arranged means for cutting and bending the rim wires below the pan forming level, and for then raising the bent wire into the path of wire locating and holding arms so as to avoid any interference of the wire with the blank carrier, thereby allowing the wire to be placed accurately and allowing the blank carrier to start and to return sooner to engage the succeeding blank with minimum speed and without loss of time.

Means are provided to slow down the blank carrier at the starting and stopping of each stroke so that shock is minimized without time loss.

The machine is adapted by alternative means for making wire rimmed and non-wired pans.

A suction or vacuum arrangement is provided for taking blanks flatwise from a magazine, and feeding the blanks to the carrier, and means are provided in the pan wiring arrangement whereby the suction may be broken and blank feeding stopped whenever wire feeding stops, thus automatically avoiding accidental manufacture of non-wired pans when the machine is set for making rim wired pans.

An object is to make provision whereby the advance blank is positively moved to break adhesion with the succeeding blank and is invariably brought to the true clamped position between form and abutment.

An object is to positively insure the feeding of only one blank at a time.

Other objects are certain placing of the rim roll wire on the rim flange; certain clearance for ready ejection of the finished pan; true alignment of the corner loops with the side walls so as to insure sharp and smooth folding; and inexpensive stamping of numbers or letters on a pan wall at the time of manufacture.

Other objects, advantages and features of invention may appear from the accompanying drawings, the subjoined detail description and the appended claims.

The invention is not limited to the specific construction shown, and it is understood that forms of embodiment other than those shown may be employed without departing from the invention or from the principles herein disclosed, and embodied in the mechanism herein set forth and claimed.

In the following description the end of the machine into which the sheet metal blanks are fed is called the front of the machine, and the blanks are said to move back from such front to the rear; and the finished pan is said to be ejected rearwardly at the back or rear of the machine.

The accompanying drawings illustrate the invention.

Figure 1 is a fragmental plan of the machine with parts in position after the suction feed has deposited a blank on the blank carrier and the grips have gripped said blank to the carrier; the magazine and parts of the right hand blank-gripping and releasing mechanism are omitted to expose parts that would be hidden thereby; and other portions of the machine are broken away from the main part of the view, and included therein by brackets.

Fig. 1ª is a reduced diagrammatic plan of the framing of the machine, omitting the operating parts.

Fig. 2 is a fragmental elevation looking rearward showing parts of the machine that are at the rear of different vertical planes mainly indicated by irregular lines $x^2$—$x^2$, Figs 1 and 4, with cams and pan forming mechanism in the position shown in Figs. 1 and 3; the four single cam wheels 1, 2, 3 and 7, and the five pairs of duplicate cam wheels 4, 4', 5, 5', 6, 6', 8, 8' and 9, 9' are fragmentally shown to contract the view; some of the parts acted upon by the cams of the several cam wheels for feeding, folding, wire bending, wiring and ejecting, are shown in elevation; the gripping mechanism and other parts are omitted to avoid confusion; the housing is broken to expose some of the other parts; and the lower portions of the upper cam case, together with the indicator and the counting mechanism are shown in section.

Fig. 2ª is a reduced diagrammatic front elevation of the framing of the machine omitting the operative parts.

Fig. 3 is a diagrammatic face view of the several cam wheels detached and at the position of the machine shown in Fig. 2 to begin folding a blank; the cam grooves are approximately shown, and the locations of the cam rollers or followers therein are indicated. Arrows on the several wheels indicate the direction of rotation of such wheels respectively. The inner faces, that is, right sides of cam wheels 1, 8, 9, 4, 5, 6 and 2, and the left sides of cam wheels 3, 7, 8', 9', 4', 5' and 6' are shown.

Fig. 3ª is a developed plan of the rim of cam wheel 3 showing the peripheral cam grooves and the follower for operating the form stay or lock.

Fig. 4 is a fragmental elevation of the machine from the right of Figs. 1 and 2, the parts being in initial or starting position, with the vacuum arm of the blank feeding mechanism up, instead of down as in Fig. 1; the power belt and pulleys and the vacuum pump are indicated in broken lines, but the power connections of the pump shown in Figs. 25 and 32 are omitted.

Fig. 4ª is a reduced diagrammatic right side elevation of the framing of the machine, omitting the operative parts.

Fig. 4ᵇ is a view analogous to Fig. 4ª looking at the left side of the machine.

Fig. 5 is a diagrammatic reduced rear elevation of the framing of the machine, omitting the operative parts.

Fig. 6 is a fragmental rear elevation partly in section on line $x^6$, Fig. 4, looking toward the front to show parts of the rail spreading mechanism, one of the vertical shafts of the release mechanism, and the pan track, without the supports therefor; and some fragments of the machine are shown in rear elevation.

Fig. 7 is a fragmental front elevation partly in section on line $x^7$, Fig. 1, showing the blank magazine and the blank feeding mechanism with the vacuum arm up.

Fig. 8 is a plan of one of the overhanging blank top retaining arms of the magazine.

Fig. 9 is a left side elevation of said arm mounted on its support bar.

Fig. 10 is a plan of the vertically adjustable slide for supporting said bar.

Fig. 11 is a left side elevation of said slide.

Fig. 12 is a side view of the upper member of one of the adjusting screws for the blank top retainer slides shown in Figs. 10 and 11.

Fig. 13 is a side view of the lower member of such adjusting screw.

Fig. 14 shows end and side views of the coupling for the adjusting screw members, shown in Figs. 12 and 13.

Fig. 15 shows in left side and front elevations, one of the blank retaining devices of the vacuum arm.

Fig. 16 shows in left side and front elevation one of the retainers for the lower edges of the blanks.

Fig. 17 is an enlarged plan of one of the blank supports of the magazine, detached from its bar and omitting its binding bolt.

Fig. 18 is a side elevation of said blank support detached.

Fig. 19 is a section on line $x^{19}$—$x^{20}$, Fig. 17, of one of the lower blank supports clamped to its bar; fragments of a number of blanks are in place on the spring that is provided for supporting the blank that stands ready to be depressed by the vacuum arm to release the top thereof from the retainer shown in Figs. 7 and 26—30.

Fig. 20 is a fragmental section on line $x^{19}$—$x^{20}$, Fig. 17, showing a fragment of one blank and a fragment of the vacuum arm depressing such blank to release it from the top blank holders, shown in Figs. 7, 17 and 26—30, other blanks are shown supported on the lower blank support.

Fig. 21 is an enlarged fragmental detail of the depressed blank and the blank spring and retainer in the position shown in Fig. 20.

Fig. 22 is a fragmental view showing the discharging end of one of the blank supports.

Fig. 23 is a section on line $x^{23}$, Fig. 18, looking toward the discharging end of the blank support.

Fig. 24 is a front end elevation of the blank support shown in Figs. 17 and 18.

Fig. 25 is a fragmental elevation of the left side of the blank feeding assembly, the right side of which is shown in Fig. 4; the vacuum arm is shown in position grasping a blank to move the same from the blank magazine to the carrier, a fragment of which is shown; the vacuum mechanism is indicated up in outline and down in broken lines.

Figure 130:
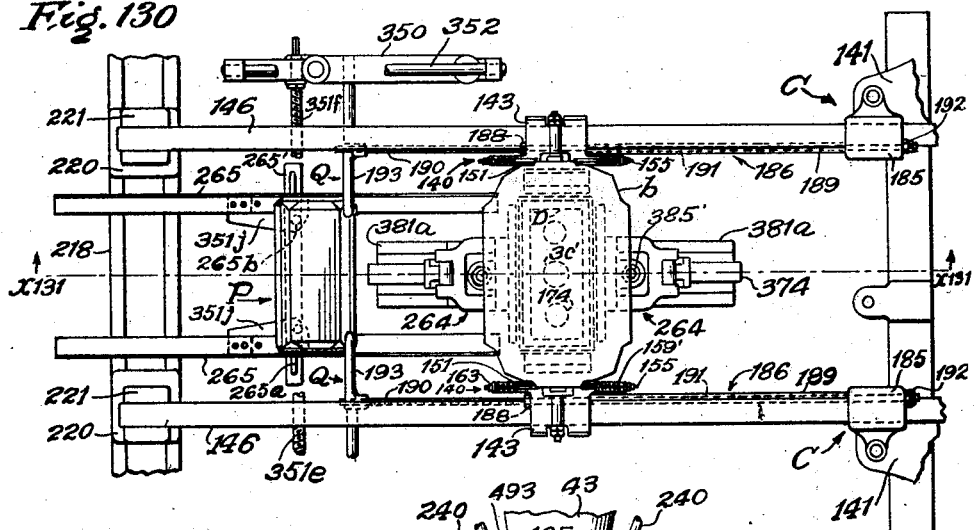

Fig. 25ª is a cross section of the blank magazine on line $x^{25a}$, Fig. 25, showing also the overhanging blank retaining arms and their adjusting nuts and screws.

Fig. 26 is an enlarged fragmental detail showing the vacuum arm in its first, or blank grasping, position; a blank back-stop and follower is also shown as used to hold in position one or more blanks at the close of a run.

Fig. 26ª is an enlarged detail of the blank latch shown in Fig. 26.

Fig. 26ᵇ is a side elevation of Fig. 26ª.

Fig. 27 shows the second or blank lowering position of the vacuum arm, at the moment of moving the blank into the blank receiving slots in the bottom blank supports of the magazine.

Fig. 28 shows the third position of the vacuum arm, drawing the blank outward at the top to clear the upper overhanging blank retainer.

Fig. 29 shows the fourth position of the vacuum arm at the moment of raising the blank from the slot at the angle it is moved into just before removal from the magazine.

Fig. 30 shows the fifth position of the vacuum arm just after it has drawn the blank from the blank magazine fragments of which are shown with a succeeeding blank in place.

Fig. 31 is a fragmental plan of the blank transferring assembly with vacuum arm at rest in position for placing a blank on the carrier, both blank and carrier being omitted to avoid confusion of lines.

Fig. 32 is an elevation of the assembly shown in Figs. 25 and 31, and shows the vacuum mechanism on the same side as Fig. 25, and in the same position as in Fig. 31; the piston, vacuum cylinder and hose are also indicated.

Fig. 33 is a fragmental front elevation of the blank separating assembly shown in Figs. 25, 31 and 32; the parts being in the position shown in Fig. 32.

Fig. 34 is a fragmental plan in section on line indicated at $x^{34}$, Fig. 32, showing the levers for the vacuum controlling mechanism.

Fig. 35 is an enlarged fragmental detail, partly in section, of the vacuum arm and the vacuum cups with passages for exhausting the air, and showing the vacuum releasing valve in open position. A blank is shown in place ready to be centered on the carrier, not shown.

Fig. 36 is a fragmental plan view of the blank centering mechanism in closed position, omitting the blank.

Fig. 37 is a fragmental elevation partly in section on line $x^{37}$, Fig. 36.

Fig. 37ª is a fragmental section elevation on line $x^{37a}$, Fig. 36.

Fig. 38 is a fragmental side elevation of Fig. 37ª showing a fragment of the vacuum arm with a spreader wedge spreading apart the jaws of a centering unit; a fragment of the blank is also shown.

Fig. 38ª is a cross sectional detail of the spreader abutment of one of the blank holding jaws.

Fig. 39 is a view analogous to Fig. 38 showing a fragment of a central blank in position just after the vacuum arm wedge has released the blank centering device and allowed it to close against and over the blank. A fragment of the vacuum arm is also shown.

Fig. 40 is a fragmental elevation partly in section on line $x^{40}$, Fig. 1, showing a fragment of the blank and a fragment of the vacuum arm with the spreader wedge forcing outward the centering jaws, and depositing the blank between them.

Fig. 41 is a view analogous to Fig. 40, showing a fragment of the blank in centered position, and a fragment of the vacuum arm just after passing through and allowing the blank to be centered by the centering mechanism.

Fig. 42 is a fragmental plan of the left side of the machine, showing the left hand assembly of the blank carrying and placing mechanisms at the moment the carrier has deposited a blank over the form, which is shown in broken lines. The position of the blank and part of the carrier at the moment the blank is received by the carrier, is indicated in dot and dash lines, the rail spreading mechanism is shown at the moment before spreading the carrier supporting rails to withdraw the centering jaws from the blank after the form has clamped the blank against the abutment.

Fig. 43 is a fragmental side elevation projected from Fig. 42.

Fig. 44 is a fragmental plan, partly in section, showing parts of the rail spreading mechanism in rail spreading position; and one of the rails and also part of the blank carrying and placing mechanism, with blank in place on the form; fragments of the cam shaft and three of the cam wheels are also shown.

Fig. 45 is a fragmental side elevation projected from Fig. 44. Some of the hidden parts are indicated in broken lines.

Fig. 45ª is a fragmental plan in section on line $x^{45a}$, Fig. 45.

Fig. 46 is a fragmental elevation of the frame with blank folding mechanism partly in section on line indicated at $x^{46}$—$x^{51}$, Fig. 1, and illustrating the position of parts while holding a blank preparatory to bending the same down onto the form.

Fig. 47 is a fragmental plan in section on an irregular plane indicated by line $x^{47}$—$x^{47}$, Fig. 46, illustrating the blank folding mechanism, and omitting the frame and all of the flap operating rods, except those for the corner flaps.

Fig. 48 is a detached plan of the abutment and flaps shown open as in Fig. 47.

Fig. 49 is a fragmental detail in elevation and partly in section on the vertical axial plane of the cams, and showing dis-assembly of a cam push rod roller or follower and bearing for removal from the cam and cam case.

Fig. 50 is a fragmental elevation mainly in section on line $x^{50}$, Fig. 46, looking left in the direction of the arrow, and illustrating a part of the folding mechanism and means for adjusting the height of the abutment for making pans of different depths; the side flaps and the means for adjustably connecting the same to their operating crosshead are shown up; one of the cams and its push rod for operating the end flap crosshead is shown, and also one of the cams for the cross-beam that operates the end flaps.

Fig. 51 is an enlarged mid-sectional detail of the abutment adjusting means to raise and lower the abutment or center piece to which the blank folding flaps are hinged.

Fig. 52 is fragmental elevation showing parts of the folding mechanism with the end folding flaps started to fold the ends of the blank while the other flaps are inactive; one of the end folding flaps is shown partly in section; one of the corner folding flaps is shown.

Fig. 53 is a fragmental detail partly in section showing an end flap operating connection, together with fragments of the form and the abutment thereon.

Fig. 54 is a plan detail of one of the end flaps.

Fig. 55 is an end view of said end flap.

Fig. 56 is a fragmental elevation of the frame with the folding mechanism in position with the end and side flaps folding the blank on the form, and the corner flaps out of action.

Fig. 56$^a$ is a plan of the folder in section through the abutment and the knuckles of the end and side flap hinges with side flaps in place; the knuckles for the corner flaps are shown intact.

Fig. 56$^b$ is a developed elevation of the abutment shown in Fig. 56$^a$ with the hinge knuckles in vertical section to show the relative planes and position of the pins.

Fig. 57 is a plan of the folder detached with parts in position shown in Fig. 56.

Figs. 58 and 59 and 60 are fragmental plan details illustrating different positions of the corner flap folding connection, and the automatic adjustment for different thicknesses of blank.

Fig. 60$^a$ is a fragmental elevation of the inner face of one of the side flaps.

Fig. 61 is an elevation from an irregular plane and partly in section on line $x^{61}$, Fig. 56, and partly in axial section, and looking to the left in the direction indicated by the arrows on said line $x^{61}$; omitting the corner flaps and their mechanism and indicating the end and two side flaps as fully closed and also their operating rods; fragments of the cam rod for the form, the cam rod for the end flap and the cam rod for one of the side flaps are shown.

Fig. 61$^a$ is a plan of the guide and packing of one of the cam rods to exclude scale from the cams.

Fig. 62 is an enlarged fragmental horizontal section on line $x^{62}$, Fig. 61, of the parts behind the end flap connecting rod which is shown not sectioned in said Fig. 61.

Fig. 62$^a$ is an enlarged fragmental detail showing an end flap and a side flap in process of forming a corner fold at the junction of the side and end walls; the side flap is shown in cross section.

Fig. 63 is an enlarged fragmental detail mainly in axial section showing a locking device for locking the form push rod, which is shown unlocked.

Fig. 64 is a view analogous to Fig. 63, showing the form locking device in position to support the form during the blank folding operation.

Fig. 65 is a view analogous to Figs. 46, 52 and 56, showing the end flaps up, the side flaps down, and the corner flaps folded on the partly formed pan; part of the right corner flap rod is broken away to expose the right end flap.

Fig. 66 is a plan of the folder in the position shown in Fig. 65; the ends flaps being up and side flaps down, and the corner flaps in.

Figure 67:
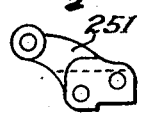

Fig. 67 is a view of the connecting lever of the corner folding flap.

Figure 68:

Fig. 68 is a view of said lever from the right of Fig. 67.

Figure 69:
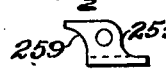

Fig. 69 is a side elevation of the corner flap detached from the lever shown in Fig. 67.

Fig. 69$^a$ is a plan view of Fig. 69.

Figure 70:

Fig. 70 is a view of a corner folding flap looking at the right of Fig. 69.

Fig. 71 is a detail in vertical longitudinal section of the adjustable corner flap operating push rod shown at the left side of Fig. 65.

Fig. 72 is a fragmental elevation in section on line $x^{72}$, Fig. 65, showing the end flaps up, side flaps down, and the corner flaps folded.

Fig. 72$^a$ is a plan view of the side flap operating cross-head.

Fig. 72$^b$ is a detached plan of the abutment and flaps, shown in open position. The hold-down fingers are shown in dotted lines, and the lock ring that holds the fingers in place is also shown.

Fig. 72$^c$ is a fragmental detail partly in section showing the side flaps and hold-down fingers in position after the pan has been folded. The wire placers and holders are shown with the wire just before placing it in position on the pan, and the rim-former jaws are also shown.

Fig. 72$^d$ is a fragmental side elevation partly in section showing the end flaps and hold-down fingers in position after the pan has been folded and showing the lock ring holding the fingers in locked position; the wire placers and holders being omitted in this view.

Fig. 72ᵉ is a view analogous to Fig. 72ᶜ showing the wire placers and holders placing the wire in position. The hold-down fingers are shown in place holding the wire placer and holder arms in position while the rim-formers complete the upward stroke.

Fig. 72ᶠ is a fragmental detail showing a method of raising the locking ring, with the flaps, also retracting the fingers should the spring be lacking or fail to operate.

Fig. 72ᵍ is a view analogous to Fig. 72ᶜ showing the side flaps, hold-down fingers, and locking ring in the rest position. The completed pan is shown just as the rim-former jaws have finished their work.

Fig. 72ʰ is an enlarged fragmental plan detail of the hold-down finger and its retracting spring in the position shown at the right of Fig. 72ᵇ.

Fig. 72ⁱ is an enlarged fragmental sectional detail of the locking and operating mechanism for the fingers that hold down the wire placers and holders while the pan rim is being bent up to receive the wire.

Fig. 72ʲ is a perspective view of the lockring tilted to show the under side.

Fig. 73 is a plan view of the form and the adjustable pan rim support and rim roll mechanism shown in Fig. 74, and the four cams for operating such mechanism.

Fig. 73ᵃ is a reduced plan of the base for carrying the rim support and rim-roll jaw.

Fig. 74 is a fragmental front elevation, partly in section on line $x^{74}$, Fig. 73, showing the form and adjustable pan rim support and rim roll mechanism and connections thereof to the cam shaft; a blank is shown clamped by the form against the abutment, a fragment of which is shown.

Fig. 74ᵃ is a reduced plan of the rim roll operating spider.

Fig. 75 is a fragmental elevation projected from the right end of Fig. 74, and partly in section on line $x^{75}$, Fig. 74.

Fig. 75ᵃ is a fragmental elevation showing the position of the rim roll jaws after almost a full cycle of the machine subsequent to the position shown in Fig. 75.

Fig. 76 is an enlarged fragmental detail in elevation from the right of Figs. 73 and 74, showing the cooperating parts of the rim roll mechanism.

Fig. 77 is an enlarged fragmental elevational detail in section on line $x^{77}$, Fig. 76; showing the form and one of the pan rim supports and rim rolls; and a fragment of the wire holder.

Fig. 77ᵃ is an enlarged fragmental plan of the central part of the form shown in Fig. 77.

Fig. 78 is an enlargement of a part of Fig. 77, showing portions of the pan rim rolling and supporting mechanism, and a fragment of the form with pan in position for its rim to be rolled over the rim wire which is shown in place.

Fig. 79 is a fragmental elevation of the mechanism indicated in Fig. 77, showing a second position of the pan rim rolling and supporting mechanism; and the rim wire holder which is shown in section.

Fig. 80 is an enlarged fragmental view partly in section showing said second position of the wire holder and the rim rolling and supporting mechanism.

Fig. 81 is a detail of the rim rolling mechanism in a third position showing the rim of the blank folded against the wire holder with the wire in the angle between the rim and the outside of the body of the pan.

Fig. 82 is an enlarged fragmental sectional detail or parts in position shown in Fig. 81.

Fig. 83 is a fragmental elevation analogous to Figs. 79 and 81, showing the fourth position of the rim rolling mechanism in which the folder has rolled the rim around the wire.

Fig. 84 is an enlarged fragmental detail partly in section, illustrating the final rolling position shown in Fig. 83.

Fig. 85 is a fragmental detail showing the completed pan supported by the rim support and roller, after the form is retracted from the pan supporting position indicated in broken lines, and the pan is supported by the tools that constitute the pan rim support and roll.

Fig. 85ᵃ is an enlarged fragmental elevational detail partly in section showing the form and one of the temporary pan supports, and a fragment of the rim-former.

Fig. 85ᵇ is a fragmental elevation of the mechanism indicated in Fig. 85ᵃ, showing the form in a lowered position. One of the temporary supports is shown supporting the pan just before the rim-former jaw comes into position under the pan rim. The temporary support latch is also shown.

Fig. 85ᶜ is a fragmental detail showing a face view of the latch shown in Fig. 85ᵇ.

Fig. 85ᵈ is a fragmental elevation of the mechanism indicated in Fig. 85ᵇ, showing the form forcing the temporary support down past the latch, and a fragment of the rim-former supporting the pan.

Fig. 85ᵉ is a fragmental detail showing the pan supported by the rim-former jaws after the form has been completely lowered; a fragment of the temporary support is also shown.

Fig. 85ᶠ is a perspective view of a completed non-wired pan.

Fig. 86 is a broken plan of the mechanism for drawing in, straightening, curving and measuring one of the lengths of wire for embracing the pan rim; a portion of the frame is shown in section.

Fig. 86ª is an enlarged fragmental plan of the wire introducing mechanism partly in section to show the hinge pin adjustment for producing a slight curve in the wire convex toward the form and pan, which are not shown in this view.

Fig. 87 is a fragmental side elevation of the wire drawing rolls and the wire straightening rolls shown in Fig. 86, omitting the major portions of the adjustment screws for the wire cutters and benders, and showing the wire drawing and straightening means as in operation at the moment before the wire operates the trips; pins of six of the wire straightening rollers are indicated in dotted lines and other pins of said rollers are omitted to avoid confusion of lines.

Fig. 88 is an elevation in section on line $x^{88}$, Fig. 87, looking in the direction of the arrows.

Fig. 89 is a fragmental elevation from the right, of the upper part of Fig. 87; the wire table or guide is omitted from the view to avoid confusion of lines.

Fig. 89ª is a view of parts shown in Fig. 89 with the hinged roller block in open position.

Fig. 90 is a view analogous to a part of Fig. 87, and indicates the positions of parts when the predetermined length of wire has been fed through and straightened and the wire drawing clutch has been released.

Fig. 91 is a view analogous to Fig. 87, showing the wire drawing roller lifted off the wire.

Fig. 91ª is a fragmental plan view in section on line $x^{91a}$, Fig. 91, showing the mounting of the levers that carry the movable wire drawing rollers.

Fig. 92 is an elevation on enlarged scale in section on line $x^{92}$, Fig. 87, showing the mechanism for oiling the wire straightening roller bearings.

Fig. 93 is a view analogous to Fig. 92, viewed from irregular line $x^{93}$, Fig. 87.

Fig. 94 is a fragmental view partly in section of the bevel gear drive mechanism for operating the wire drawing and feeding rolls.

Fig. 95 is an enlarged view of the wire drawing and straightening rollers partly in section on line $x^{95}$, Fig. 91.

Fig. 96 is an elevation partly in section on line indicated at $x^{96}$, Fig. 95, showing one of the wire drawing rollers on its spline shaft, gripping a wire on a stationary roller, a fragment of which is shown.

Fig. 97 is a fragmental plan showing the blank operated trip for the wire release mechanism, and a fragment of the frame.

Fig. 98 is a side elevation projected from Fig. 97, showing a blank depressing the wire release finger.

Fig. 99 is an end elevation looking from the left of Fig. 98, omitting the blank.

Fig. 100 is a side elevation of parts shown in Fig. 98; the wire release finger and other mechanism being shown in the position to which the same have been moved by a blank carried by the vacuum arm from the magazine to the blank carrier, not shown; a blank and a fragment of the vacuum arm being shown.

Fig. 101 is a fragmental detail showing the wire release finger and vacuum arm in wire rest position after the vacuum arm without a blank has passed said finger.

Fig. 101ª is a plan of what is shown in Fig. 101.

Fig. 102 is a side elevation of one of the wire cutting mechanisms in position just before cutting a wire.

Fig. 103 is a fragmental detail analogous to Fig. 102, showing the position of the parts after a wire has been cut.

Fig. 104 is a fragmental detail on enlarged scale of the wire cutting mechanism just after cutting a wire, which is shown.

Fig. 105 is an elevation of the wire bending mechanism partly in section on line $x^{105}$, Fig. 107; the cam roller for the rim roll mechanism is also shown in place in its cam groove.

Fig. 106 is a fragmental plan of the mechanisms for cutting off and bending a wire length after the wire has been drawn through the straightener and into the machine.

Fig. 107 is a fragmental side elevation of the wire bending mechanism shown in Fig. 106, the cutting mechanism being omitted.

Fig. 108 is an enlarged fragmental plan detail showing one of the four wire bending mechanisms and the wire in place before the wire is bent.

Fig. 108ª is a fragmental view showing in elevation an end of a wire section guide on one of the wire section benders; portions of the bender, table and wire section are also shown.

Fig. 108ᵇ is a fragmental plan view of parts shown in Fig. 108ª.

Fig. 109 is a fragmental plan detail showing a portion of said bending mechanism at the beginning of the wire bending operation with wire in place.

Fig. 110 is a fragmental plan partly in section on line $x^{110}$, Fig. 105.

Fig. 110ª is an enlarged plan detail of a modification of a part of Fig. 110, showing the adaptability of the mechanism to bend a wire at an acute angle to give set to a resilient rim wire.

Fig. 111 is a perspective view on a larger scale, of the oscillating bender die detached.

Fig. 112 is a plan of the form and the wire placing and holding mechanism, and shows a U-shaped wire on said mechanism, ready to be applied to a shaped pan that is omitted from the view to avoid confusion of lines.

Fig. 113 is a fragmental front elevation showing the wire lifting, placing and holding mechanism, and shows the wire feeding and holding arms in lowered position for allowing the finished pan to be ejected over them after withdrawal of the form.

Fig. 114 is an elevation of the right hand side of the mechanism shown in Fig. 113, and shows the wire placing jaw and holder in rest position before raising bent wires to the level of the top of the rim of the pan on the form; a fragment of the abutment is shown.

Fig. 115 is a fragmental view of parts at the upper portion of Fig. 114, showing the wire placing jaw applying a wire section to the out-turned rim of a pan resting on the ledge of the form.

Fig. 116 is a fragmental view of mechanism shown in the upper part of Fig. 115, and shows the wire placing jaw in the position reached just after releasing the wire and giving room for the rim formers, not shown, to do their work.

Fig. 117 is a fragmental detail on a larger scale than Fig. 116, showing a portion of the wire table with a fragment of the jaw holding the wire on the table.

Fig. 118 is a fragmental perspective on a still larger scale showing the jaw for holding a wire section, indicated in dotted lines, and placing such section on the rim of a pan, not shown.

Fig. 118$^a$ is an enlarged fragmental end view of one finger of one of the wire pushers with wire on the guide in position on the pan flange and against a wall of the pan which is shown in broken lines.

Fig. 119 is a plan view of a blank adapted to be folded to form a pan; broken lines indicate the lines along which the bends are made to form the pan.

Fig. 120 is a view of a blank located on a form and having its ends bent down approximately to position where the side flaps start to fold; broken lines indicate the position from which such ends have been bent; the abutment and flaps are omitted from the view.

Fig. 121 is a top plan of the blank with the parts thereof for forming the ends and sides of the pan, folded onto the form, the outline of the top of which is indicated in broken lines.

Fig. 122 is a side elevation of what is shown in Fig. 121.

Fig. 123 is an end elevation of what is shown in Figs. 121 and 122.

Fig. 124 is a side elevation when all folds except the rim-roll have been completed and the folded blank is ready to receive the wire.

Fig. 125 is an end view of what is shown in Fig. 124.

Fig. 126 is a top plan of what is shown in Figs. 124 and 125, with the rim-wire U-shaped sections in position to be placed in the rim bends of the pan.

Fig. 127 is a view of the completed pan on the form and pan rim supports after the rim has been rolled over the wire sections and the end jaws of the rim rolling device and support have come into position to support the pan by its rim so that the form may be withdrawn downwardly therefrom; the side rim-roll jaws are omitted.

Fig. 128 is an end elevation of what is shown in Fig. 127, except that the side rim rolling and supporting jaws are shown in supporting position and the end jaws are omitted.

Fig. 129 is a view looking at the bottom of the completed pan.

Fig. 130 is a fragmental plan showing portions of the mechanism with a blank as it is being placed in position for bending; and also showing a finished pan in position to be ejected at the close of the blank placing operation.

Figure 131:
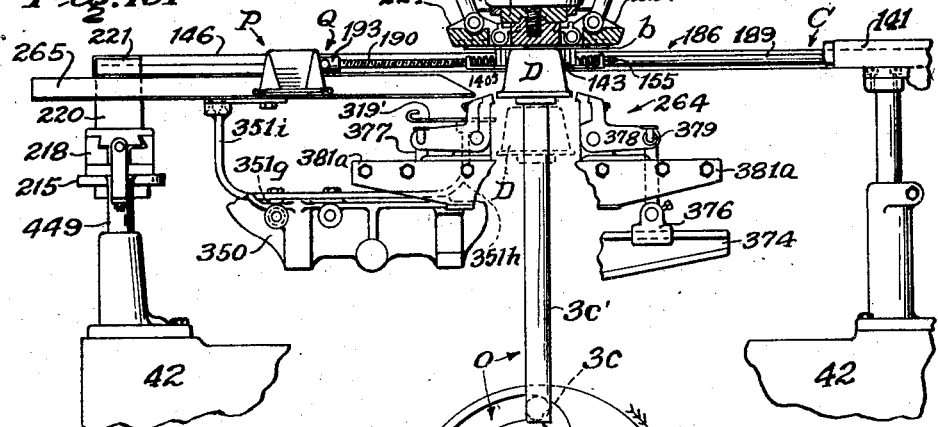

Fig. 131 is a fragmental elevation partly in section on line $x^{131}$, Fig. 130.

Fig. 132 is a fragmental diagrammatic plan view illustrating the vacuum breaking device which prevents blank feeding when the wire is not feeding.

Fig. 133 is a fragmental diagrammatic side elevation of the mechanism illustrated in Fig. 132.

Fig. 134 is a diagramatic fragmental side elevation of the vacuum breaking mechanism viewed from lines $x^{134}$, Figs. 132 and 133, looking toward the front of the machine as indicated by the arrows.

Fig. 135 is an enlarged fragmental plan detail of the blank feed suction breaker.

In general terms the invention, in its preferred form, comprises in combination a blank magazine A, at one station to hold a bunch $a$ of blanks adapted to be folded into pan form; mechanism B for removing the advance blank $b$ of such bunch from the magazine A at each revolution of the machine and delivering such blank to blank gripping, carrying and placing means C including a reciprocating carrier to which the blank is delivered by the blank removing mechanism, and which means is operable to carry a blank to a blank folding station and to insert the blank edgewise into an open space between a reciprocating form D and a stationary abutment E that are held apart at such station; the abutment being fixed above the level of the path of the reciprocating carrier, and the form being initially and normally below such path, and reciprocable therethrough toward and from the abutment; means F to release the blank from the carrier C; said reciprocating form D being adapted to clamp the blank before the blank is released from the carrier; and means G to bend and fold the projecting edge of the blank onto the form D to form four pan walls with overlapping corner folds; and the invention is of a character comprising in combination, an abutment and a form spaced apart to form an open space adapted to admit a blank edgewise between the form and said abutment, and folders cooperating with the form to form a folding station; of blank placing mechanism adapted and arranged to move a blank edgewise into folding position in said space; means to reciprocate the form toward and from the abutment to clamp and release the blank, and means to operate the folders to fold the clamped blank onto the form to form a pan.

The invention also includes a pan making machine of the character just set forth comprising means for forming the pan with out-turned rims; and provided with wire supplying means H, H' to draw wire from rolls or coils of wire, straighten such wires, slightly curve them, and place them adjacent to opposite sides of the pan; wire cutting means I to cut such placed wires to sections of a predetermined length; wire bending means J to form divergent angular terminals on the sections or lengths of wire; means K to move the bent wires to position to embrace the pan walls and to fit said wires on the out-turned rims; means L to temporarily hold the wire sections or lengths on such rims; means M to bend the out-turned rims onto the wire lengths and their terminals, thus temporarily held; rim rolling and supporting means N to receive the rim flanges and roll them onto the wires while the pan P is supported by the form, and to finally support the rim of the finished pan; form reciprocating means O adapted to withdraw the form from the pan, thus finally supported; and means Q, operable with the carrier C to eject the pan at the early part of the succeeding revolution of the machine.

All these mechanisms and means are mounted in a frame R and are driven in timed relation by power applied to a cam shaft S journalled in said frame and furnished with fourteen cam wheels providing one peripheral cam and twenty face or box-cams formed in grooves, and a spur gear on the periphery of one of the cam wheels.

The cam grooves and the cams thereof are best described by stating the functions they perform; as when such functions are set forth a mechanic skilled in the art can make the same. The forms of the grooves and cams are shown in the drawings.

The cam wheel 1 is provided on one face with cam grooves $1^a$ and $1^b$ of different radii and respectively termed the inner and the outer cam grooves. The inner cam groove $1^a$ is connected to operate a vacuum pump to apply suction in the vacuum arm of the blank separating and transferring mechanism; and the outer cam groove $1^b$ is connected to reciprocate the blank carrying and placing means in timed relation to said vacuum pump and transferring arm.

The cam wheel 2 is provided on one face with an inner cam groove $2^a$ connected to operate the transferring arm and suction cups, to effect the separation of a blank from the bunch of blanks, and with an outer cam groove $2^b$ connected to operate spreadable carrier guide rails on which the grip carrier of said blank carrying means run.

Said cam wheel 2 is toothed to receive power from the jack-shaft and to operate means adapted to place wires in position to be bent for application to the walls of each partially formed pan while on the form.

Cam wheel 3 has a face cam groove $3^a$ which is constructed with a long arc $3^b$ and cam $3^{b'}$ and is connected by a follower $3^c$ and the form push rod $3^{c'}$ to reciprocate the form D toward and from the abutment E so as to clamp the blank $b$ to the abutment and to hold it there during the folding and rim wiring and rolling operations, and then to withdraw the form from the completed pan.

Four sections of the blank edges are folded onto four sides of a form by which the blank is clamped against the abutment, and to this end the pair of cam wheels 4 and 4' have similar face cam grooves $4^a$ and $4'^a$, which are connected to operate means to simultaneously bend the blank onto two opposite faces of the form. The cam 4' is also connected to operate means to cut the wires to length after they have been placed in position to be bent to fit the rim of the pan.

The paired cam wheels 5 and 5' have similar face cam grooves $5^a$ and $5'^a$ connected to operate means to simultaneously bend the blanks onto two other opposite faces of the form.

The paired cam grooves $4^a$ and $4'^a$ are alike and operate the first or end pair of folding flaps, and the paired cam grooves $5^a$ and $5'^a$ are alike and operate the second, or side folding pair of flaps; all four grooves have long arcs $r$, $r'$ of over 180 degrees and the long arcs $r$ of grooves $4^a$ and $4'^a$ are longer than those $r'$ of grooves 5 and $5'^a$. The long arcs hold the pan wall folding flaps fully withdrawn; and the cams $4^b$ and $5^b$ of the cam grooves between the long arcs actuate followers, respectively, to operate the folding flaps to which they are connected. The folding operation caused by the cams $4^b$ of grooves $4^a$ and $4'^a$ is therefore of shorter duration than that of the cams $5^b$ of the grooves $5^a$ and $5'^a$ and said cams are set as seen in Figs. 3, 50 and 61, so that the operation of the cams 4⁵ begins before that of the cams 5⁵. The inmost bends of all four cams are coincident so that the foldings of all four sides are completed nearly simultaneously, and the cams 5⁵ being longer than cams 4⁵, hold their followers in toward the center while the cams 4⁵ return their followers to the long arc and hold them there for a considerable time before the return of the followers of cams 5⁵ to their long arcs.

The arc of cam 5ª′ and 5′ª′ hold the side flap out a little so as to allow the end flaps to return to arc 4ª and 4′ª, then the side flaps are returned to the form and then the corner folds are folded.

This arrangement of cams 4⁵ and 5⁵ allows the outer member of each corner fold or loop of the blank $b$ to fold over the inner member smoothly, and all four sides of the pan are invariably folded smoothly, the pre-folding of two blank sections allowing the adjoining sections to bend smoothly to form the four corner loops, necessarily resulting from folding a blank to form a pan without leaks at the seams.

The cam wheels 6 and 6′ are provided with similar face cam grooves 6ª and 6′ª which are provided with cams 6⁵ and 6′⁵ connected to simultaneously operate the means for folding the corner folds onto the overlapping walls of the partially completed pan.

The cam wheel 7 is provided with a face cam groove 7ª connected to operate mechanism for placing wires on two opposite sides of the partially formed pan.

The cam wheels 8 and 8′ are provided with inner face-cam grooves 8ª and 8′ª connected to operate to bend the cut wires to embrace the pan. They are also provided with outer face cam grooves 8⁵ and 8′⁵ that are connected to operate mechanism to fold the rims of the pan walls onto the pan embracing rim wires.

The cam wheels 9 and 9′ are provided with inner face cam grooves 9ª and 9′ª that are connected to wire-lifting mechanism co-operating with the wire placing and holding mechanisms, and serving to bring the wires to the desired plane for application to the pan rim.

Said cam wheels 9 and 9′ also have outer face cam grooves 9⁵ and 9′⁵ to operate means for rolling the rim over the rim wire.

In the machine shown, adjustment of parts for making pans of different sizes is provided for and the blank magazine A referring to Figs. 7–14, 25 and 25ª, is constructed with relatively adjustable left and right hand housings 10, 11 between which the bunch $a$ of blanks is held overhanging rearwardly aslant by retainers 12 carried by laterally adjustable support bars 13 that are also vertically adjustable by means of slideways 14 that are threaded on, and adjustable up and down, by adjusting screws comprising reversely threaded upper and lower left and right threaded sections 15, 16 connected by the coupling 17 pinned to the squared meeting ends of said threaded sections. The upper sections 15 are swivelled on the housing by the adjusting screw supports 18 with collars 19 and pins 20.

The retaining arms 12 are adjustably clamped on the supporting bars 13 by the bolts 21, and blank supporting arms 22 are likewise clamped to bars 13′ mounted on slides 14′ that are slidable up and down the housing reversely to the retainer arms 12, so that in changing the machine from one to another size of blank, the center of the blank will not be shifted relative to the device which transfers the blank to the carrier; it being understood that parts of succeeding mechanisms are also adjustable to conform to different size blanks.

Referring to Figs. 17–20, each of the blank supporting arms is provided with a downwardly and rearwardly aslope supporting surface as at 23 to support all except the advance blank $b$ of the bunch $a$, and means are provided to stop the bottom edge of such advance blank when it reaches a point the thickness of the blank beyond the end of such supporting surface, so that such advance blank will be free to be moved down edgewise at that point, while the other blanks are still positively supported.

Said supporting surface is provided by means of downwardly and rearwardly inclined slideways 23 on said blank supporting arms 22; and gage screws 24 are provided to move the slideways 23 to exact position on the arms to receive one blank only, where they are locked as by the set bolt 25 in slot 25′. Means to stop the lower edge of the advance blank $b$ is shown as a movable block 26 fixed on the ends of the arms 22 by screws 27 and spaced from the ends of ways 23 to provide a recess 23′ into which the lower edge of the blank $b$ may be inserted by mechanically moving it down to compress the spring 28 as indicated in Figs. 20 and 21.

The blank supporting springs 28 are fixed by screws 29 to the arms 22, and are respectively adapted to normally extend aslant upwardly and rearwardly across the plane of the surfaces 23 and to support the advance blank $b$, and to be depressed to the plane of such surfaces by the weight of the bunch $a$ of blanks while the tip of the spring so upholds the advance blank $b$ as to prevent it from lowering by force of gravity into the recess, and normally supports said blank $b$ in position with its upper edge retained by the retainer 12, and yet allows said blank to be mechanically moved down into said recess for release of the top of such blank from said retainers, after which such blank may be moved up to free its lower edge from the recess. Provision is made whereby a blank transferring arm is appropriately operated to thus move the blank to free it from the magazine while the bunch of blanks is undisturbed, except that such bunch slips down the inclined ways and its advance blank is positioned as at $b$ in Fig. 19.

In order that when the magazine has once been set to properly center the blank on the carrier, it may be easily and accurately reset to accommodate the machine to run blanks of a different size, is indicated in Fig. 7 the left and right hand housings 10 and 11 are slidably mounted on a cross-rail 30 and are relatively adjustable by manually operated means including a miter gear 31 driven by miter gear 32 and journalled to the crossrail 30 by a thrust bearing 33 and fixed to the left and right hand threaded housing-adjusting screw 34, 34' that is normally fixed in adjusted position by the set nuts 35, 36, except when change of magazine adjustment is to be made.

The cross-rail 30 has end recesses 37 into which the lower ends of the housings are fitted with gibs 38.

The miter gear 32 is fixed to, and driven by, a vertical shaft 39 that is driven by a spiral gear 40, which is connected with means for simultaneously effecting adjustments of other parts of the machine when change from one size to another size of manufacture is to be made.

The rear portion of the rails and rail spreading, grip releasing, and other mechanisms are supported by a rear extension $40^a$ of the frame, which is shown as being a separate bracket fixed to the main body of the frame by bolts $40^b$ as indicated in Figs. 4 and 6.

The operative parts of the machine are mounted in a massive frame comprising a casing composed of a lower half 41 of the cam case, secured to a foundation by bolts 41', and an upper half 42 of said cam case; and is surmounted by the main housing 43 that is fixed to the cam case by suitable means as indicated by the frame bolts 44.

The blank transferring arm 45 has a suction passage 46 connected by ducts 47 with suction cups 48 forming means to catch the advance blank, and provided with a spring closed relief valve 49 that is arranged to be opened by an adjustable stop formed by set screws 50 when the arm 45 is lowered to the position shown in Figs. 32 and 35, to release the blank $b$ and allow it to be slid off of the cups 48 and the blank steadying stays 51, 51'.

The suction passage 46 is connected by hose 52 with the vacuum pump 53, the piston rod 54 of which is operated by the connecting rod 55 jointed at 56 to rocker arm 57 that is journalled to the frame at 58 and is fixed to rocker arm 59 which is operated by follower 60 in the cam groove $1^a$.

The vacuum pump is operated in timed relation with the blank transferring arm to apply suction to the cups 48 at the moment the cups contact with the blank $b$, and to continue such suction until just before the blank is caught by the carrier.

This coordination of operation is effected by connecting the arm 45 to the cam shaft S by the mechanism more particularly illustrated in Figs. 25, 32 and 35.

The transferring arm standard 61 is fixed to the cross-rail 30 and supports a pin 62 on which is journalled a rigid link 63 to which the heel of the transferring arm 45 is pivoted by pin 64 that is fulcrumed on the swinging end of a connecting rod 65 which is pivoted at 65' to the blank adhesion breaking lever 66 which is pivoted at 66' to a radius arm 67 and imposes upon the transfer arm 45 a limited movement to lower blank $b$ into the recess 23'; thus breaking the adhesion of blank $b$ on the following blank which then becomes the advance blank of the bunch $a$, and releasing the top of blank $b$ from the hooks $12^a$ of the blank retainer 12 at the initial transferring movement of the arm 45.

68 is the fulcrum of the vacuum controlling levers and is swung by the long lever 69 and its companion link 70 on an axis 71 carried by the hanger 72, which is fixed to the crosshead 30 by cap screws 73 that extend through flanges 74 into boss 75 on crosshead 30 which is recessed at 76 to receive the flanged heads 77 that are fixed by cap screws 78 to crosshead 30 and are integral with the posts 79 adjustable in sockets 80 in the frame by screws 81.

The swinging end of the long lever 69 is connected through intermediate mechanism with the cam groove $2^a$.

The main transferring lever 82 is fulcrumed on 68 and is connected at 83 to the main transferring connecting rod 84, which is connected at 85 to the transferring arm 45 between its heel pin 64 and its head for the purpose of swinging the arm 45 throughout the entire arc between the magazine and the carrier.

The power arm of the transferring lever 82 is connected at 86 to the long blank depressing and transferring connecting rod 87 that is connected through pin 88, and the bell crank 89, which is fulcrumed at 90 to the frame and is connected at 91 to a rigid link 92 that is connected at 93 with a stud 94 rigid to the reciprocating rod 95 which is operated by the roller 96 in cam groove $1^a$.

The long lever 69 is connected at 97 to the equalizer connecting rod 98, which is connected at 99 to bell crank 100 that is pivoted at 101 to the frame and is connected at 102 to a connecting rod 103, which is connected to a rocker that consists of the arms 104 and 105 rigid to each other and pivoted at 58 to the frame, and connected by the follower 106 to the cam groove $2^a$.

By the mechanism connected to cam grooves $1^a$ and $2^a$, the vacuum transfer arm and pump are coordinated to apply suction to the blank $b$ and by a succession of movements thereafter to shift the blank edgewise to break its adhesion to the bunch, and then tilt the blank over and bring it into parallelism with, and to deposit it on, the carrier.

The spring latch 107 pivoted on the end of the stay 51' is adjusted to sufficient resistance to assist in holding the blank from displacement relative to the suction cups, and light enough to allow the blank to be slid off of the transferrer with moderate resistance when engaged by the carrier and released from the suction.

Referring to Fig. 2, the cam shaft S is driven by spur gear 108 on the rim of cam wheel 2 which is driven by pinion 109 on jack-shaft 110 provided with pulley 112 adapted to be driven by any suitable means as belt 113 driven by electric motor 114. The pulley is shown connected to the jack-shaft by clutch 115 controlled from either side of the machine by the levers 116, 117 connected by the clutch shaft 118.

The jack-shaft is mounted in ball bearings 119 and is provided with a hand wheel 120 by which it may be turned to bring the machine to any desired part of its cycle when the clutch 115 is released.

It is important that no wire be fed into the machine except when a blank has been brought into form to receive it; and means T are provided to prevent the wire feeding and drawing mechanism from operating except at that portion of a cycle immediately following the placing of a blank. To this end, a wire grip releasing finger 121 is extended into the path of the blank $b$ so that as the blank is carried by the suction cups from the magazine to the level of the carrier, the finger will be moved down to such level.

Referring to Figs. 97–$101^a$, said finger is fixed to rock shaft 122 that is journalled to the frame at 123 and that is held from longitudinal displacement by thrust collar 124, and that has its arm 125 connected by a universal joint 126 to a rod 127 which is connected by universal joint 128 to a bell crank 129 journalled at 130 to the frame and connected by a pin and slot lost-motion connection 131 to connecting rod 132 that is journalled at 133 to the bent lever 134 which is arranged to arrest the latch 135 and hold it in position to prevent the wire feeding mechanism from gripping the wire, thus preventing wire from being advanced beyond the wire straighteners, except after a blank has depressed the finger 121 to allow the wire feeding mechanism to operate.

Said latch 135 is pivoted at 136 to the spring supported end of arm 137 that is fulcrumed to the frame at 138 and is normally depressed by spring operated rod 139 as indicated in Figs. 87, 90 and 91.

Referring to Figs. 42–45, the blank carrier is made up of right and left separate and complementary units spaced apart and each provided with a slide and with blank centering units 140 adapted to act on the opposite edges of the blank; and means comprising slideways in the form of rails pivoted at the front of the machine are provided, whereby the two units are simultaneously moved in parallel paths to carry the blank rearwardly to the pan forming station at D, and are then spread apart and returned along converging paths to the blank receiving station at C; thus avoiding interference between the carrier and the pan forming mechanism, and being made to approach, in opposite directions, the blank edges that are to be caught by the units.

Housing 141 on opposite sides of the blank magazine and the blank receiving station, are arranged to house mechanisms to horizontally reciprocate pins 142 that are adapted to move from end to end of the housings to operate blank placing slides or locators 143 that have horizontal blank supporting ledges or faces 144 and that carry spring pressed blank centering heads 145. Said slides are slidably mounted on horizontally swinging blank carrier rails 146 that are pivoted at their front ends to the magazine housings 10 by upright studs 147. Said rails are adapted and arranged to allow their free ends to be swung in a horizontal plane toward and from each other and the center line of the machine; and said rails are timed to bring the blank supporting faces formed by ledges 144 on the slides 143 into position to receive the lateral edges of the blank when the suction cups 48 of the transferring arm have fully lowered the blank.

Referring to Figs. 36–41, the centering heads 145 are carried by pins 148 that are slidingly mounted in the blank placing slides 143 and are inwardly pressed by springs 149 and are provided with downwardly convergent sloping faces 150 with which the blank $b$ engages at the moment the blank comes to rest on the faces 144; and at that moment the suction is released in cups 48 by the valve 49 striking the set screw that forms the stop 50. The converging faces 150 of the centering heads 145 are arranged to center the blank in the horizontal plane in which said blank is moved in the operation of placing the blank over the form D.

151 indicates blank holding jaws fixed on jaw spreading slides that are provided with wedging heads 152. Said slides are in the form of rods provided with smooth bearing portions 153, 153', an intermediate threaded portion 154 and a nut receiving threaded terminal portion 155, provided with a screw driver slot 156.

The blank placing slides 143 are provided with abutments 157 spaced apart to accommodate the combined widths of the wedging heads 152 and a spreading wedge 158 that is fixed to the transferring arm 45 and is adapted to wedge apart the heads 152 when the transferring arm brings the blank down into position between the centering heads 145, so that as the blank is thus positioned, the spreading wedge 158 will force apart the wedging heads 152 thus to spread apart the blank holding jaws 151 to allow the marginal extension $e$ of the blank to come between said blank holding jaws. Said jaws 151 converge upwardly so that when the wedge 158 has passed down below the wedging heads 152, as indicated in Fig. 39, the ends of the blank will be held by the jaws 151 while the blank is resting on the ledges 144 that are provided on the blank placing slides 143 to support the blank at the level of the centering heads 145 and between the jaws 151.

The blank is thus held in horizontal position at the appropriate level to be moved edgewise into the open space between the form D and the abutment E of the pan folding device.

For convenience of assembly, the heads 152 are fixed on the ends of their slides, as by the retaining screws 160 in the grooves 161 in the inner smooth portions 152' of the slides that slide through the abutments 157. The lugs 159 are fastened to the slides 143 by screws 162 and the lock nuts 163 form stops to sustain the pressure of the springs 159' operating between the lugs 159 and the blank holding jaws 151.

The blank holding jaws 151 are split as at 164 lengthwise of the threaded portions 154 of the slides; and screws 165 are provided to draw the slide portions together to clamp the jaws on the threaded portions 154 of the jaw carrying slides.

The pins 148 of centering heads 145 are slidable in transverse bores 166 that have countersinks 167 to seat lock nuts 168 that are screwed onto the pins 148 to limit the movement of the heads 145 toward the center line of the machine. Said heads are fastened as by riveting at 169 to the pins 148.

The rails 146 are provided with grooved slideways 170 in which tongues 171 of the blank placing slide 143 fit to prevent up and down movement of said slide.

The form D is shown with a vertical bore 172 having at its top a countersink 173 and a temporary support in the form of a disk 174 on top of a rod 175 that is seated normally in the countersink 173 and movable up and down with and also relative to the form D, and has an adjustable stop 176 screwed onto it below the form D and also has a sleeve 177 having an enlargement 178 adapted to engage a yielding support bolt 179 for the rod and disk so as to hold up a formed pan as at 180, the rim 181 of which is not wired. See Figs. $85^a$, $85^b$ and $85^d$. Said support is shown as a bolt that is being held by a spring 182 in a case 183 fixed to a rim roll support 381 by bolts 184.

Referring to Figs. 42, 44, 130 and 131, each locator or blank placing slide 143 is adjustably fixed to its carrier slide 185 by means of an adjusting rod 186 extending through a bore 187 in the slide 143 and secured in place by a nut 188 jamming the slide 143 against a sleeve 189 mounted on the rod 186, between the slides 143 and 185.

The rods 186 are threaded at the portions 190 that extend along the grooved sides of the rails. Said rods have smooth portions 191 that pass through the slides 143 and 185; and the rods are fixed to the slides by nuts 192 at one end and the intermediate nuts 188 on the threaded portions 190.

Pan ejecting fingers 193 are adjustable along the threaded portions to throw out a just completed pan at the close of the movement of the carrier which centers over the form, a blank for the succeeding pan.

The two carrier slides are simultaneously operated by cam wheel 1 through outer cam groove $1^b$, follower 194, rack operating bar 195 which slides in stationary bearing 196 and has lateral extensions 197 to which are rigidly fixed racks 198 meshing with pinions 199 fixed on upright shafts 200 that are provided with universal joints $200^a$, $200^b$ with telescoping joints comprising sleeves $200^c$ and inserts $200^d$; the perimeters of the inserts being longitudinally angular as indicated at $200^e$, in Figs. 7, 43 and 45.

Said shafts are journalled to the frame as indicated at $200^f$ and $200^g$ coaxial with the fixed segment gears 201, and that are provided with horizontal radius arms 202 rigid to said shafts, respectively, and jointed to links 203 that are pivoted to the carrier slides 185 and are provided with gears 204 journalled thereto and meshed with idlers 205 that are journalled on the radius arms and meshed with the fixed segment gears 201.

By this arrangement, a slight endwise movement of the rack operating bar 195 causes the carrier slides to be reciprocated on the rails 146 the full distance required to move the blank $b$ from the station where it is centered, to the station from which the form will move and it is clamped against the abutment by a slight movement of the form, so that the blank is centrally clamped.

Withdrawal of the centering slides from the blank is effected by spreading apart the carrier rails 146; and the rail spreading means comprise the outer cam groove $2^b$, follower 206, lever 207 fulcrumed to the frame at 208 and connected by the ball stud 209 with the extensible connecting rod 210 that is connected by the ball stud 211 to the crank 212 of shaft 213 that is journalled to the frame at 214, and that is provided at the top with a double crank shown as a disk 215 operating connecting rods 216, 216' that are pivoted to the disk diametrically opposite each other, and extend from opposite edges of the disk, and are adjustably connected to the carrier rails, respectively, through the spreader slides 217 on the transverse slideway 218, and the rail spacing and spreading rods 219 fixed to rail supporting slides 220 to which the laterally swinging ends of the carrier rails are respectively swivelled at 221, so that when the double crank shaft 213 is turned on its axis, the width of the track will be changed.

The cam groove $3^a$ that operates the form D, and the cam groove $2^b$ which operates the rail spreading means, are timed so that the rails are spread to withdraw the grips away from the blank just after the moment the form has clamped the blank against the abutment, and after the lower grip jaws have released the blank.

At the moment the blank $b$ is clamped against the abutment by the form, the abutment and blank folders are in the flat blank receiving position indicated in Fig. 46, with the blank receiving and end and side folding faces in a common plane.

The folders and folding mechanism comprise as shown in Figs. 46, 47 and 48, end, side and corner folders supported by the abutment. The end folders are shown as folding flaps 222 hinged respectively, to the opposite ends of the fixed abutment by end hinge pins 223 the axes of which are in a common plane $p$ parallel to and at a predetermined distance from the blank clamping face $q$ of the abutment E, greater than the distance between such clamping face $q$ and the plane $p$ of the axes of the pins 225 of the side folders shown as flaps 224. See Fig. 56$^b$. The pins are in holes 225' in ears 225$^a$ of the abutment E, which has the centrally threaded angular and circular bosses 225$^b$, 225$^c$.

Referring to Figs. 57–60, the corner folders are shown as folding flaps 226 hinged, respectively by corner hinge pins 253 to the ends of the side folding flaps, and the axes of all the hinge pins are so located with reference to the planes of the several blank contacting faces of the abutment and the flaps, that when the abutment face is on the elevated form, the flaps when they are folded, will respectively fit appropriate sides of the form.

The folding flaps are connected by suitable mechanism to the cam shaft S and are timed as indicated by solid and dotted lines in Figs. 50 and 61 to operate in the following order, viz, the first, or end flaps start first and fold about a third of the way, and then the second, or side flaps begin folding; the end flaps lead throughout, and the second or side flaps increase in speed so that the end and side flaps finish their folding strokes nearly simultaneously; thus forming the corner folds $g$, Figs. 121, 122; then the side flaps rise slightly while the first or end flaps rise nearly to the initial plane, and then the side flaps become fully folded, and the end flaps are fully lifted, thus clearing the way for the corner folds $g$ to be folded onto the folded end walls; while the second or side flaps clamp the side walls of the pan tightly against the form; the hinge pins of the corner flaps are then parallel to the sides of the form and the corner flaps swing onto the form folds $g$ and flatten them against the end walls that have been folded against the form by the first flaps, and the folding of the blank into pan form is thus completed; the corner flaps swing out into line with the side flaps, and the side flaps and corner flaps rise to the plane of the abutment, and the unfolded end flaps, thus completing the cycle; the flaps then remain in the flat blank receiving position until the next blank is clamped against the abutment, when the operation just described is repeated.

The end folding flaps 222 are operated by cam grooves $4^a$ and $4'^a$ through corresponding means as followers 228, push rods 229, and flap cross-head 230 and end flap operating push rods 231 that are swung on pins 232 and extend downwardly and inwardly aslant toward the form and are jointed to the end flaps by the end flap operating pins 233 so that as the cross-head 230 moves down and up the end flaps 222 are swung to fold and swage the ends of the blank onto the ends of the form, and then rise to the horizontal blank receiving position shown in Fig. 46.

Various joints of the machine are micrometrically adjustable by means substantially such as are illustrated in Figs. 52 and 53, where the pin 233 is journalled in a bearing 233$^a$ and has a central excentric 233$^b$ journalled in a box 233$^c$ against which excentric a set screw 233$^d$ engages to hold the box fixed in certain relation to the axis of the pin.

The side folding flaps 224 are operated by the cam grooves $5^a$ and $5'^a$ through corresponding means comprising followers 234 and connecting rods 235 that are connected to opposite arms 236 of the cross 237 which is provided with a hub 238 and with the side flap cross arms 239 on which the side flap operating push rods 240 are swung by pins 241 and from which pins said rods extend downwardly and inwardly aslant toward the form, and to the side flaps to which they are jointed by the side flap operating pins 242.

The corner folding flaps are operated from cam grooves 6ª and 6'ª through followers 243, connecting rods 244, central short crank arms 245 of rock shaft 246 journalled to the frame on opposite sides of the abutment; long crank arms 246' at the four ends of said rock shafts; four ball-studs 247; four corner flap operating push rods 248, the four ball-stud connections 249, the studs 250 of which are journalled to the longer arms 251 of the corner flap hinge levers 252, which levers are hinged by pins 253 to the ends of the side flaps 224 and carry pins 254 that hinge the corner folding flaps 255 to said levers 252. The pins 253 and 254 are parallel to the ball-studs 250.

The side flaps are provided with corner flap folder hinge knuckle extensions 256 between their free edges and the axes, respectively, of the pins 225 that hinge the side flaps to the abutment E.

Said knuckle extensions have cams 257 terminating in shoulders 258 and the hinge knuckles of the corner folding flaps ride around the cams from the position indicated in Fig. 58, to hold the butts of the corner folding flaps away from the form as indicated in Fig. 59, thus to accommodate the three thicknesses of the blank without cramping.

The cams terminate at a distance from the ends of the side flaps so as to allow the knuckle of the folder flaps to shift toward the form at the close of the corner folding movement.

The knuckles of the corner folding flaps have tips 259 that engage the shoulders 258 and ride upon the cams 257 to return the parts to the position shown in Fig. 58 on the reverse operation of the levers 252.

The construction and arrangement just described is adapted to allow the corner flaps to be thrust against the corner folds $g$, respectively, when the side flaps are folded, and to accommodate the multiplied variations of thickness of metal in the three plies at the folds; also to lock the corner flaps in flat rigid relation to the side flaps so as to prevent interference with the end flaps, while said folds project obliquely from the corners of the form, and are free to be swung around toward the produced vertical longitudinal mid plane $z$ of the form to bend the corner folds onto the ends of the pan after the end flaps have bent the ends of the pan against the form and returned to the level of the abutment while the side flaps are still clamping the sides of the pan against the form.

Adjustable stops 259' in the form of set screws are provided on the outside of the side flaps 224 to seat the levers 251 of the corner flaps when said corner flaps are open, thus keeping the inside faces of the corner flaps in a common plane with the inside faces of the side flaps when the corner flaps are fully open; so that the corner folds made by closing the end and side flaps will be sharp; and when the corner flaps are folded over onto the corner folds, the corners of the pan are made sharp.

The cams and connections between the same and the folding flaps lock the flaps with relation to each other at all times, except when the flaps are operated on their hinges, and then the operation is in timed relation as will be readily understood by those skilled in the art.

It is understood that if it is desired to make pans with unfinished rims, the wire grip releasing finger 121, all the wire feeding mechanism, and the mechanism pertaining to wiring the pans, except the pan support formed by the rim roll, may be omitted and the blanks may be fed and the pans formed therefrom, one at each revolution; and that a straight walled form or a truncated pyramidal form may be used according to the character of the pan to be made, and the flaps will be conformed thereto, and the blanks may be cut to a size and shape to make a rim fold at the base of the form.

In the machine illustrated a truncated pyramidal form is shown and the base of the form has a concave ledge 260 to turn out the edges of the blank folded thereon, and the free edges of the end flaps and the side flaps are slightly chamfered as at 261, Fig. 53, to conform to such ledge, thus to give a slightly outward curve to the root of the out-turned flanges 262, (Figs. 78 and 80), that are to enclose the rim wires 263 of the finished wire-rimmed pan.

When a pan has been completed on the form, its rim is supported by means which in the construction shown comprise four rim-roll jaws 264 that at the moment the pan is completed, are in the position shown in Fig. 85, to support the pan rim while the form D is being retracted to leave the pan free to be ejected.

Referring to Fig. 1, the pan track comprises two rails 265 spaced apart by a tie 265' that is slotted at 265ª to receive bolts 265ᵇ and is adapted to receive and support the pan after it has been ejected by the pan ejecting finger 193 at the close of the operation of placing the blank over the form. The bolts secure the rails to the ties and by loosening the bolts the track rails may be spaced to fit the pans.

The wires 263 for the rims of the pan are of U shape, and each embraces a side or end of the pan and portions of the adjacent pan ends or sides.

These two wires are supplied to the machine from any source as the strands 263ª from wire rolls or bundles, not shown.

Referring to Fig. 86–96, the wire straightening and curving devices comprise two sets 266 and 266' of parallel rollers; the axes of the rollers of one set being at right angles to the axes of the rollers of the other set. Each set of rollers is composed of two separable rows of rollers, one row 266ª being in a fixed block and the other row 266ᵇ being in a hinged block and movable toward and from the fixed row. In Figs. 86 and 87 there are shown four rollers in the fixed rows and three rollers in the movable rows, there being fourteen rollers in both sets.

The block 267' is hinged at 268 to the fixed block 267, and is operable and lockable by a handle 269 and latch 270 rigid to the handle and provided with an adjustable catch 271. The handle and the latch swing on pin 272 that is stationed on the hinged block 267' and extends at right angles to the vertical plane of the block hinge pin 268.

The catch 271 is shown as a set screw and is adjustable for the purpose of regulating the tension of rollers upon the wire.

The movable rollers are in staggered relation to the fixed rollers and each hinge pin 268 is loose in the knuckle of the fixed block 267 and a set screw 269' is threaded through the pin and acts upon the inner wall of the fixed knuckle so that by tightening the set screws the hinge pins and consequently the hinged blocks, and the rows 266ᵇ of the movable rollers are canted, or moved out of parallelism with the rows of fixed rollers, thus to cause the wires to slightly curve convexedly toward the form and pan as they are moved onward by the master wire drawing rollers 279 and 280.

The fixed blocks 267 are adjustably mounted in slideways 267ª respectively, and are adjustable there along by adjusting screws 267ᵇ rotatably supported against endwise movement by the main housing 43 of the machine frame, at 267ᶜ; so that by turning the adjusting screws, the alignment of the wires with their wire drawing rollers, respectively, and wire guides may be established.

A strike 273 projects from the fixed block to receive the tension adjusting catch 271 when the hinged block is closed and the handle 269 is down as shown in Figs. 86, 87 and 89 to prevent the hinged block from being swung up except when the handle is raised. The hinged blocks can be swung open to the position shown in Fig. 89ª without disturbing the tension adjusting screws, and each is operated by first swinging the handle on its pin, and then moving the handle sidewise.

When the blocks are locked closed, the wires may be led endwise into the grooves of the rollers, and the ends of the wires may then be caught by the wire feeding means I, which will then draw the wires through the wire straightening blocks where the action of the rollers successively on four opposite sides of the wires, respectively, eliminates curves, crooks and bends, if any exist, and the wire ends thus straightened are then moved onward.

The wire straightening rollers are preferably disks of only the thickness required, respectively, to practically accommodate a groove that will nearly seat and will fit over nearly half the wire. That is to say, the radial cross-section of the groove of each roller corresponds to nearly half the cross-section of the wire. The disks on opposite sides in each set are arranged in staggered alternation so that the wire is oppositely acted on in rapid succession on opposite sides as it passes through the block.

Referring to Figs. 92 and 93, the blocks 267 and 267' are provided with longitudinal bores 274 that are closed externally and supplied with wicks 275, to supply lubricating oil to the roller pins 276 that have longitudinal and radial oil passages 277 to deliver oil to the rollers. The roller pins are fixed to their blocks by taper pins 278.

The mechanism for handling the two strands of wire are duplicates.

At the inner ends of each set of wire straightening blocks 267, 267', wire drawing and feeding rollers 279, 280, Figs. 1, 87, 90 and 91, are arranged to draw the wires between the rollers of said blocks.

The master wire drawing and feeding rollers 279 are oscillatable to and from the wire engaging position by means of roller carrying rock arm 281, which is fulcrumed on a bracket 282 that is fixed to the stationary block 267, and supports the stationary wire drawing roller 280, toward and from which the master wire drawing roller 279 is oscillated by said rock arm 281 to clamp the wire between the two wire drawing rollers 279 and 280 for each wire.

The rock arm 281 is slidable along and radially fixed to the splined rock shaft 283 that is journalled to and is slidable through the brackets 282 by splined flanged bushings 284 that turn in bearings 285 in said brackets.

Simultaneous and like oscillatioin of the two rock arms 281 by any rocking of the shaft 283 is thus insured for clamping or releasing both wires alike.

The parallel shafts 283, 286, 287 and 288, are all splined to allow longitudinal adjustment of parts for different size pans; and each shaft is fitted with four externally circular and internally splined flange bushings 284 to allow said shafts 283 and 286 to rock, and the shafts 287 and 288 to revolve, in their respective bearings and to be splined to their respective rock arms and wire drawing rollers to operate the same.

Wire gripping roller retracting springs 289 are connected to long rock arm 291 and tend to lift the oscillating rollers 279 from the wires.

The springs 289 are connected by positive means, and also by lost motion means 290 to lift the rock arms 281. Such positive means comprise long rock arm 291 radially fixed to shaft 283, and practically co-operating with the short rocker arms 281 to form levers fulcrumed by the rock-shaft 283, on brackets 282, so that the springs 289 tend to lift the short arms 281. Said lost motion means comprises the latch dog 135 fulcrumed at 136 to the long arm 137 of the master wire-drawing and driving roller lifting lever that is fulcrumed to the frame at 138 and acts as a lever of the second class to lift the push rod 139 having a shoulder 292 to lift the free end of the long rocker arm 291; a spring 293 being used to take up any inequality of the wire.

Said latch dog is fulcrumed at 294 to a link 295 having a slot-and-pin lost-motion connection at 296, 297, with a rock arm 298 that is splined to slide along rock shaft 286 which is journalled to the bracket 282. The slot allows the latch and its fulcrum 294 to be pulled up to lift lever 137 and push rod 139 to raise the master-wire drawing roller 279.

The lower end of the latch dog is provided with a catch 299 adapted to engage a shoulder 300 connected to the wire lifting mechanism. See Figs. 87, 90, 91, 114 and 115.

The wire drawing and feeding rolls 279 and 280 are driven from the jack-shaft 110, lower bevel gears 301, 302, bevel gear shaft 303, upper bevel gears 304, 305, which drive the lower shaft 288 for driving the lower wire drawing roller 280 and which gear 305 is fixed to spur gear 306 coaxial therewith on shaft 288; and spur gear 306 drives spur gear 307 on spline shaft 287 when the machine is in operation and the master-wire drawing rollers are in the wire drawing and feeding position shown in Figs. 87 and 94. The gears 306, 307 are mounted in the gear case 308 fixed to the frame of the machine.

Figs. 87, 88, 90 and 91 illustrate trip means for stopping the wire feed when the requisite length of wire has been fed into position for cutting off a length preparatory to bending the wire to embrace about one-half of the pan rim.

The rock arm 309 is rigid to the spline shaft 286 and rock arm 298, and is pivoted at 310 to trip rod 311 connected by the longitudinal adjustment slot 312 in the trip rod, and the pin 313 in said slot with the trip lever 314 fulcrumed at 315 to a block 316, which is adjustably mounted as indicated in Fig. 87 to be set to be operated by insertion of different length wire section as required for different size pans.

The wires are deposited on the wire guiding and supporting tables 319 beneath retainers 319$^a$ at front and rear of the form, and are then cut to a required length and bent at their ends to receive the pan between their terminals; then the tables 319 and 319' are raised to the level of the pan flanges, $c$, $c'$ and the placers and pushers 354, 354' are then operated to put the wires into position on the pan flange at front and back.

Referring to Figs. 112, 113, 114 and 117, each of the wire guiding and supporting tables 319 and 319' are made in two sections; those at the front being supported by legs 351 that are adjustable toward and from each other by right and left threaded screws 351$^a$ and 351$^b$ screwed through nuts 351$^c$, 351$^{c'}$ and rigidly fixed together by the coupling 351$^d$ so that by turning the screw 351$^a$ by its angular head the table sections may be adjusted to different lengths of pan.

Referring to Figs. 130 and 131, the rear table sections 319' are likewise adjustable by right and left screws 351$^e$ and 351$^f$ working in nuts 351$^g$ on legs 351$^h$ and 351$^i$. The rails of the track 365 over which the completed pans are discharged, are supported by the legs 351$^i$ so that the track and tables are raised simultaneously, and are lowered simultaneously by the respective up and down movements respectively of the lifting yokes 347 as shown in Figs. 113 and 114.

The rails of the discharge track are shown provided with plates 351$^j$ fixed to the rails respectively; and the legs 351$^i$ are fixed to the plates and track rails and hold them rigid to the lift bracket 350.

Wire guides 316$^a$ in the form of tubes are arranged to receive the wires as they pass from the wire drawing rolls 279 and 280, to direct the wires between the blades 326 and 327 of the respective wire cutters as shown in Fig. 104.

Referring to Figs. 106 and 107, the wire benders J are provided with wire section guides 343$^a$ aligned with the wire guide 316$^a$ to receive the wire length therefrom, and open at the top so that when the wire sections are bent above the wire supporting tables, they may be lifted freely by the tables to bring the bent wire sections to the level of the tops of the pan flanges $c$, $c'$.

The free end of trip lever 314 is provided with a recess 317 in the path of the curved wire 318 as shown in Figs. 87 and 91 which is guided by any suitable means as at guides 316$^a$ and 343$^a$ and the table 319 to enter the recess and push the lever to operate the trip rod and the mechanism described, whereby the top roller 279 is lifted from the wire, thus stopping the wire feed.

The wire cutters J may be understood by reference to Figs. 102, 103 and 104 and are operated by the flap operating rods 229 that are on the wire receiving side of the machine and that operate the end flaps which first complete the folding operation; and the parts are timed so that the wires are cut during the descent of the end flaps.

Referring to Fig. 102, a collar 320 having eyes 321, is fixed to the end flap operating rod 229; and levers 322 connected to said eyes and fulcrumed at 323, are connected by connecting rods 324 to the shank 325 of the pivoted cutter-blades 326 that cooperate with the fixed cutter blades 327 so that both wires are cut to proper length at folding of the end flaps 222.

Referring to Figs. 105–111, the power for operating the bender means K is applied from cam grooves $8^a$ and $8'^a$ of cam wheels 8, 8', through followers 328, to yokes 329, which are connected at their ends to bender connecting rods 330, that reciprocate through guides 331 and are connected by links 332 to bell cranks 333 connected by adjustable connections at 334, 335, to links 336 that are jointed by pins 337, to links 338 that are jointed by pins 339 to bender heads 340, which are jointed by pins 341 to wire bending links 342 that carry the wire bending tools 343, which are keyed to the wire bending links and comprise grooved heads 344 and are operable to bend the wires as indicated in Figs. 108, 109, 110 and $110^a$.

The wire bender means K, are so located relative to the form, that the bent limbs 345 of the wires are exactly spaced apart to fit into the angles between the pan rim and the walls of the pan that are at the right and left of the form, but said bent limbs and the bodies of the wires are initially held at a level sufficiently below the level of the form and blank carrier to avoid interference with the flaps and other mechanisms that cooperate to form the pan and its rim.

The wire straightening, curving and drawing means pass the wire to the wire guides and supports at 319 on the lower level, as indicated in Fig. 114, at which level the cutting and bending takes place; and when the pan with its extended rim flange 262 is formed and held by the form and abutment as indicated in Fig. 114, the guides are raised to bring the bent wires to an upper level which is the level of the tops of the rim flanges, and then the wire supports are operated to move the bent wires into position to embrace the pan and to rest on the projecting rim flanges thereof.

The operation of raising the bent wires is effected by cam grooves $9^a$ and $9'^a$ operating through followers 346, lifting yokes 347, wire lifting rods 348, connected by pins 349 to lift the wire lifting yokes 350 that support the legs 351 that carry the wire guides and supports 319.

The yokes 350 also support the longitudinal slide rods 352, the placing slides 353, and the wire pusher and placers 354 each of which comprises two fingers 355 that project over the surfaces at 319 of the wire guides and are under-cut or recessed on their under faces to accommodate the ends of the bent wires so that said fingers overlie the limbs 345 of the wire sections and hold them in true position. The pushers are provided at the rear of said recesses with shoulders 356 that engage and fit the outer angles of the bent wire sections to positively push the wires forward and place them on the flanges and against the pan walls.

The wire lifting yokes 350 are held in true position by upright guides 357 for slides 358 on said lifting yokes.

The wire placing slides 353 are reciprocated on the slide rods 352 by power transmitted from the cam groove $7^a$ through the follower 359, wire placing yoke 360, yoke rods 361 connected by pin and slot connections 362 with bell-cranks 363 journalled at 364 to the frame and connected by the rigid links 365 to the slides 353 to reciprocate the pusher and placers 354 to wire placing position, and return, at each revolution of the cam wheel 7.

Referring to Fig. 86, the screws 366, 367 supported by the bars 368 on posts 357 are connected to adjust parts of the machine to fit the wire tripping, cutting and bending mechanism to cut and bend the wires for different size pans.

The pan rim rolling mechanism is illustrated in Figs. 73–85 and includes cam grooves on the four cams 8, 8', 9 and 9', and pan flange and rim rolling jaws 264, the planes of the upper surfaces of which jaws are projections of the planes of the upper surfaces of the ledges 369 at the base of the form, prior to, and during a part of the time of the blank folding operation; as indicated in Figs. 77–80, and serve to support the rim of the pan during and after withdrawal of the form as in Figs. $75^a$, 85 and 128.

The jaws 264 are operated by power from cam grooves $8^b$ and $8'^b$, and $9^b$ and $9'^b$ at the opposite sides of the machine, through four cam followers 370, 371 and four push rods 372, 372'. Push rods 372 are connected to lateral arms 373 and longitudinal arms 374 of a spider 375 having bearings 376 and connected by rigid upright links 377 to the shanks 378 of the rim-rolling jaws 264, journalled by pins 379 to the shanks 378 and fulcrumed by pins 380 to the vertically movable jaw carrying base 381. Said base 381 that is made in the form of a spider having four radial slotted arms $381^a$ is operated by push rod 372'; and is movable up and down by cam grooves $8^b$, $8'^b$. The base 381 has radial slots 382 extending longitudinally of said arms $381^a$ to accommodate the bosses 383 of the jaw bearings 384 that are supported by said arms $381^a$; and are locked thereto by bolts 385, nuts 386, and clamp blocks 387, which blocks are provided with toothed or roughened top surfaces 388 to engage roughened under-surfaces 388' projecting inwardly from the inner faces of the slots, for adjusting for different lengths and width of pans.

The cam wheels 8 and 9 are in pairs as indicated in Figs. 74 and 75 and are arranged to cooperate to oscillate the rim rolling jaws to the position at the base of the form beneath the flanges 262 as in Figs. 77, 78, then out and then straight up and then toward the form and then down so as to carry the rim rolling tools 389 from position under the pan flanges 262 below the wires 263, and to bend such flanges up around and over said wires and down onto the wires as shown in Figs. 81, 82, 83 and 84.

Said rim rolling tools 389 are secured by cap screws 390 to the jaws 264 to complete the jaws and to be renewable in case of wear and to allow them to be of tool steel.

In order to automatically accommodate blanks of moderately different thicknesses the form D is spring mounted on its cam operated push rod 3$^{c'}$.

In Fig. 77 said form is shown provided in its underside with a recess 391; and said push rod 3$^{c'}$ is provided with a head 392 that supports stubborn resilient means in the form of springs 393 on which the form is supported to yield sufficiently to accommodate a blank having a thickness somewhat greater than that of the blanks for which the machine is set.

The head 392 is held to the form by a shouldered guide 393', which is shown as formed of bolts that extend up through the recess and are fixed to the top of the form by being screwed thereinto to compress the springs and prevent looseness of the form while clamping blanks of the thickness the machine is set to operate on. The guide bolts 393' are arranged to allow the head 392 to slide thereon sufficiently to accommodate any yielding of the springs caused by the unusual thickness of a blank.

The upper end of the push rod 3$^{c'}$ is reduced to fit the tubular hub 392$^a$ of the head and has a threaded bore into which is screwed a set screw 392$^b$ having an angular shank inserted through a notched edge washer 392$^c$ that is thus non-rotatably mounted on the set screw which is tightly seated on the hub by the head of the set screw, and is held by stop screw 392$^d$ against rotation so that the set screw cannot loosen and the head is immovably fixed to the push rod.

In order to relieve the cam groove and follower that operate the form operating push rod, from strains that may come on the form in the bending of blanks of thick material or for large pans, a form supporting block 394, Figs. 63 and 64 is arranged to be slid into and out of position to engage a shoulder 395 on said push rod, and a lever 396 pivoted to the frame at 397 is operable by a peripheral groove 398 in the cam 3 to hold and release the push rod as required for alternate support and reciprocation as the operation of the machine may require.

Referring to Figs. 46, 52 and 61, the cam operating push rods that operate the folding flaps are shown constructed in sections 399 and 400 connected by threaded clamp collars 401. The lower sections 399 extend through the stuffing box guides 402 and are provided with the followers, which are shown as rollers.

The sections 400 have enlargements 403 forming shoulders to butt against the cross beam 230 and 236, and said shoulders are resiliently held against the cross-beams by springs 404 resting on the beams and compressed by washers and nuts 405 to compensate for variable thickness of material.

The adjustable corner flap operating push rods 248 are constructed as shown in Fig. 71 with the ball studs 250 at the ends, and the intermediate endwise compressible joint 406 comprising a barrel 407 containing a buffer spring 408 and having a bushing 409 for the rod section 410 that has a head 411 formed by a nut screwed thereinto and against which the spring 408 acts. The bushing 409 is screwed into the end of the barrel after the nut 411 is screwed onto the end of the rod. The rod body is shown constructed in two sections 410, 410' united by a fixed joint 412 for convenience of manufacture, and assembly, and for adjustment of stroke for corner flap operation. The rod section 410' is connected to the corner flap by a ball stud and is of considerable length into which the long thread of the rod section is screwed so as to allow adjustment for different size flaps in changing from the manufacture of one to another size of pan, and to allow the rod to shorten while the side flaps are raised.

The corner flap operating cam push rods 244 are also constructed with two sections 413, 414 as shown in Fig. 56 and said sections are connected by yielding universal joints 415 each comprising a yoke 416 journalled by trunnions 417 to a collar 418 through which extends a smooth portion of section 414 which is secured by a nut 419 above the collar; and said collar is held against the nut by a spring 420 supported by shoulder 421 on the rod sections 414 to accommodate variable thickness of material.

In practice the clutch 115 being released, the operator will turn the hand wheel 120 of the jack shaft to bring the parts of the machine into the position with the vacuum arm down as indicated in Figs. 1 and 32 and in broken lines in Fig. 25, and will place a bunch $a$ of blanks in the magazine and will then throw in the clutch, thus driving the jack shaft and the operative parts of the machine by power and the operation of the machine proceeds automatically in a manner apparent from the foregoing description, and the finished pans will be taken care of by means, not shown herein, as they are ejected from the machine.

To change the machine to produce a pan of a different size with respect to length and breadth or either, it is necessary to make adjustment of the magazine, the vacuum arm, the form, the abutment, the flaps and their operating rods, the blank grips, and the mechanisms that operate on the wires.

Means are provided for changing the manufacture with respect to depth and the same will now be described.

Referring to Figs. 50 and 51 the abutment E is fixed to the lower end of a vertically adjustable shaft 422, which is shown threaded to screw into the abutment, and is provided at its upper end with a hand wheel 423 by which it may be turned to screw it into and from the abutment; and said shaft 422 is provided with a collar 424 adapted to engage a support 425 so that when the screw is fully seated in the abutment, it clamps the abutment rigidly to the support.

The shaft 422 extends through a hollow column 426 that is swivelled to a support 427 fixed to the housing 43; and said column is screwed into a bearing nut 428 that is fixed by cap-screws 429 to the abutment support 425.

The abutment clamping shaft 422 is provided above the nut 428 with a fixed collar 430 inside the column, and said collar contacts with a spring 431 that contacts at its lower end with a support formed by a washer 432 supported by studs 433 that are screwed into the support 425, so that the tendency of the spring 431 is to support the shaft 422 during the change of folder assembly. The bosses 225$^b$ and 225$^c$ fit the lower end of the support 425 and prevent the abutment from turning.

The column has a hand wheel 434 by which it may be turned and a flanged bushing 435 by which it is swivelled to the main housing. In the construction shown the column hand wheel 434 has a hub flange 436 in which the bushing is fixed by studs 437 screwed into said flange and extending through the bushing to prevent the bushing from turning.

When the studs 437 are released from the shaft 422, said shaft may be unscrewed from the abutment, and by turning the column 426, by hand wheel 434, the abutment support 425 and abutment E can be raised and lowered as required for deeper or shallower pans. The column support 427 is detachably fixed to the housing 43 by cap screws 438; and by removing the studs 437 and screws 438, and unscrewing the shaft 422 from the abutment, the column, the shaft and the shaft and abutment support 425 may be detached from the housing.

The shaft hand wheel 423 is fixed to the shaft by a set screw 439, and when the studs 433 and cap screws 429 have been unscrewed the column may be withdrawn from the abutment support and the shaft may be withdrawn from the column. The parts are assembled by a reversal of the operation just described.

A change of depth of pan requires vertical adjustment of the blank handling mechanism such as the magazine, blank carrier, grips, tracks and other parts; and means for vertically adjusting the blank handling mechanism comprises a longitudinal shaft 440 extending from front to rear of the machine and fitted at one or both ends to be turned by a crank, not shown; tranverse shafts 441, one at each end of the machine as shown in Figs. 43 and 45, are geared by spiral gears 442, to the longitudinal shaft and by spiral gears 443 to vertically movable posts 79 and uprights 449 that support the cross heads 30 and 218, so that by turning the longitudinal shaft, the cross heads and the parts connected thereto may be raised and lowered as required.

These adjustments may all be made by the operator in a manner obvious from the foregoing description.

Referring to Figs. 6 and 7 the horizontal longitudinal shaft 450 that extends from front to rear has at the front end, a spiral gear 451 meshing with the spiral gear 40 on the vertical shaft 39; and said horizontal shaft 450 has, at the rear end, a spiral gear 452 that meshes with a spiral gear 453 on a vertical shaft 454 which has at its upper end a bevel gear 455 meshing with a bevel gear 456 on the transverse internally splined sleeve 457 which is non-slidably journalled in a bearing 458 that is fixed to the frame of the machine through the stationary slideway 218.

The rods 219 are provided respectively with reverse screw threads 459 that engage corresponding nuts 460, which are rigidly connected to the pan rail supports 220 so that when the longitudinal shaft 450 is turned in one or the other direction the rails will be simultaneously moved, respectively, toward or from the longitudinal mid-plane of the machine. The set nuts 461 on the rods may then be screwed into place against the nuts 460, thus fixing the nuts 460 on the rods 219.

When the set nuts are loosened, the shaft 450 may be turned and the magazine housings and the grips will thereby be adjusted equally toward or from the mid-plane of the machine; and when a change in width of blank is to be made, the rails will be brought into parallelism with the grips in blank receiving position and a blank may then be placed in the blank magazine housings, or the grips and the set nuts loosened and the longitudinal shaft 450, turned to cause the grips or the housings to fit the blank so placed; and both housings and grips are thus simultaneously properly set.

In operation, the blanks are supplied to the magazine in bunches inserted manually or mechanically at the front end of the machine, and the advance blank, overhanging rearwardly, is caught by the vacuum cups on the transferring arm, which then moves the blank edgewise down into the slot, and then leans it more toward the rear to withdraw the top edge from its retainer, then moves it up to free it from the slot, then sways it back and down to the grips, which in the meantime are advanced and returned and then grip the edges of the blank and then move the blank to place between the form and the abutment; the form then lifts the blank a slight distance and clamps the blank to the abutment; then the end flaps start to bend the ends of the blank down and when they have been bent downward about one-third of the way as indicated in Fig. 120, the side flaps start to bend the projecting side portions of the blank and move so rapidly that the end and side flaps end their downward movement nearly simultaneously, and the corner folds $g$ are swaged together at their roots by the side flaps against the end edges of the end flaps. The side flaps rise a little, then the end flaps rise, then the side flaps return to the form, leaving the blank in the folded form indicated in Fig. 121, and the corner folding flaps fold the folds against the end walls; the blank being bent to form flanges at the pan mouth, above the rim rolling jaws; the wires at a lower level are straightened, cut and bent and are then lifted and placed on the rim flanges; the rim rolling jaws then bend the rim up and over the rim wires. The jaws are then returned to the pan supporting position, and the form withdraws downward, thus leaving the pan free to be ejected as the succeeding blank is placed above the form.

The blanks $b$ for making bread pans by this machine are stamped from sheet metal into the form indicated in Fig. 119 having end and side marginal extensions $c$, $c'$ of the end and side walls $d$, $e$ to fold over the rim wires 263; and are notched at the corners as at $f$; and when the ends and sides are folded onto the form, they form the loops $g$, the ends of which are at the rim of the end walls of the pan when the same is completed.

As the corner loops are formed, they extend in the produced planes of the folded sides and are compressed at their roots by the side folding flaps against the ends of the end folding flaps so that when the end flaps are raised, the folding of the corner loops against the ends of the pan is easily effected.

In order to produce corner loops of the character just referred to, the end flaps are made to start first on their folding movement, and they complete about one-third of such movement before the side flaps begin their folding movement shortly after the close of the folding movement of the end flaps.

At each revolution of the cam shaft S the counter 462 on the end of the cam shaft S registers the total number of pans made by the machine.

When the machine is not operating the attendant may turn it by the hand wheel 120 on the jack shaft to any point and the markings (not shown) on the indicator 463 at the end of the cam shaft will indicate the part of the cycle at which the machine stands, and the attendant may then accurately adjust the machine to the desired position.

Referring to Figs. 132–135, provision is made to prevent feeding a blank to the carrier in case wire therefor is not supplied to the wiring mechanism. To this end a vacuum vent 464 is provided with a normally closed yielding valve 465 that is arranged to be opened by a lever 466 fulcrumed at 467 to a fixed support 468; and acting on a shoulder 469 on the valve stem 470, to slide the stem through a guide 471 to compress the valve spring 472 to open the valve and break the suction by which the blanks would be taken from the magazine and transferred to the carrier. The lever is operable to open the valve by means of a slide 473 carried by a slideway 474 and provided with shoulders 475 arranged to be acted upon by bell cranks 476 fulcrumed above the slide as at 477 and connected by connecting rods 478 to short arms 479 that are fixed to a fulcrum pin 480 to which are fixed the longer arms 481 that are pivoted to the fixed blocks 267 at 480 and are provided with rollers 482 that are supported by the wires on their way into the machine. The rollers 482 are shown as grooved and are journalled on the ends of the arms 481 and are supported by the wires respectively against gravity.

The operator may raise the rollers to allow the wires to be inserted into the systems of rollers that move the wires into the machine.

Absence of a wire allows the mechanism supported by the roller 482 to lower and the weight of such mechanism is sufficient to operate the slide to open the valve to admit atmospheric air through the vent, thus breaking the suction and preventing the transferring arm from taking any blank from the magazine until wire is again led to the wiring mechanism, unless a support, not shown, is supplied in place of the wire.

It is sometimes desirable to mark each pan to indicate its origin and an opening as shown at 484 in Fig. 48 may be made in one or more flaps to seat one or more dies 485 containing letters or numbers; and a complementary die 486 may be made in the form for cooperating with the die in the flap.

It is deemed desirable that the female die be in the form so that the yielding walls of the pan will allow ready release of the stamped pan.

Referring to Figs. 72$^b$–72$^h$ inclusive, hold-down fingers 487, 488 are hinged to the hinge pins that connect the flaps to the abutment.

The end hold-down fingers 487 are shown with broadened free terminals 489 adapted to fit between the corner folds to press against the end walls of the pan nearly to the rim thereof.

The fingers 487, 488 have eyes 490 journalled on the hinge pins 223 and 225 of the flaps and also have lugs 491 and tappet means 492 on the eyes and in rigid relation to the fingers.

493 is a lock-ring carried by and vertically movable relative to, the abutment E, and provided with stops 494, outside of which the lugs 491 stand when the flaps are down, and while they are being raised part way as shown in Fig. 72$^c$, 72$^d$ and 72$^e$; and which stops 494 are lifted out of the way of the lugs 491 by cams 495 on the side flaps, arranged to lift arms 496 of the locking ring when the side flaps are nearly horizontal as shown in Fig. 72$^g$.

The hold-down fingers operate alike to prevent the wire placers and holders from being pushed out of place by the rim roll mechanism.

The side hold-down fingers 488 have like eyes 490 journalled on the hinge pins 225 of the side flaps 224 and also have like lugs 491, and tappets 492.

The flaps are provided with recesses 500 in which the hold-down fingers fit with their inner faces flush with the inner faces of the flaps when the flaps are down and are holding their fingers, respectively, against the pan walls in the position of the fingers 487 and 488 shown in Fig. 72$^d$.

The lock-ring 493 is yieldingly held toward the abutment by resilient means as the springs 501 between the lock-ring and retainers 502 formed by the heads of bolts 503 extending down through the lock-ring 493, and washer 504 and screwed into the top of the abutment E so that the lock-ring may be moved from the abutment by the cams 495, of the side flaps 224 acting on the lock-ring operating tappets 505 that are in the form of bolts screwed up through the lock-ring extensions 496, and adjustably fixed by jamb-nuts 506 on top of said extensions, so that when the side flaps 224 are fully raised, the lock-ring is moved away from the abutment E and out of the way of the lugs 491, so that the fingers may be raised into their recesses on the inner faces of the flaps.

When the flaps are down the lugs 491 of the hold-down fingers are outside of the lock-ring extensions 494 which fit thereagainst to hold the hold-down fingers against the pan walls until the flaps are raised to cause the cams 495 to lift the lock-ring and allow finger retracting springs 507 to retract the fingers and bring them to rest in the recesses 500 in the flaps.

When the wire pushers and placers 354 have moved the U-shaped wires over the rim of the pan, and against the pan walls, the fingers are down and in case the springs 507 fail to start the fingers up when the flaps begin to rise, the flaps act on the tappets 492 to carry the fingers up to the fully raised position.

Having now fully described and ascertained the nature of my said invention and in what manner the same is to be performed, I declare that what I claim is:

1. A pan making machine comprising in combination, an abutment and a form spaced apart to form an open space adapted to admit a blank edgewise between the form and said abutment; folders surrounding and cooperating with the form to form a pan folding mechanism; blank placing mechanism adapted and arranged to move a blank edgewise into folding position in said space; means to reciprocate the form toward and from the abutment to clamp and release the blank; and means to operate the folders to and from the form to fold the clamped blank onto the form to form a pan, and finally to withdraw the folders from the form to release the pan.

2. A pan making machine of the character set forth in claim 1, provided with pan ejecting means operating in timed relation with the form and folders to eject the released pan.

3. A pan making machine of the character set forth in claim 1, provided with means to hold a bunch of blanks; and means to move blanks flatwise therefrom to the blank placing mechanism.

4. In a machine of the character set forth in claim 1, a magazine adapted to hold a bunch of blanks aslant overhanging toward the form, mechanism adapted and arranged to grip the advance blank, means to move the advance blank edgewise to break adhesion thereof with the bunch of blanks, and means to move the blank to the gripping mechanism.

5. In a pan making machine having a form and mechanism to fold a blank into pan form on the form, a magazine having downwardly sloping surface to support the lower edges of a bunch of blanks stood on edge; a stop for the lower edge of the advance blank; a retainer for the upper edge of the advance blank; said retainer being in advance of the stop; a recess being provided between said stop and the advance end of such edge supporting surface; means to move the advance blank down edgewise into the recess to release the top of such blank from the retainer and break the force of adhesion between the advance blank and the bunch of blanks, and then up to free the lower edge of the advance blank, and means to move the advance blank flatwise from the bunch.

6. A pan making machine of the character set forth in claim one, in which the blank placing mechanism has abutments forming ledges to receive a blank flatwise with its edges on said ledges; jaws adapted to be moved toward and from the abutments and to overhang a blank placed on the ledges; resilient means for moving the jaws to overhang the blank on the ledges; wedging heads connected to the jaws; and wedges operable by the blank placing means to spread apart the wedging heads and the jaws during the operation of placing the blank on the ledges; said wedges being adapted to pass the wedging heads as the blank reaches the ledges, to allow said resilient means to cause the jaws to overhang and center the blank in one direction horizontally on the ledges.

7. In a machine provided with a form at a folding station, mechanism for folding a blank on the form to form a pan; means to hold a bunch of blanks; means for gripping a blank separately and moving it to the folding station; a magazine having downwardly and rearwardly sloping blank supports down which a bunch of blanks on edge may slide, and a recess at the end into which only the advance blanks of such bunch may be moved: a retainer to hold the top of the advance blank; suction means to catch the advance blank; means to move the suction means down to release the upper edge of the advance blank from the retainer, then up to release the lower edge of such blank from the recess, and then onward to move the blank to the gripping means.

8. In a machine of the character set forth in claim 1, a magazine comprising a downwardly and rearwardly aslope surface to support a bunch of blanks on edge, a retainer for the top of the advance blank of such bunch, a recess at the end of such surface into which the lower edge of the advance blank may be moved, a spring to support the advance blank until it is mechanically moved down to release the top edge from the retainer, and means to move the advance blank from the bunch of blanks and deliver it to the blank placing mechanism.

9. In a machine of the character set forth in claim 1, a blank magazine; suction means to move a blank from the magazine and deliver it to the blank placing mechanism; and means to release the suction when the blank is delivered to the placing mechanism.

10. In an automatic pan making machine having a form and mechanism to fold a blank onto the form; a blank magazine; mechanism adapted to place a blank between the form and the folding mechanism; means to operate the form and folding mechanism to form a pan from the blank; an arm provided with suction cups to take a blank from the magazine and deliver it to the blank placing mechanism; a pump to apply suction to said cups, a cam wheel having inner and outer face-cam grooves, one being connected to operate the pump and also the arm, and the other groove being connected to operate the blank placing mechanism.

11. In an automatic pan making machine of the character set forth in claim 1, in which the folders include two pairs of pan wall folding flaps, two pairs of cam grooves connected respectively with such flaps, followers in the grooves respectively to operate the flaps respectively, said grooves having long arcs, to hold the flaps withdrawn and with cams to operate the pairs of flaps; the cams being timed to cause the folding operation of the first pair of flaps to begin before that of the second pair of flaps, and the folding operation of the first and second pairs of flaps to end practically at the same time.

12. In an automatic pan making machine of the character set forth in claim 1, in which the folders include two pairs of pan wall folding flaps, two pairs of cam grooves; followers in the grooves respectively connected to operate the flaps respectively, said grooves having long arcs to hold the flaps withdrawn, and provided with cams to operate the pairs of flaps; the cams being timed to cause the folding operation of the first pair of flaps to begin before that of the second pair of flaps, the following operation of the first and second pairs of flaps to end practically at the same time, and the first pair of flaps to withdraw while the second pair of flaps are first slightly opened and then again fully folded, thus to leave unobstructed walls of the pan onto which corner folds may be folded while the second pair of flaps holds its pan walls folded.

13. In an automatic pan making machine of the character set forth in claim 1, in which the folders include two pairs of pan wall folding flaps, two pairs of cam grooves connected respectively with such flaps, followers in the grooves respectively to operate the flaps respectively, said grooves having long arcs to hold the flaps withdrawn, and provided with cams to operate the pairs of flaps; the cams being timed to cause the folding operation of the first pair of flaps to begin before that of the second pair of flaps, the folding operation of the first and second pair of flaps to end nearly simultaneously;

the second pair of flaps to be slightly opened and then folded, and the first pair of flaps to withdraw while the second pair of flaps is slightly raised and then fully folded; thus to leave unobstructed the end walls of the pan onto which the corner folds may be folded while the second pair of flaps holds its pan walls folded; two pairs of corner flaps, and means to operate such pairs of corner flaps to fold the corner folds while the second pair of flaps holds its pan wall folded.

14. In an automatic pan making machine of the character set forth in claim 1, in which the form is provided with a top and four sides, and the folders include four hinged flaps to folding a blank onto the four sides while the blank is held on the top, mechanisms operable to move two opposite flaps more rapidly than the other two at a portion of the folding operation, and to simultaneously close the operation of folding the blank onto all four sides of the form.

15. A pan making machine of the character set forth in claim 1, in which the form is provided with a top and four sides, and the folders include four hinged flaps for folding a blank onto the four sides while the blank is held on the top, mechanisms operable to move two opposite flaps more rapidly than the other two at a portion of the folding operation, and to simultaneously close the operation of folding the blank onto all four sides of the form, and having the hinge axes of two opposite flaps in a plane at one distance from the plane of the abutment face, and the hinge axes of another pair of opposite flaps at a greater distance from the plane of the abutment face, so as to provide an open space to accommodate corner folds.

16. A pan making machine of the character set forth in claim 1, in which the folders include an abutment and four hinged flaps; the hinge axes of two opposite flaps being in a plane at one distance from the plane of the abutment face, and the hinge axes of another pair of opposite flaps at a greater distance from the plane of the abutment face, so as to provide an open space to accommodate corner folds, and having means to fold the corner folds into the open space therein provided.

17. In a pan making machine including a blank carrier and means for placing a blank on such carrier, the device for centering a sheet metal blank on the carrier so that the carrier may place the blank in position to be folded into a pan; said carrier comprising abutments forming ledges to receive a blank flatwise with its edges on the ledges; jaws adapted to be moved toward and from the abutments and to overhang the blank placed on the ledges; resilient means for moving the jaws to overhang the blank on the ledges; wedging heads connected to the jaws; wedges operable by the blank placing means to spread apart the wedging heads and the jaws during the operation of placing the blank on the ledges; said wedges being adapted to pass the wedging heads as the blank reaches the ledges, to allow the jaws to overhang and center the blank in one direction on the ledges; and blank centering heads provided with faces sloping downwardly aslant to receive the ends of the blank as the blank comes to rest on the ledges, and to center the blank in the other direction on the ledges.

18. An automatic pan making machine having a form and blank placing and folding mechanisms; a cam shaft; cam wheels on said shaft to operate such mechanisms; a motor; a jack shaft through which power is transmitted to the cam shaft; a clutch to connect and disconnect the jack shaft and motor; means whereby the jack shaft may be manually turned when disconnected from the motor; and an index operable by the jack shaft to indicate positions of the mechanisms at the various positions of the jack shaft.

19. In a pan making machine having a frame, a form and mechanism for folding a blank onto the form to form a pan; a cam shaft; cam wheels thereon; followers operable by the cam wheels to operate the form and folding mechanisms; and means operable by one of the cam wheels to lock the form in pan folding position so as to support the form independently of its follower to relieve the follower and cam from strain during the folding operation.

20. In an automatic pan making machine of the character set forth in claim 1, in which is included a form and mechanism for folding a blank onto the form to form a pan; a cam shaft; cam wheels thereon; followers operable by the cam wheels to operate the form and folding mechanisms; means operable by one of the cam wheels to lock the form in pan folding position so as to support the form independently of its follower to relieve the cam and follower from strain during the folding operation, and mechanism to slow down the blank placing mechanism at the end and beginning of its movements to reduce the shock.

21. In a pan making machine, the combination with a blank transferring arm, of blank placing slides having blank supporting faces; centering heads provided with downwardly converging sloping faces with which the blank will engage at the moment the blank comes to rest on the blank supporting faces; said converging faces being arranged to center the blank in a horizontal plane in which the blank is to be moved.

22. For a pan making machine, the combination with a blank transferring arm, of blank placing slides having blank supporting faces; centering heads provided with downwardly converging sloping faces with which the blank will engage at the moment the blank comes to rest on the blank supporting faces; said converging faces being arranged to center the blank in a horizontal plane in which the blank is to be moved; and resilient means to yieldingly hold the sloping faces toward each other to center the blank.

23. In a pan making machine, a blank carrier comprising blank placing slides; centering heads adapted to center the blank in the horizontal plane in which said blank is to be moved; jaw spreading slides; wedging heads on said slides; blank centering jaws fixed on the jaw spreading slides; a spreading wedge adapted to wedge apart the wedging heads and adapted to pass the wedging heads; said blank placing slides being provided with abutments spaced apart to accommodate the combined width of the wedging heads and the spreading wedge; means to operate the wedge; and resilient means to force the blank centering jaws toward each other.

24. In a pan making machine comprising a blank magazine, a form and an abutment to hold a blank for folding; a carrier comprising slides adapted to move a blank into the space between the form and the abutment; means to transfer a blank from the magazine to the slides; means on the slides operable by the blank transferring means and adapted to receive and hold the blank by its edges; means to operate the carrier to centrally locate the blank between the abutment and the form; means to move the carrier toward and from the form; means to move the form to clamp the blank against the abutment; and means to spread the slides apart to withdraw them from the blank when the blank is in position between the form and carrier.

25. In a machine of the character set forth in claim 1, a temporary pan support adapted and arranged to move up and down with, and also relative to, the form; a stop for the pan support; and yielding supports for the stop for the purpose of temporarily holding up from the form, a pan on the down stroke of the form.

26. A machine of the character set forth in claim 1, having a vertical bore through the form and a countersink in the top of the form, a rod in the bore; a disk on the rod and in the countersink; an adjustable stop on the rod; and a yielding stop to engage the adjustable stop to stop the rod and to temporarily support a pan as the form is lowered.

27. In an automatic pan making machine a form and means cooperating with the form to fold a blank into pan form and rim rolls and means to place and hold a wire in the formed rim of the pan; fingers adapted to hold down the wire holders and placers; and means to bend the rim onto the wire while the wire placers and holders are being held down by the fingers.

28. In a pan making machine comprising a form and means to fold a blank thereon; a blank carrier comprising separated grips to take hold of opposite edges of a blank; rails on which the grips run, and means whereby the rails are intermittently spread apart, thus shifting the grips to avoid interference with the blank folding mechanism on the return stroke.

29. In an automatic pan making machine having a form, an abutment and flaps hinged to the abutment to fold a blank onto the top and four sides of the form thereby forming a pan having corner folds; holddown fingers hinged to the abutment on the axes of the hinges that hinge the flaps to the abutment; said hold-down fingers being adapted to fit between the corner folds of the folded blank to press against the walls of the pan, and having lugs and tappet means in rigid relation to the fingers; a lock ring carried by, and movable relative to, the abutment and provided with stops outside of which the lugs stand when the flaps are down and while they are being raised part way; a locking ring acting on the lugs to hold the fingers down; and cams on the side flaps arranged to lift the locking ring when the side flaps are nearly raised to horizontal position.

30. In an automatic pan making machine having a form, an abutment and flaps hinged to the abutment to fold a blank onto the top and four sides of the form; holddown fingers hinged on the axes of the hinges that connect the flaps to the abutment; said fingers being adapted to fit between the corner folds of the folded blank; to press against the walls of the pan, and having lugs and tappet means in rigid relation to the fingers; a lock ring carried by, and movable relative to the abutment and provided with stops outside of which the lugs stand when the flaps are down and while they are being raised part way; cams on the side flaps arranged to lift the locking arm when the side flaps are nearly horizontal; the flaps being provided with recesses in which the hold-down fingers fit with their inner faces flush with the inner faces of the flaps when the flaps are down, and are holding their fingers respectively against the pan walls.

31. In an automatic pan making machine having a form, an abutment and flaps hinged to the abutment to fold a blank onto the top and four sides of the form; holddown-fingers hinged on the axes of the hinges that connect the flaps to the abutment and adapted to fit between the corner folds of the folded blank to press against the walls of the pan, said fingers having lugs and tappet means in rigid relation to the fingers; a lock ring carried by, and movable relative to the abutment, and provided with stops outside of which the lugs stand when the flaps are down and while they are being raised part way; cams on the side flaps arranged to lift the locking arm when the side flaps are nearly horizontal; the flaps being provided with recesses in which the hold-down fingers fit with their inner faces flush with the inner faces of the flaps when the flaps are down and are holding their fingers respectively against the pan walls; resilient means to yieldingly hold the lock ring toward the abutment; and retainers extending down through the lock ring and secured to the abutment so that the lock ring may be moved from the abutment by the cams when the slide flaps act on the lock ring operating tappets.

32. In a pan making machine; a form; means for folding a blank over the form; said means comprising two oppositely arranged hinged flaps; means to swing said flaps on their hinges toward the form to fold the end walls of the pan; two oppositely arranged flaps hinged by hinges, the axes of which are at right angles to the axes of the first flaps; means to swing the second flaps toward the form to fold the side walls of the pan; corner folding flaps hinged to the ends of the second flaps; means to lock said corner folding flaps to said second flaps; means to unlock the corner folding flaps from said second flaps, means to retract the first flaps; and means to fold the corner folding flaps to fold the corner folds of the blank onto the pan walls.

33. In a pan making machine, a form; means to vertically reciprocate the form; means to hold the form stationary; means to fold a blank upon the form while stationary to form an inverted pan; a support for the rim of said pan; means to lower the form from the pan; and means to eject the pan horizontally while the form is in lowered position.

34. A pan making machine comprising a form; hinged end and side flaps, means to operate said flaps nearly simultaneously to fold a pan forming blank down over the form, and adapted and arranged to terminate the downward movement of said flaps nearly simultaneously; means to support the rims of the downward folds; and means to withdraw the form downwardly to release the folded pan.

35. A pan making machine comprising a form; automatic means for delivering a blank to position above the form; means to fold the blank over the form and into the form of a pan; means to support the pan; means to withdraw the form to a position below the support, and means to eject the pan.

36. In a pan making machine; a form; folding means, including an abutment and two pairs of flaps co-operating with the form to fold the ends and the sides of a blank against the form, the flaps of one pair being shorter than those of the other pair for the purpose of producing corner folds that extend in the produced planes of the sides of the pan; and horizontally swinging flaps to swage the corner folds against the ends of the pan.

37. In a pan making machine and in combination with means to fold a blank downward to form an inverted pan, and means to support the rim of the pan; a form to co-operate with said folding means and adapted to be withdrawn downward from the inside of the inverted pan after the folding has been completed, thus leaving the finished pan in position to be ejected from the machine.

38. A pan making machine comprising a shaft; cam wheels on said shaft and mechanism operated by said cam wheels in timed relation to each other and comprising mechanism to place blanks one by one in position to be moved; a blank carrier adapted to move a blank into position to be folded, mechanism to fold said blank into the form of a pan, and to move the folding mechanism out of the way so that at the next insertion of a blank, said carrier may move the pan out of the way.

39. A pan making machine comprising a shaft, a form above the shaft, cam wheels on said shaft to vertically reciprocate the form; means to hold the form stationary; means vertically operated by said cam wheels and adapted to fold a blank downwardly around the form; and means to support the downwardly folded portions to allow the form to be withdrawn downwardly from the folded blank.

40. A pan making machine comprising a shaft, a form above the shaft, cam wheels on said shaft; means operable by one of said cam wheels to vertically reciprocate the form at one portion of the shaft revolution and to hold the form stationary during another portion of said revolution; means operable by others of said cam wheels to fold portions of a blank downwardly around the form; and means to support the downwardly folded portions to allow the form to be withdrawn downwardly from the folded blank.

41. In a machine for making pans of folded sheet material, the combination with a form, of hinged end, side and corner folding flaps; mechanism for starting the end folding flaps to fold the ends of a blank onto the ends of the form; mechanism for following the end folding operation by a side folding operation so that the folds of the blank at the corners of the form will extend in alignment with the sides of the form; said end folding means arranged to withdraw the end flaps from between the side folding means when the folding means have completed the end and side folding operations; and means connected to said side folding means and operable to fold said corner folds onto the folded ends of the pan.

42. A machine of the character set forth having a reciprocating form and means for folding a blank thereonto to form a pan having a bottom and four sides; means to support the pan while the form is being withdrawn therefrom; means to insert a blank form above the form; means to eject the supported pan ahead of the inserted blank; and means to allow the pan ejecting means to return past the form and folding means.

43. The combination with an abutment and hinged flaps and a vertically reciprocating form below the abutment; of means to raise the flaps and to fold them downward; a blank carrier arranged to move a blank into position above the lowered form while the flaps are raised; means to raise the vertically reciprocating form to clamp a blank against the abutment; and means to fold the flaps onto the form while the form is holding the blank against the abutment.

44. In an automatic pan making machine the combination with a form and folding means above the form; of means to locate a blank between the form and the folding means; means to operate the folding means to fold the blank over the form; means to bend the edges of the blank to form a flange; means to move wire into position onto the flange; and means to roll the flange over the wire.

45. In a pan making machine comprising a form and a support for the rim of a pan made of sheet material and having a flange projecting outward to enfold a rim-wire; overhanging jaw extension means to hold wire on said flange; reciprocating means; rim folding members fulcrumed between their edges to said reciprocating means and adapted to engage the projecting edges of the rim-wire flange; and means to rock the rim folding members on their fulcrums to fold and roll the flange over the wire.

46. In a pan making machine, a pan rim support; a form; means to reciprocate the form up and down through the pan rim support; means to fold a blank upon the form and to bring the edges of said blank onto said pan rim support; means to move sections of rim wire from opposite sides to the edges of the blank thus folded, and means to fold the edges of the blank over the rim-wire sections.

47. In a pan making machine, a pan rim support; a form; means to reciprocate the form to project it upward to a point beyond the rim support and to retract it to below the level of the rim support; folding mechanism co-operating with the form to fold a blank thereon while the form is projected; said rim support being adapted to support a completed pan to allow the reciprocating means to lower the form from the completed pan.

48. A pan making machine comprising in combination, blank feeding mechanism; blank gripping mechanism; blank carrying mechanism; blank holding mechanism; blank folding and swaging mechanism; pan rim wiring mechanism; pan ejecting mechanism; and means whereby the said mechanisms are successively operated in the order named to produce a wire rimmed pan.

49. The combination with a form and means to fold a blank onto such form to form a pan, means including a downwardly aslope supporting surface adapted and arranged to hold blanks on edge aslant; a detent for holding the top of an advance blank while such blank is on the support; said surface being provided with a groove into which the bottom of the blank may slide sufficiently to withdraw the upper edge from the upper detent; a movable cover for the groove; a suction cup; a rock shaft; a rock arm connected to said rock shaft and to the suction cup; a cam wheel; means to revolve the cam wheel; means operatively connecting the cam wheel with the rock shaft to move the cup to the blank; means to exhaust air from the cup while the cup is pressed against the blank; and means to carry the blank to position for folding.

50. In a pan making machine comprising a reciprocating form and a support for a pan made of sheet material and having a flange adapted to cover wire sections; means to slide wire sections onto said flange; means to hold wire sections on said flange; rim rolling members adapted to engage the projecting edges of the flange; and means for moving the rim rolling members up to fold the flange against the wire.

51. In a pan making machine provided with wire straightening means, and means to form a pan rim upon wire; rollers adapted and arranged to operate to draw wire through the wire straightening means and to push the straightened wire toward the rim forming means; means to cut off sections of the straightened wire; and means to bend the ends of the straightened wire sections between the wire cutting means and the rim forming means.

52. In a pan making machine comprising means for forming a pan rim over wire; means for clutching a wire and moving the same toward the rim forming means; and intermittent clutch releasing means operable by the moving wire to release the clutch when a predetermined length of wire has been moved toward the rim forming means.

53. In a pan making machine comprising means for forming a pan rim over wire; means for clutching a wire and moving the same toward the rim forming means; a lever operable by the end of the moving wire; and intermittent clutch releasing means operable by said lever to release the clutch when a predetermined length of wire has been moved toward the rim forming means.

54. In a pan making machine comprising means for applying wire to the rim of a pan; a form over which a blank may be bent; means adapted to fold the blank over the form to form a pan wall; a wire clutch to move a wire toward the form; and means operable by a blank to start the clutch into operation.

55. In a machine for making pans having wired rims; means for simultaneously bending wire sections to fit upon the pan rim, and means to apply the bent wire sections to the pan rim from opposite sides.

56. In a pan making machine; means to form a pan; means to simultaneously move two wires toward the pan forming means; two pairs of bender means; means to operate the bender means to bend the wires; and means to move the bent wires toward the pan forming means.

57. In a machine for making pans with wired rims; means to fold a blank to form a pan; means to supply blanks to the folding means; means to move a wire toward the blank folding means; and vacuum breaking means connected to the wire supplying means to prevent a blank from being supplied to the folding means when the wire is not being supplied to the wire supplying means.

58. In a pan making machine; means for folding a blank to pan form with extended rim; means to move wire sections into place at the pan rim, on opposite sides of the pan; overhanging means to hold the wire sections in place; and means to bend the rim onto the wire sections thus held.

59. In a pan making machine; means for folding a blank to pan form; means to move wire sections into place at the pan rim; means to hold the wire sections in place; means to bend the rim onto the wire sections thus held; movable fulcrums; rim folding members fulcrumed on the movable fulcrums; and means to move said fulcrums and folding members to roll the pan edges over the wire sections.

60. In a machine for making a pan with wired rim; jaws to hold wire; edge rolling members; means comprising levers, and cam projections working through such levers to raise the wire holding jaws out of the path of the edge rolling members.

61. In a pan making machine having pan folding means, the combination with a carrier adapted and arranged to move a blank toward the pan folding means, of a holder adapted to hold a bunch of blanks, and provided with a slanting support adapted to support a plurality of blanks by their lower edges; a recess at the lower end of said holder adapted to accommodate the lower edge of a blank so that when a sheet comes into position where its lower edge can enter the recess, said sheet may be moved downward into the recess; and a combination of pneumatic and mechanical means to remove the sheet out of the recess and deposit it into position to be taken by the carrier.

62. A pan making machine comprising a form, means for folding a blank over said form to form a pan; means at opposite sides of the form to apply wire sections to the rim of said pan from opposite sides thereof, and means to fold the rim of the pan upon said wire sections.

63. A pan making machine comprising means to fold a blank into pan shape; wire cutting and bending means adapted to form U-shaped wire sections on opposite sides of the rim of the pan; means for bending the rim of the pan at an angle to receive said wire sections; means for clamping said wire sections in place and means for bending the edges of the blank over the wire sections to form the rim of the pan.

64. In a machine for making sheet metal pans, means whereby wire for reinforcing the rim of the pan is taken in sections from two rolls, each section being substantially equal to half the perimeter of the pan; means whereby each wire section is bent into U-shape; means whereby the wire is applied to the walls of the pan; and means whereby the edges of the pan are then bent over the wire sections.

65. In a pan making machine adapted to operate upon a sheet of material; means for introducing and applying wire to reinforce the rim of the pan; and means operable by the sheet whereby the wire introducing mechanism is only operative when a sheet is passing through the machine.

66. In a pan making machine, the combination with means to fold a blank into pan form with out-turned edges at the rim of the pan; means to move two wires to opposite sides of the pan rims; means to cut the wires to length; means to bend the wire to fit the pan at the out-turned edges; means to fit the bent wires onto the pan walls at the rim; and means to fold the out-turned edges onto the wires.

67. In a pan making machine, the combination with means to bend a blank into pan form with out-turned edges; means to straighten two wires and move them to position, means to cut said wires to length; means to bend the cut wires to fit the pan walls at the out-turned edges; and means to bend such edges onto the wires.

68. In an automatic pan making machine having a form provided with a top and four sides, four flaps for folding a blank onto the four sides while the blank is held on the top, and mechanisms operable to move two opposite flaps more rapidly than the other two at a portion of the folding operation, and to close the operation of folding the blank simultaneously on all four sides of the form.

69. In an automatic pan making machine, the combination of a blank stopping abutment in one plane; a rim-wire guide and pan support in a plane parallel thereto and at the depth of a pan therefrom; means to locate a blank in an intermediate plane; a form onto which the blank is to be folded to form the pan; means to move the form past the rim-wire guide and pan support, and through said intermediate plane, and to thereby move the blank to and hold it against the abutment; means to fold the blank onto four sides of the form to make a pan having its bottom against the abutment, and having its open end in engagement with the pan support; and means to bend the rim of the pan outward onto such support ready to receive a rim wire.

70. In an automatic pan making machine, the combination of a blank stopping abutment in one plane; a rim-wire guide and pan support in a plane parallel thereto and at the depth of a pan therefrom; means to locate a blank in an intermediate plane; a form onto which the blank is to be folded to form the pan; means to move the form past the rim-wire guide and pan support, and through said intermediate plane, and to thereby move the blank to and hold it against the abutment; means to fold the blank onto four sides of the form to make a pan having its bottom against the abutment, and having its open end in engagement with the pan support; means to bend the rim of the pan outward onto such support ready to receive a rim wire; means to apply rim-wire to the out-bent rim; and means to bend the rim onto the rim-wire.

71. In a pan making machine having a form and means to fold a blank of sheet material onto such form to form a pan ready to receive rim wiring; means to cut and bend wire to form rim-wire sections below the pan forming level, and means to raise the cut and bent wire sections to the pan rim level and apply them to the pan rim.

72. In a pan making machine comprising a form and end and side folding flaps for folding a blank onto the form, with loops at the corners; double hinged loop folding flaps hinged to the side folding flaps to swing at right angles to their respective side folding flaps; the double hinges thereof being constructed with cams between the first and second hinges adapted and arranged to allow the corner folding flaps to move toward the form with their fold engaging faces parallel to the ends of the form at the end of the folding stroke.

73. In an automatic pan making machine having blank folding means; two blank gripping carrier sections; means for simultaneously operating said sections to grip opposite edges of a blank; means to move the two sections in parallel paths to place the blank in position to be folded into pan form; means to release the grip of said sections when the blank is so placed; means to spread the sections apart to leave the blank free to be folded to pan form; and means to return the sections to blank receiving position.

74. In a pan making machine, means to fold a blank into pan form with a flanged rim; means to cut two wires into sections below the level of the flange, to embrace the pan at the rim; means to bend the wire sections at their ends to embrace the sides of the pan; means to raise the wire sections to the level of the tops of the flanges; and means to move the wire sections onto the tops of the flanges and against the walls of the pan, preparatory to folding the flanges onto the wire sections.

75. In a machine for making rim-wired pans, means for bending a wire section at the ends to form slightly divergent terminals and an inwardly bent bow between the terminals so that when the wire section is moved toward the pan and onto a flange at the rim thereof the terminals will readily receive the pan; means to move the wire section to embrace the pan and to rest on the rim flange; and means to fold the rim flange onto the bow and the terminals to retain the wire section and cause it to fit the rim of the pan.

76. In a machine for folding sheet metal, a form and folder mechanism co-operating therewith to form a pan; an adjustable mounting for the folder mechanism for the purpose of adjusting the machine to make pans of different depths; and means to detachably support and operate the form so that the machine may be adapted to the manufacture of pans of different depths.

77. In a pan making machine, the combination with a form onto which a blank may be folded to form a pan, and a mechanism to fold a blank on the form, of a rim rolling tool to roll the rim of the folded blank; a lever on which the tool is mounted; a fulcrum for said lever; means to move the fulcrum relative to the form; and means to move the lever on its fulcrum.

78. In a pan making machine, the combination with a form onto which a blank may be folded to form a pan, and mechanism to fold a blank on the form; of a rim rolling tool; a lever on which the tool is mounted; a fulcrum for said lever; means to move the fulcrum relative to the form; means to move the lever on its fulcrum; and means to adjust the fulcrum moving means.

79. In a pan making machine, the combination with a folder and a form onto which a blank may be folded thereby to form a pan having a flange; of a rim rolling tool; means to move the tool to support the flange; means to hold a wire on such flange; and means to move the tool relative to the form and wire holder to bend the flange onto the wire.

80. In a pan making machine, the combination with a folder and a form onto which a blank may be folded to form a pan having a flange; of a rim rolling tool; means to move the tool to support the flange; means to hold a wire on such flange; means to move the tool relative to the form and wire holder to bend the flange onto the wire; means to move the wire holder out of the way; and means to move the rim rolling tool to roll the flange over the wire.

81. In a pan making machine having a form and mechanism to form a blank onto the form; a carrier to carry a blank to the folding mechanism; a blank holder having a fixed support recessed to accommodate the edge of a blank and a resilient support for the blank; the resilient support extending beyond the recess to hold the edge of an advance blank out of the recess; a retainer for the opposite edge of such blank; and means to depress the blank and resilient support to withdraw the blank past the retainer so that blanks may be automatically withdrawn singly for delivery to the carrier.

82. In a pan making machine comprising a folder and a form on which a pan having a projecting rim-wire flange may be formed; means to place a rim wire on the flange; a tool for bending the flange onto the rim-wire; means to operate the tool; and an eccentric pin connecting the tool to the operating means and constructed and arranged to adjust the tool micrometrically relative to the form.

83. A pan making machine provided with a form to support a pan having a rim-wire flange; means to place a rim wire on the flange; a tool to bend the flange onto the wire; and means to micrometrically adjust the tool relative to the form.

84. In a pan making machine comprising a form having a ledge at its base and means to fold a blank onto the form and against the ledge to form a flange; means comprising two rows of rollers; means to draw a wire between the rows of rollers and means to guide the wire; said two rows of rollers being arranged to curve the wire convexedly toward the form; and means to bend the wire to form divergent terminals that project from the convex side of the wire so that when the body of the wire is pressed against a pan on the form, the body will be straightened and the terminals brought against the pan walls ready to be enfolded by the pan.

85. In a pan making machine having blank folding and rim wiring mechanism, and provided with vacuum means for feeding blanks to the folding mechanism; vacuum breaking means adapted to be held inactive by a wire on its way to the wiring mechanism so that blanks will not be supplied to the folding mechanism in the absence of wire supplied to the machine for wiring the pan rim.

86. In a pan making machine having blank feeding mechanism and rim-wire feeding mechanism, means for stopping the feeding of blanks; and mechanism withheld by the wire on its way to rim wiring position, adapted and arranged to make the blank feeding mechanism inoperative when such wire is not in feeding position.

87. In combination with the form and blank feeding mechanism of a rim wired pan making machine, means to move two wires into the rim wiring position on opposite sides of the form; rollers arranged to be held by said wires; mechanism operable to prevent blank feeding; and levers operable independently of each other to stop the mechanism from feeding blanks, and held inoperable by the rollers while the same are held by both wires in place to support their respective rollers.

88. In a pan making machine comprising a form and means to fold a blank onto the form; a track; a carrier slide on the track; a blank carrier on the slide; a cam shaft extending in a plane that is parallel to the plane of the track; cams on the cam shaft; a shaft that is vertical to the plane of the track; a pinion on the shaft; a rack meshing with the pinion and operable by a cam on the cam shaft; a fixed segmental gear coaxial with the upright shaft; a radius arm fixed on the vertical shaft; a link pivoted to the carrier slide and jointed to the radius arm; a gear fixed to the link; and an idler gear journalled on the radius arm, and meshed with the gear fixed to the link and with the fixed segment gear.

89. In a pan making machine comprising a form, means to fold a blank onto the form, a cam shaft, and cams on the shaft; a track comprising rails pivoted to swing toward and from the form; means operable by a cam on the cam shaft to swing the rails; carriers on the rails; upright shafts; pinions fixed on the upright shafts; racks operable by the cams on the cam shaft and meshing with the pinions to revolve the shafts; fixed segmental gears coaxial with the upright shafts respectively; radius arms fixed to the shafts respectively; links pivoted to the slides respectively and to the radius arms; gears fixed to the links respectively; and the idler gears journalled to the radius arms and respectively meshed with the segmental gears and the gears on the links, and means operable by cams of the cam shaft to swing the rails and to hold them stationary in timed relation to the form, the folding mechanism and the slides.

90. In a pan making machine comprising a form and flaps for folding a blank onto the form, the combination with the flaps and cams for operating the same; of cross heads operable by the cams; endwise extensible push rods operable by the cross-heads to operate the flaps; and springs to yieldingly hold such push rods extended.

91. In a pan making machine comprising means to place a blank and form a pan at one level with a rim wire flange; means to cut and bend rim wires at a lower level, means to raise the bent wire to the level of the rim so that the wires may be moved onto the rim, for the purpose set forth.

92. A pan making machine comprising pan forming mechanism; mechanism to pass material to the pan forming mechanism wire introducing mechanism; and means actuated by a blank passing through the machine to make the wire introducing mechanism operable.

93. In a pan making machine pan forming mechanisms; a cam case provided with openings in its top; a cam shaft and cams thereon inside the cam case; stuffing boxes removably seated in said openings; push rods formed of sections and provided with followers, each push rod operable through its stuffing box by its appropriate cam; and means outside the cam case detachably connecting the push rod sections so that by detaching the sections and removing the stuffing boxes, the sections in the openings can be caused to withdraw the followers from the cams.

94. In a pan making machine the combination with a folder and a reciprocating form onto which a blank may be folded; of means to lock the form in a raised position at the folding operation so as to relieve the form operating mechanism from strain.

95. The combination with the reciprocating form of a pan making machine substantially as set forth, of a block to support the form; a follower to move the block to and from form supporting position, and a cam wheel operable to move the follower.

96. A pan making machine comprising a form; automatic means for delivering a blank to position above the form; means to fold the blank onto the form and into the form of a pan; means to support the pan; means to withdraw the form to a position below the support, and means to eject the pan.

In testimony whereof, I have hereunto set my hand at Los Angeles, California, this 30th day of March, 1926.

WILLIAM JOHN ROEPKE.